(12) United States Patent
Stivers et al.

(10) Patent No.: US 12,126,527 B2
(45) Date of Patent: Oct. 22, 2024

(54) METHODS, APPARATUSES AND COMPUTER PROGRAM PRODUCTS FOR IMPLEMENTING UNIFIED DATA CONTROL POLICY IN DISTRIBUTED AND PRODUCT-ORIENTED COMPUTING PLATFORMS

(71) Applicants: ATLASSIAN PTY LTD., Sydney (AU); ATLASSIAN US, INC., San Francisco, CA (US)

(72) Inventors: Chris Jo Stivers, San Jose, CA (US); Nicholas William Higgins, Mountain View, CA (US); Sebastian L Cevallos Cedeno, Brooklyn, NY (US); Gianna Wu, Mountain View, CA (US)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/936,575

(22) Filed: Sep. 29, 2022

(65) Prior Publication Data
US 2024/0113963 A1 Apr. 4, 2024

(51) Int. Cl.
| | | |
|---|---|---|
| G06F 15/173 | (2006.01) | |
| H04L 9/40 | (2022.01) | |
| H04L 45/42 | (2022.01) | |
| H04L 45/74 | (2022.01) | |

(52) U.S. Cl.
CPC .............. *H04L 45/42* (2013.01); *H04L 45/74* (2013.01); *H04L 63/102* (2013.01)

(58) Field of Classification Search
CPC ........ H04L 45/42; H04L 45/74; H04L 63/102
USPC .................................................. 709/223, 238
See application file for complete search history.

(56) References Cited

U.S. PATENT DOCUMENTS

| | | | | |
|---|---|---|---|---|
| 10,303,892 | B1* | 5/2019 | Lim ...................... | G06F 16/986 |
| 10,387,669 | B1* | 8/2019 | Lim ...................... | G06F 21/604 |
| 10,592,683 | B1* | 3/2020 | Lim ...................... | H04L 63/20 |
| 11,146,500 | B1* | 10/2021 | Kumar .................... | H04L 43/10 |

* cited by examiner

*Primary Examiner* — Liang Che A Wang
(74) *Attorney, Agent, or Firm* — Alston & Bird LLP

(57) ABSTRACT

Various examples herein described are directed to methods, apparatuses, and computer program products for implementing unified data control policies in a distributed and product-oriented computing platform that includes a plurality of distributed data service clusters and a centralized policy information repository. In some examples, the distributed data service cluster is associated with a distributed policy decision object and one or more distributed policy enforcement objects. In some examples, the distributed policy decision object generates control policy evaluation responses in response to control policy evaluation requests. Additional example embodiments provide, such as but not limited to, example methods for generating policy information objects.

17 Claims, 21 Drawing Sheets

METHODS, APPARATUSES AND COMPUTER PROGRAM PRODUCTS FOR IMPLEMENTING UNIFIED DATA CONTROL POLICY IN DISTRIBUTED AND PRODUCT-ORIENTED COMPUTING PLATFORMS

BACKGROUND

Applicant has identified many technical deficiencies and problems associated with implementing data control policies in complex network computer systems.

BRIEF SUMMARY

In general, embodiments of the present disclosure provide methods, apparatus, systems, computing devices, and/or the like for implementing unified data policies in complex network computer systems.

In accordance with various embodiments of the present disclosure, an apparatus for implementing unified data control policies in a distributed and product-oriented computing platform that comprises a plurality of distributed data service clusters and a centralized policy information repository is provided. In some embodiments, the apparatus comprising at least one processor and at least one non-transitory memory comprising program code. In some embodiments, the at least one non-transitory memory and the program code are configured to, with the at least one processor, cause the apparatus to at least: receive a data object service request associated with a distributed data service cluster of the plurality of distributed data service clusters, wherein the distributed data service cluster is associated with a distributed policy decision object and one or more distributed policy enforcement objects; transmit a control policy evaluation request based at least in part on the data object service request to the distributed policy decision object, wherein the distributed policy decision object comprises a plurality of replicated policy information objects that are distributed from the centralized policy information repository; receive a control policy evaluation response from the distributed policy decision object, wherein the control policy evaluation response indicates at least one replicated policy information object from the plurality of replicated policy information objects based at least in part on the data object service request; and generate a data object service response based at least in part on the control policy evaluation response, wherein the data object service response comprises one or more of data permission metadata, data routing metadata, data transformation metadata, or data filter metadata.

In some embodiments, the data object service response comprises the data permission metadata. In some embodiments, the data permission metadata comprises one of an allowance indication, a denial indication, or an additional information request indication.

In some embodiments, the data object service response comprises the data routing metadata. In some embodiments, the data routing metadata comprises a network address indication.

In some embodiments, the data object service response comprises the data transformation metadata. In some embodiments, the data transformation metadata comprises a data encryption indication.

In some embodiments, the data object service response comprises the data filter metadata. In some embodiments, the data filter metadata comprises a data filter indication.

In some embodiments, prior to receiving the data object service request, the at least one non-transitory memory and the program code are configured to, with the at least one processor, cause the apparatus to: receive a data control policy generation request from a first user computing device associated with a first user profile; generate a policy information object based at least in part on the data control policy generation request and the first user profile, wherein the policy information object comprises policy application metadata and policy control metadata; store the policy information object in the centralized policy information repository; and distribute the policy information object to the distributed policy decision object as a replicated policy information object of the plurality of replicated policy information objects.

In some embodiments, when generating the policy information object, the at least one non-transitory memory and the program code are configured to, with the at least one processor, cause the apparatus to: determine that the data control policy generation request comprises a platform-wide policy indication and a plurality of internal staff identifiers; and generate the policy application metadata that comprises a platform-wide application indication.

In some embodiments, the data control policy generation request indicates a data access peer review policy associated with the plurality of internal staff identifiers, wherein the policy control metadata comprises a data access peer review indication associated with the plurality of internal staff identifiers.

In some embodiments, the at least one non-transitory memory and the program code are configured to, with the at least one processor, cause the apparatus to: receive a second data object service request indicating a data object access request from a second user computing device associated with a second user profile; determine that the second user profile is associated with an internal staff identifier from the plurality of internal staff identifiers associated with the replicated policy information object; and generate the data object service response comprising the data routing metadata, wherein the data routing metadata comprises a network address indication associated with a second distributed data service cluster that provides a peer review service.

In some embodiments, when generating the policy information object, the at least one non-transitory memory and the program code are configured to, with the at least one processor, cause the apparatus to: determine that the data control policy generation request comprises an organization-specific policy indication; determine that the first user profile is associated with an external organization identifier and an admin user identifier; and generate the policy application metadata that comprises an organization-specific application indication associated with the external organization identifier.

In some embodiments, the data control policy generation request indicates a data access multi-factor authentication policy associated with the external organization identifier. In some embodiments, the policy control metadata comprises a data access multi-factor authentication indication associated with the external organization identifier.

In some embodiments, the data object service request indicates a data object access request associated with at least one data object. In some embodiments, the at least one data object is associated with the external organization identifier. In some embodiments, the at least one non-transitory memory and the program code are configured to, with the at least one processor, cause the apparatus to: generate the data object service response comprising the data permission metadata based on the data access multi-factor authentication policy.

In some embodiments, the data control policy generation request indicates a data access restriction policy associated with the external organization identifier. In some embodiments, the policy control metadata comprising a data access restriction indication associated with the external organization identifier.

In some embodiments, the data object service request indicates a data object access request associated with at least one data object. In some embodiments, the at least one data object is associated with the external organization identifier. In some embodiments, the at least one non-transitory memory and the program code are configured to, with the at least one processor, cause the apparatus to: generate the data object service response comprising the data permission metadata based on the data access restriction policy.

In some embodiments, the at least one non-transitory memory and the program code are configured to, with the at least one processor, cause the apparatus to: determine that the data control policy generation request comprises a product-specific policy indication associated with one or more product identifiers; and generate the policy application metadata comprising a product-specific application indication associated with the one or more product identifiers.

In some embodiments, the data control policy generation request indicates a data access restriction policy associated with the one or more product identifiers. In some embodiments, the policy control metadata comprises a data access restriction indication associated with the one or more product identifiers.

In some embodiments, the data object service request indicates a data object access request. In some embodiments, the distributed data service cluster is associated with at least one of the one or more product identifiers. In some embodiments, the at least one non-transitory memory and the program code are configured to, with the at least one processor, cause the apparatus to: generate the data object service response comprising the data permission metadata based on the data access restriction policy.

In accordance with various embodiments of the present disclosure, a computer-implemented method for implementing unified data control policies in a distributed and product-oriented computing platform that comprises a plurality of distributed data service clusters and a centralized policy information repository is provided. In some embodiments, the computer-implemented method comprising: receiving a data object service request associated with a distributed data service cluster of the plurality of distributed data service clusters, wherein the distributed data service cluster is associated with a distributed policy decision object and one or more distributed policy enforcement objects; transmitting a control policy evaluation request based at least in part on the data object service request to the distributed policy decision object, wherein the distributed policy decision object comprises a plurality of replicated policy information objects that are distributed from the centralized policy information repository; receiving a control policy evaluation response from the distributed policy decision object, wherein the control policy evaluation response indicates at least one replicated policy information object from the plurality of replicated policy information objects based at least in part on the data object service request; and generating a data object service response based at least in part on the control policy evaluation response, wherein the data object service response comprises one or more of data permission metadata, data routing metadata, data transformation metadata, or data filter metadata.

In accordance with various embodiments of the present disclosure, a computer program product for implementing unified data control policies in a distributed and product-oriented computing platform that comprises a plurality of distributed data service clusters and a centralized policy information repository is provided. In some embodiments, the computer program product comprises at least one non-transitory computer-readable storage medium having computer-readable program code portions stored therein. In some embodiments, the computer-readable program code portions comprise an executable portion configured to: receive a data object service request associated with a distributed data service cluster of the plurality of distributed data service clusters, wherein the distributed data service cluster is associated with a distributed policy decision object and one or more distributed policy enforcement objects; transmit a control policy evaluation request based at least in part on the data object service request to the distributed policy decision object, wherein the distributed policy decision object comprises a plurality of replicated policy information objects that are distributed from the centralized policy information repository; receive a control policy evaluation response from the distributed policy decision object, wherein the control policy evaluation response indicates at least one replicated policy information object from the plurality of replicated policy information objects based at least in part on the data object service request; and generate a data object service response based at least in part on the control policy evaluation response, wherein the data object service response comprises one or more of data permission metadata, data routing metadata, data transformation metadata, or data filter metadata.

BRIEF DESCRIPTION OF THE DRAWINGS

Figure 1:
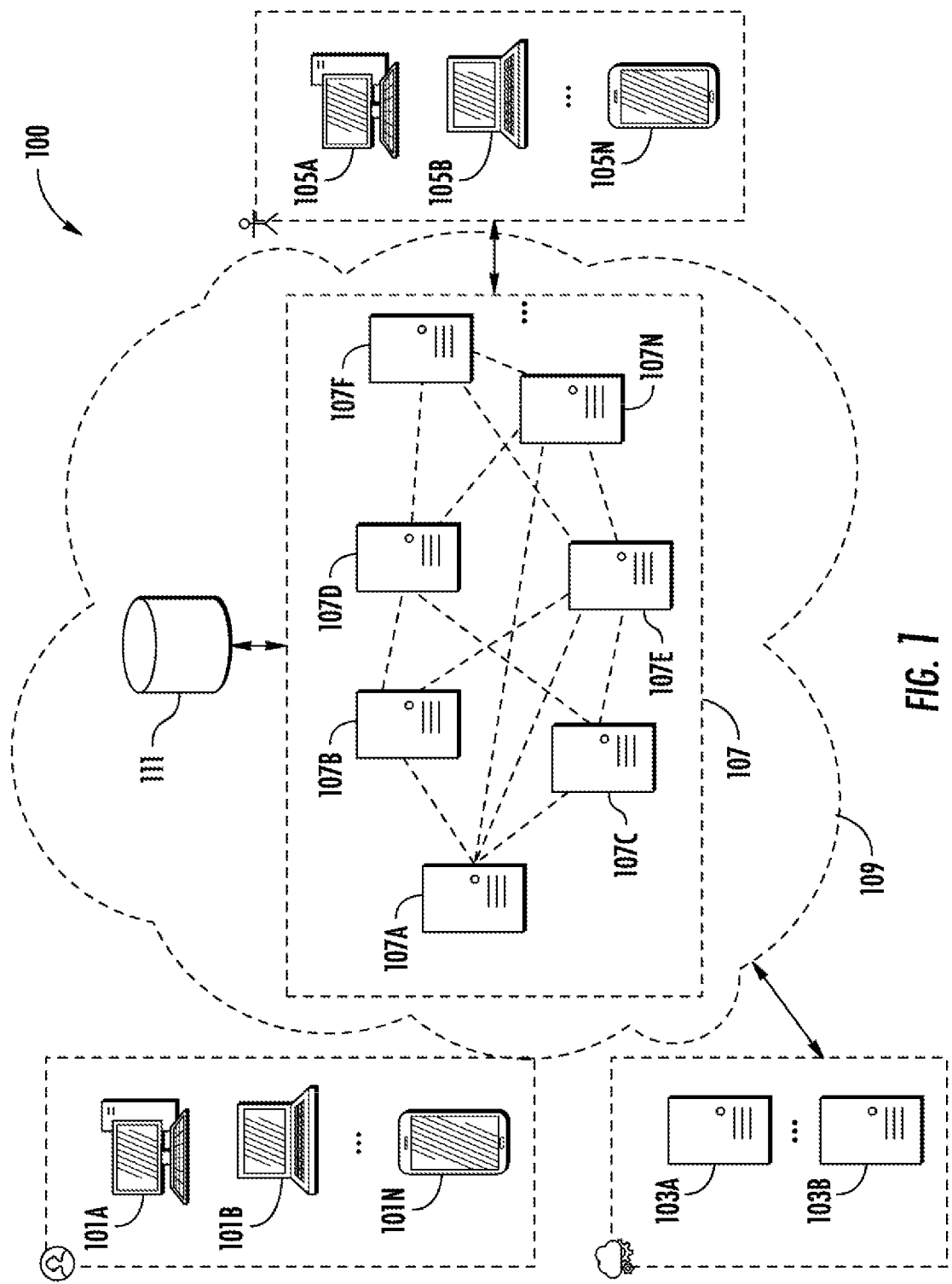
Figure 2:
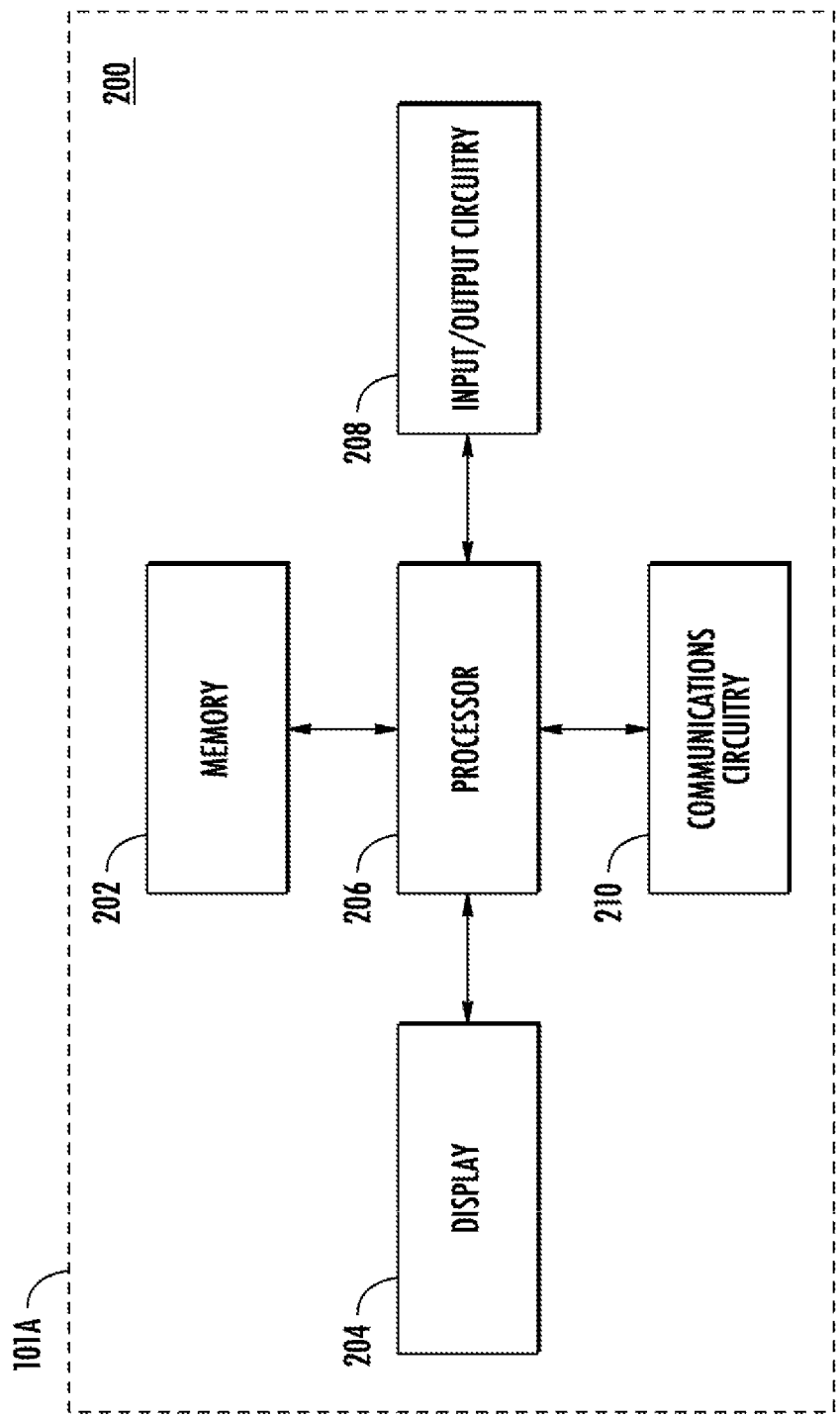
Figure 3:
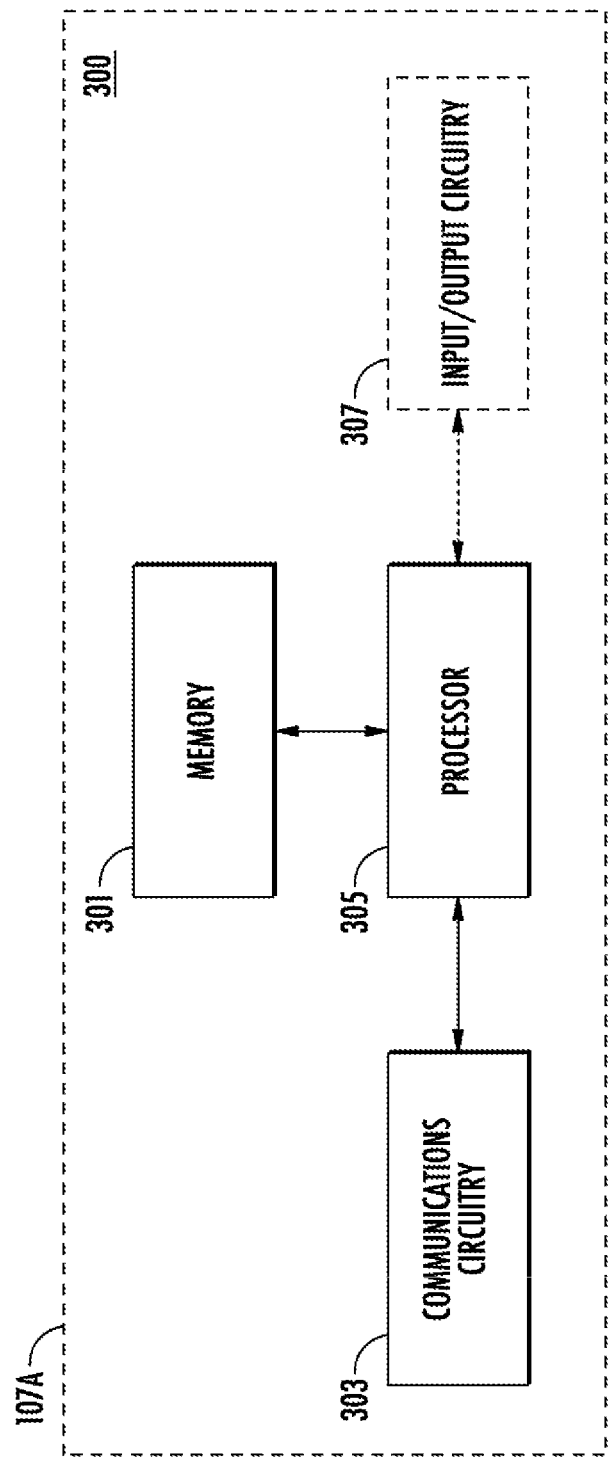
Figure 4:
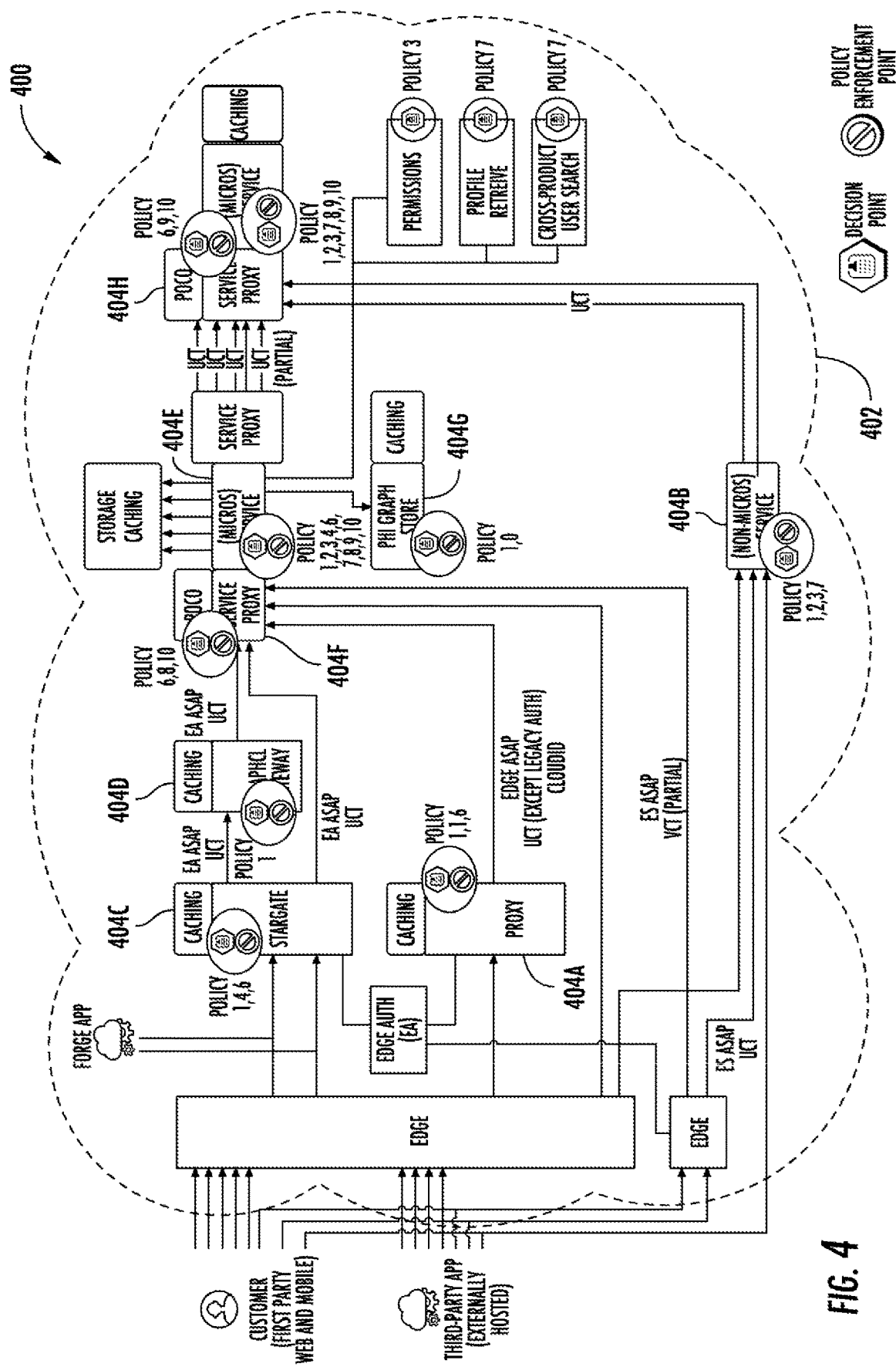
Figure 5:
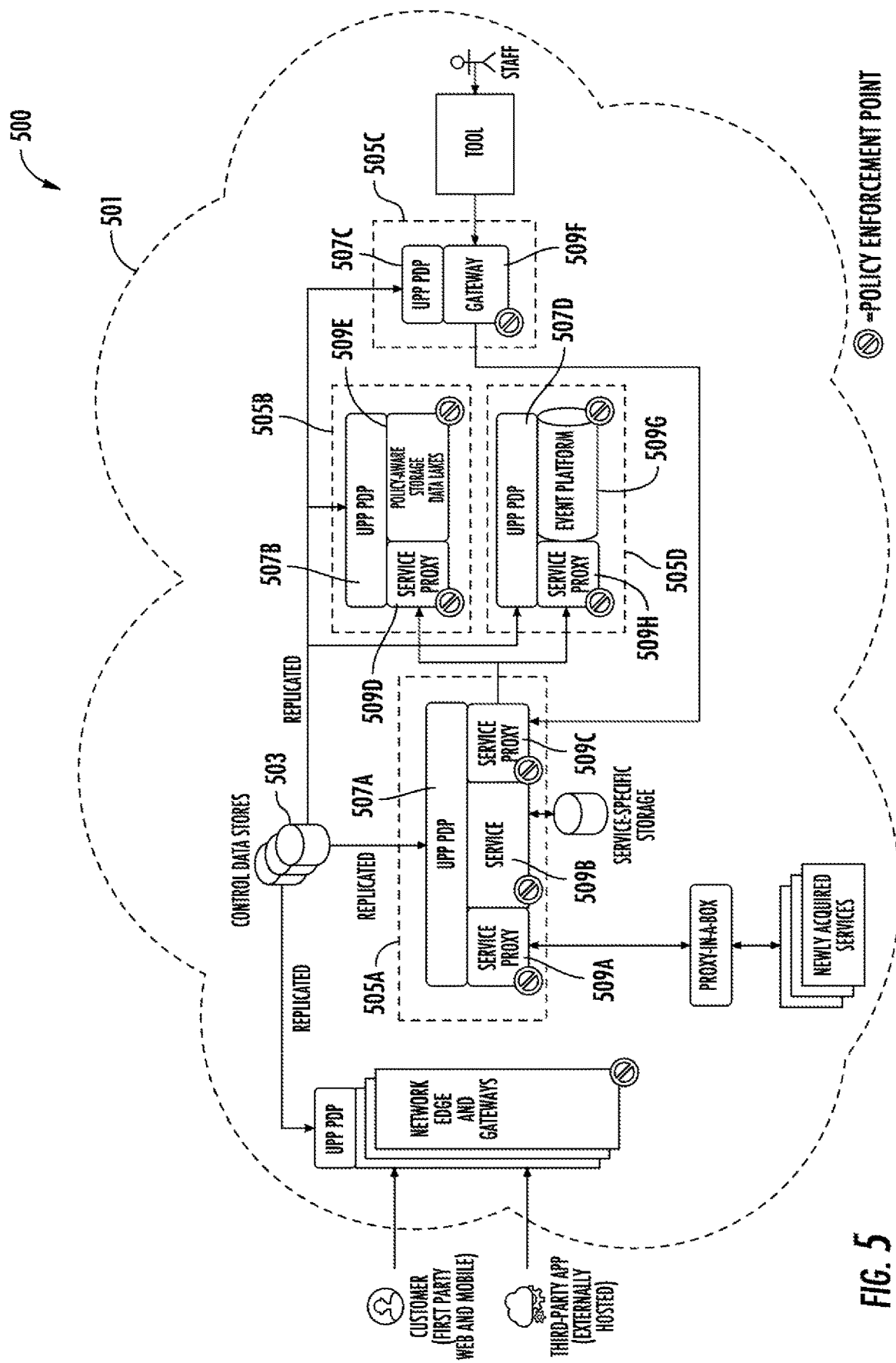
Figure 6:
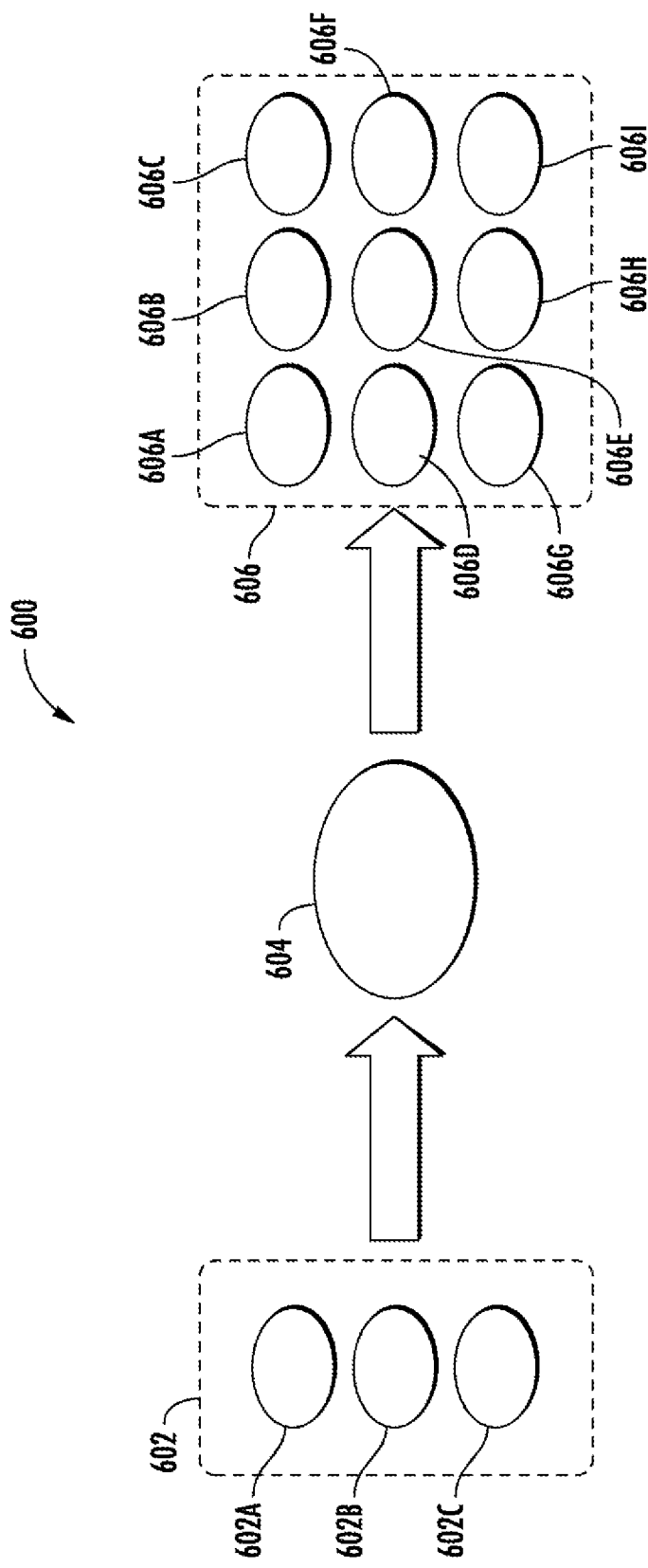
Figure 7:
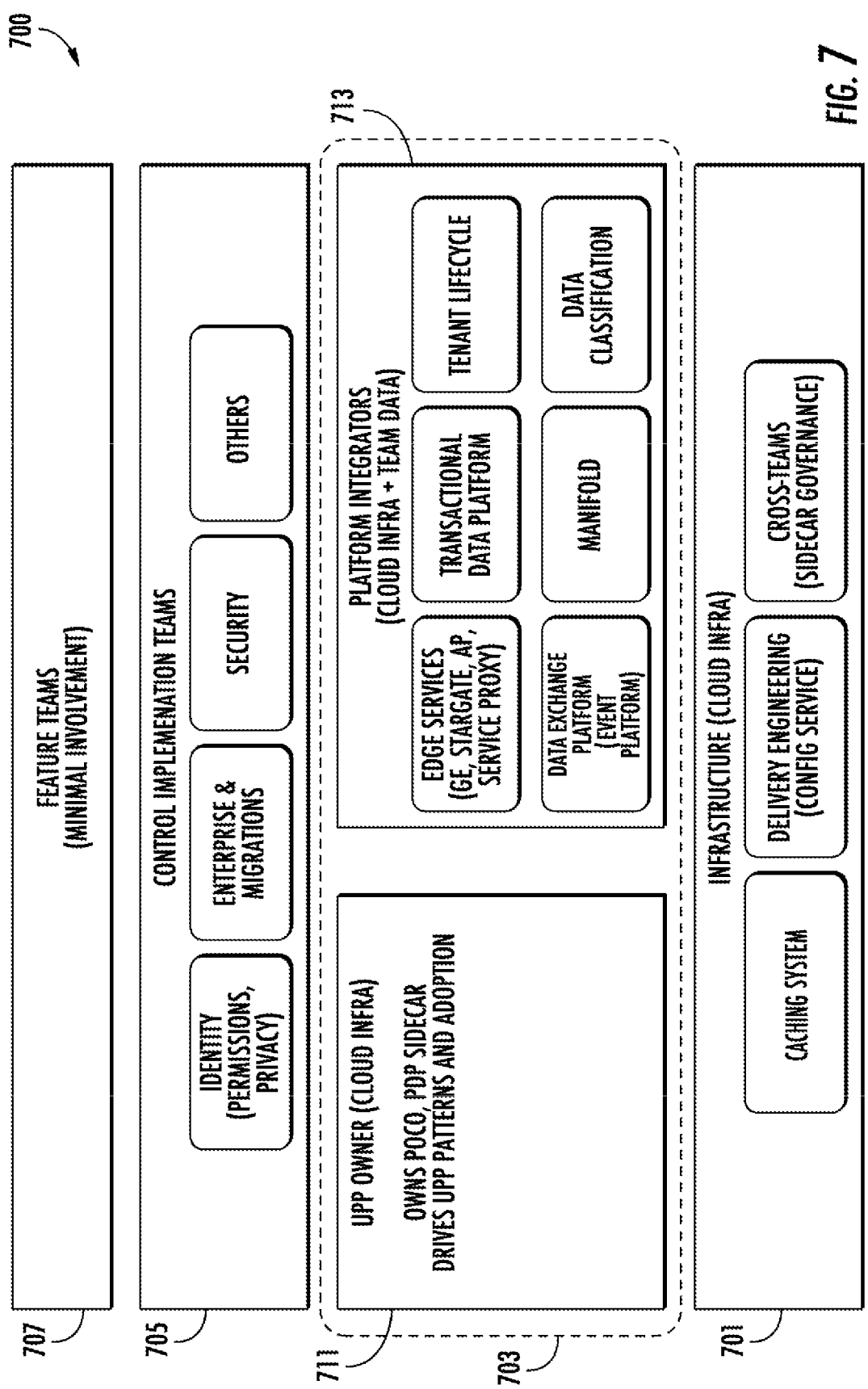
Figure 8:
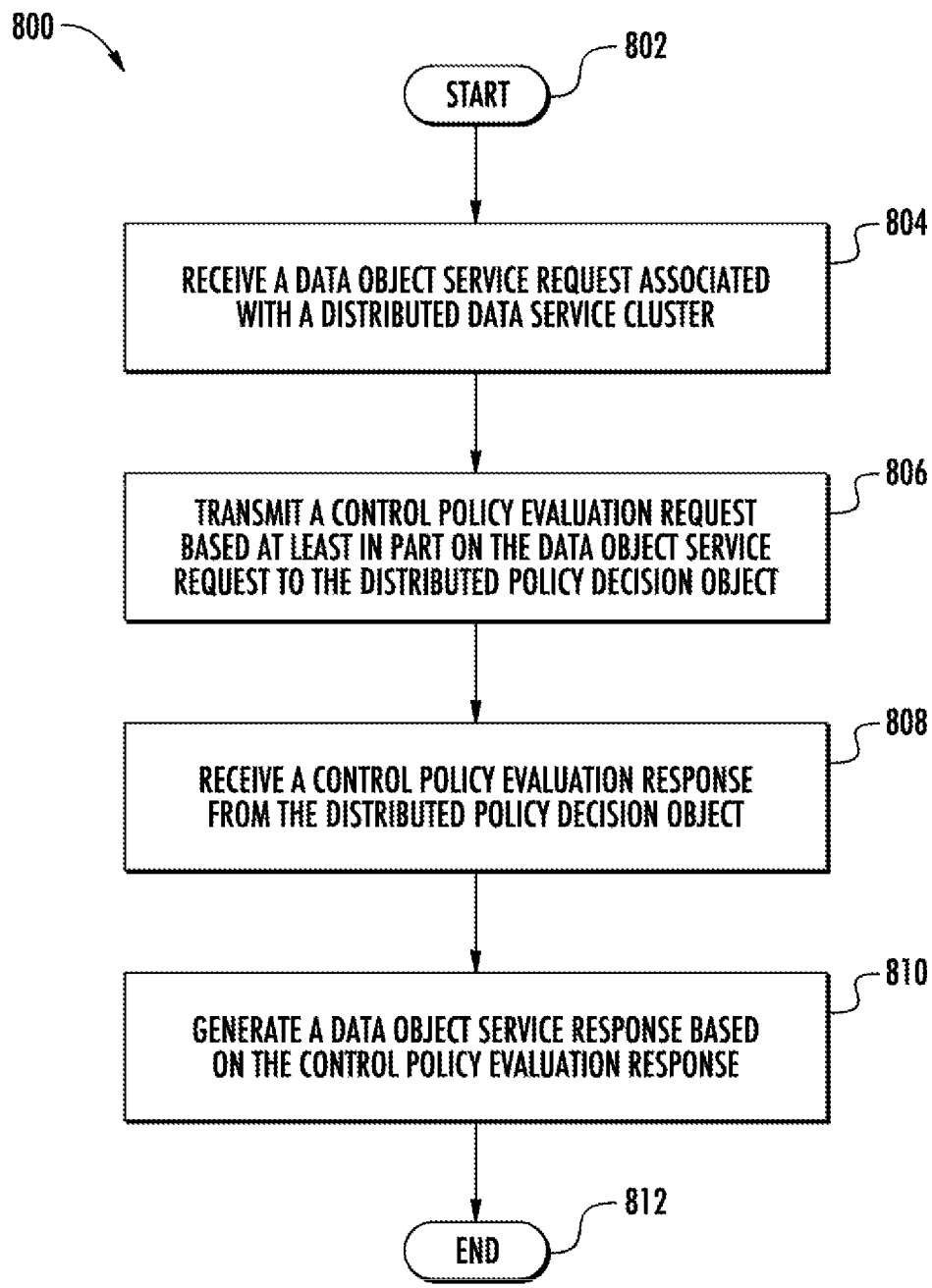
Figure 9:
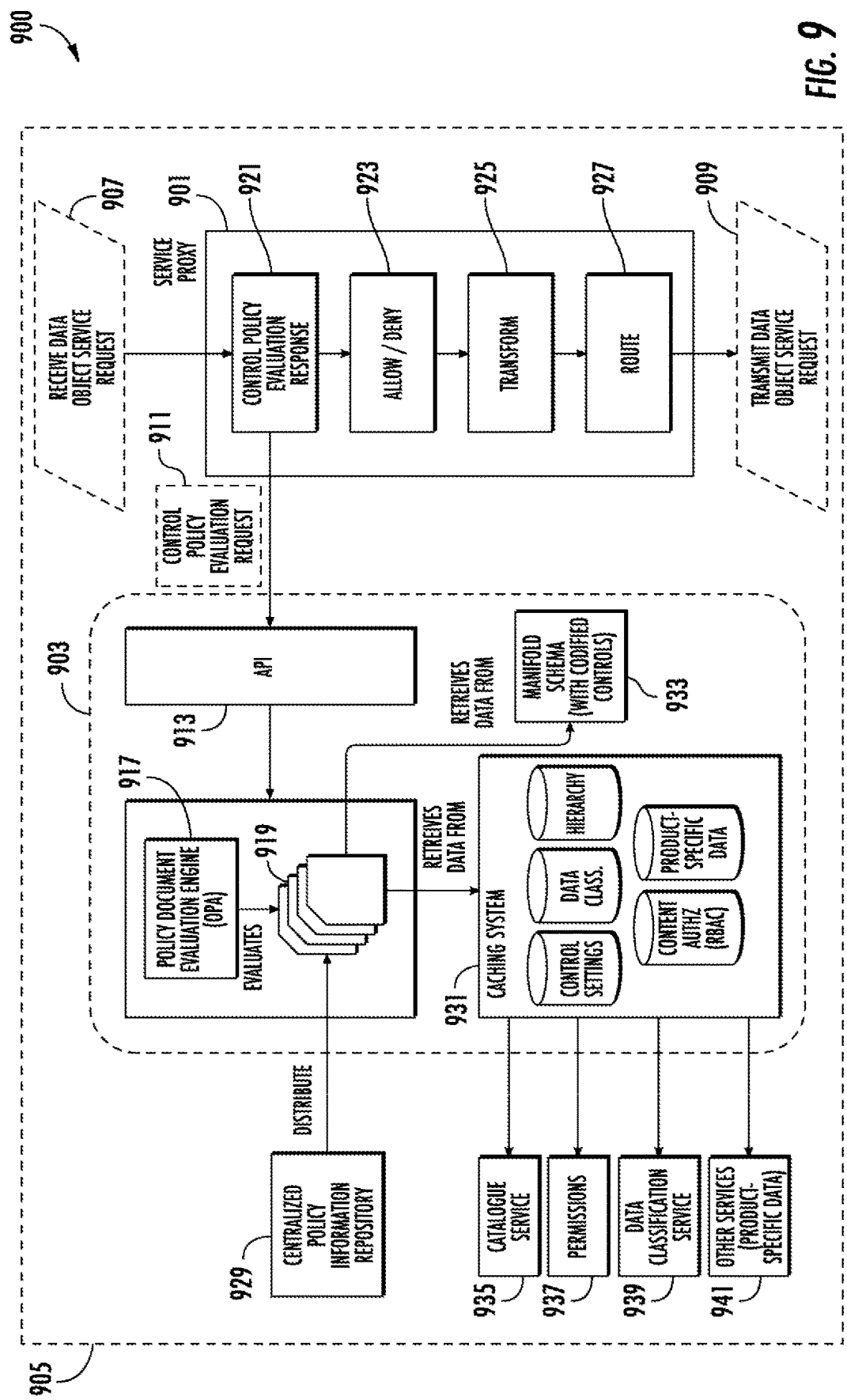
Figure 10:
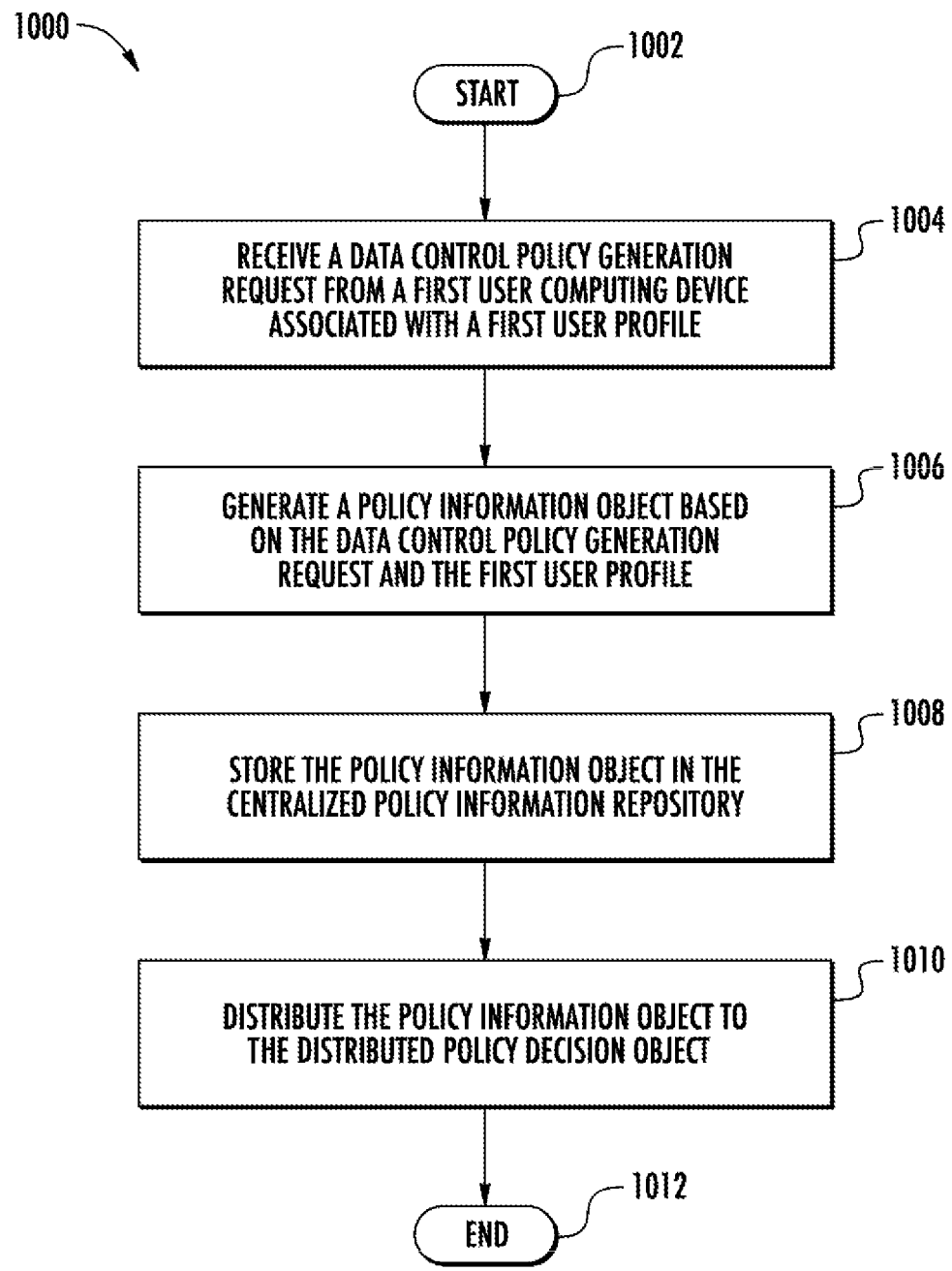
Figure 11:
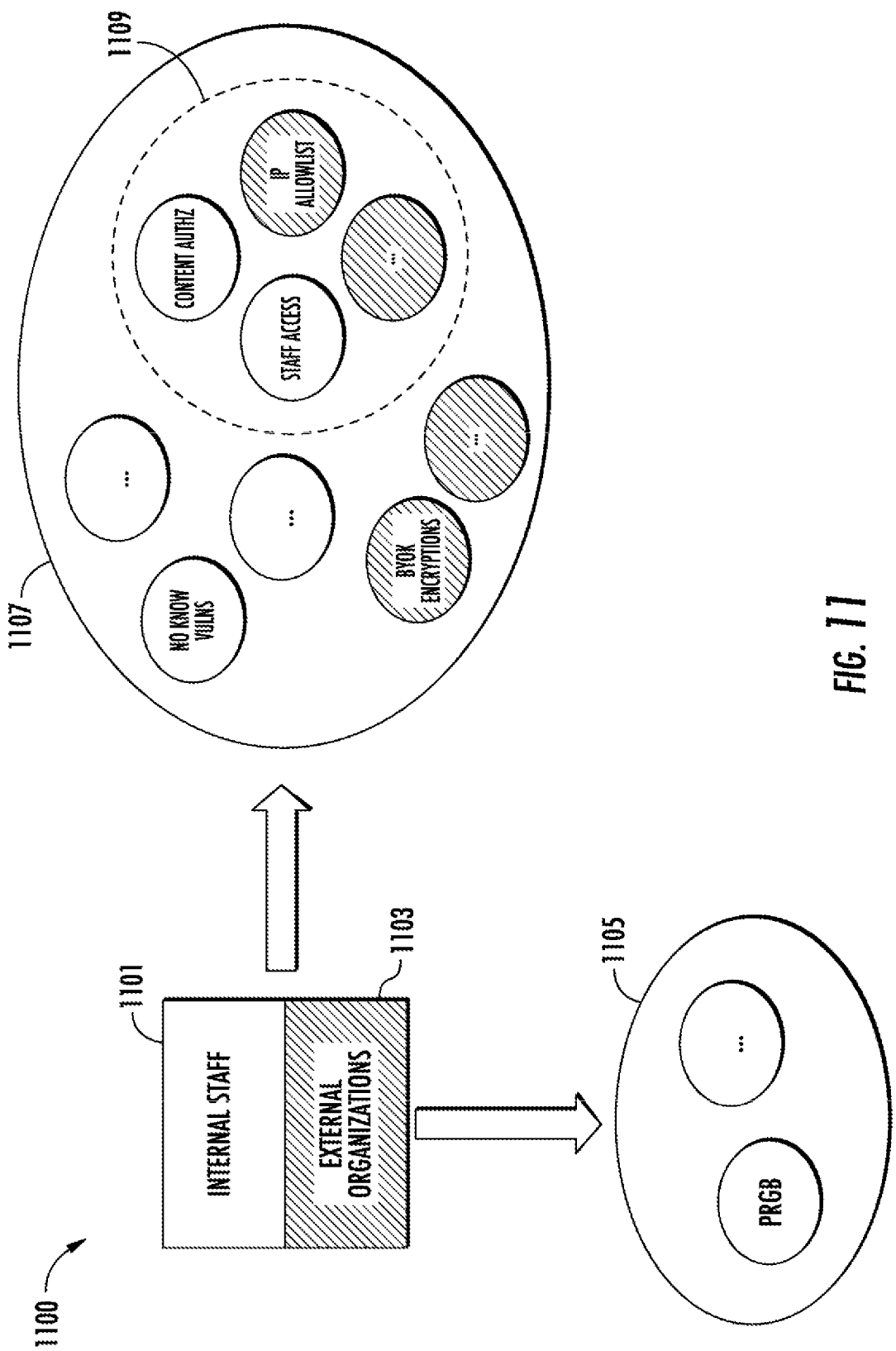
Figure 12:
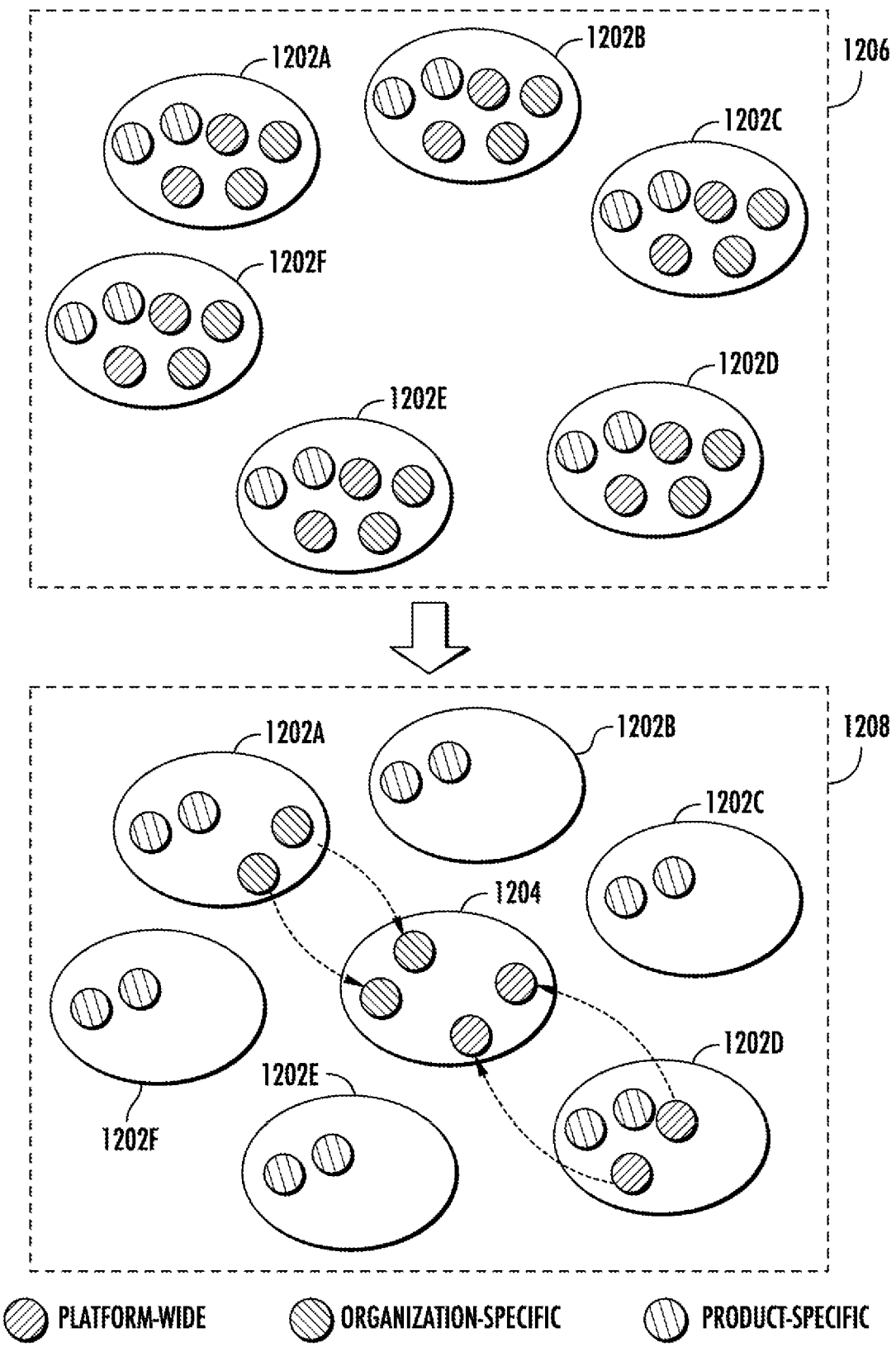
Figure 13:
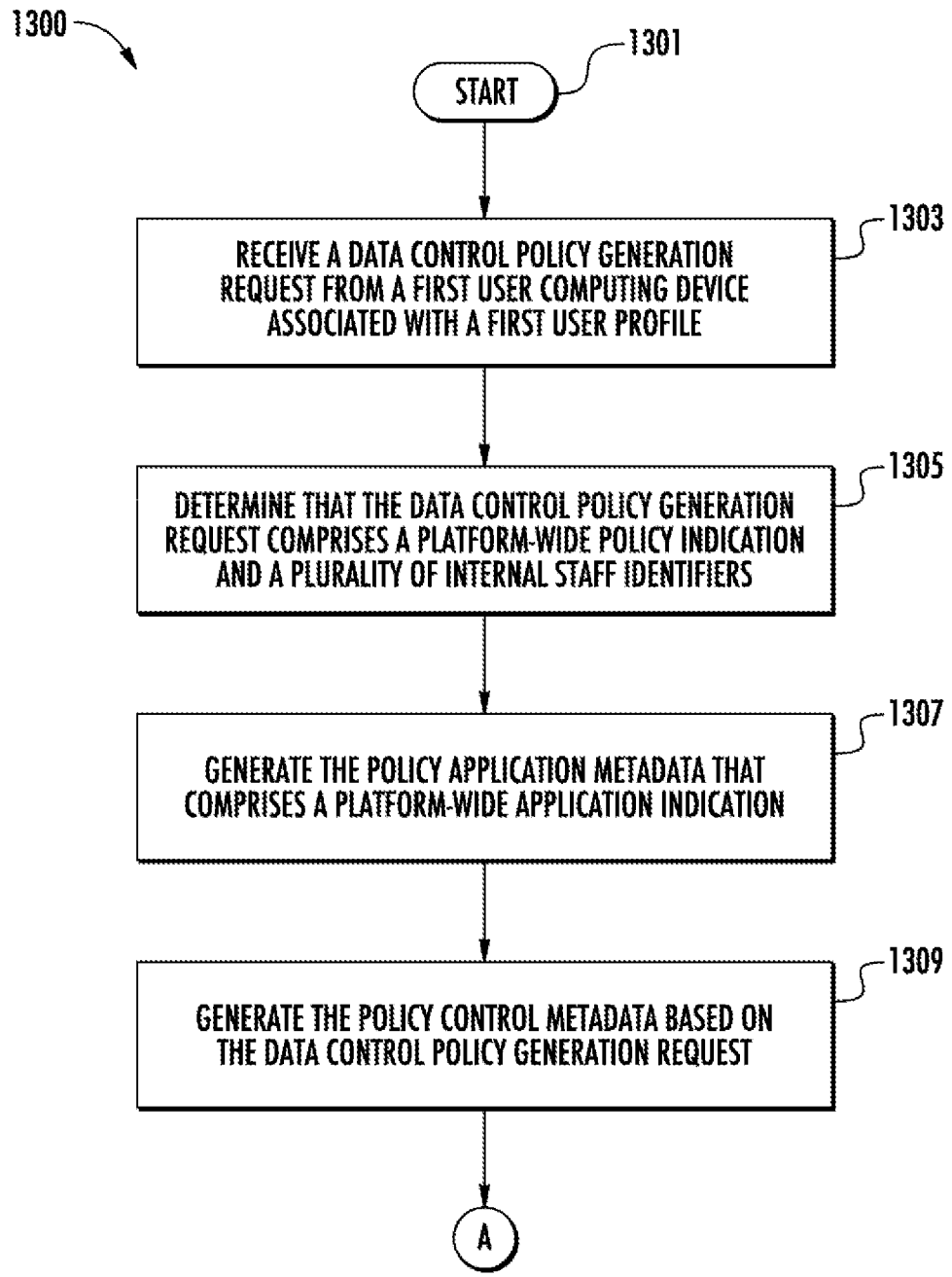
Figure 14:
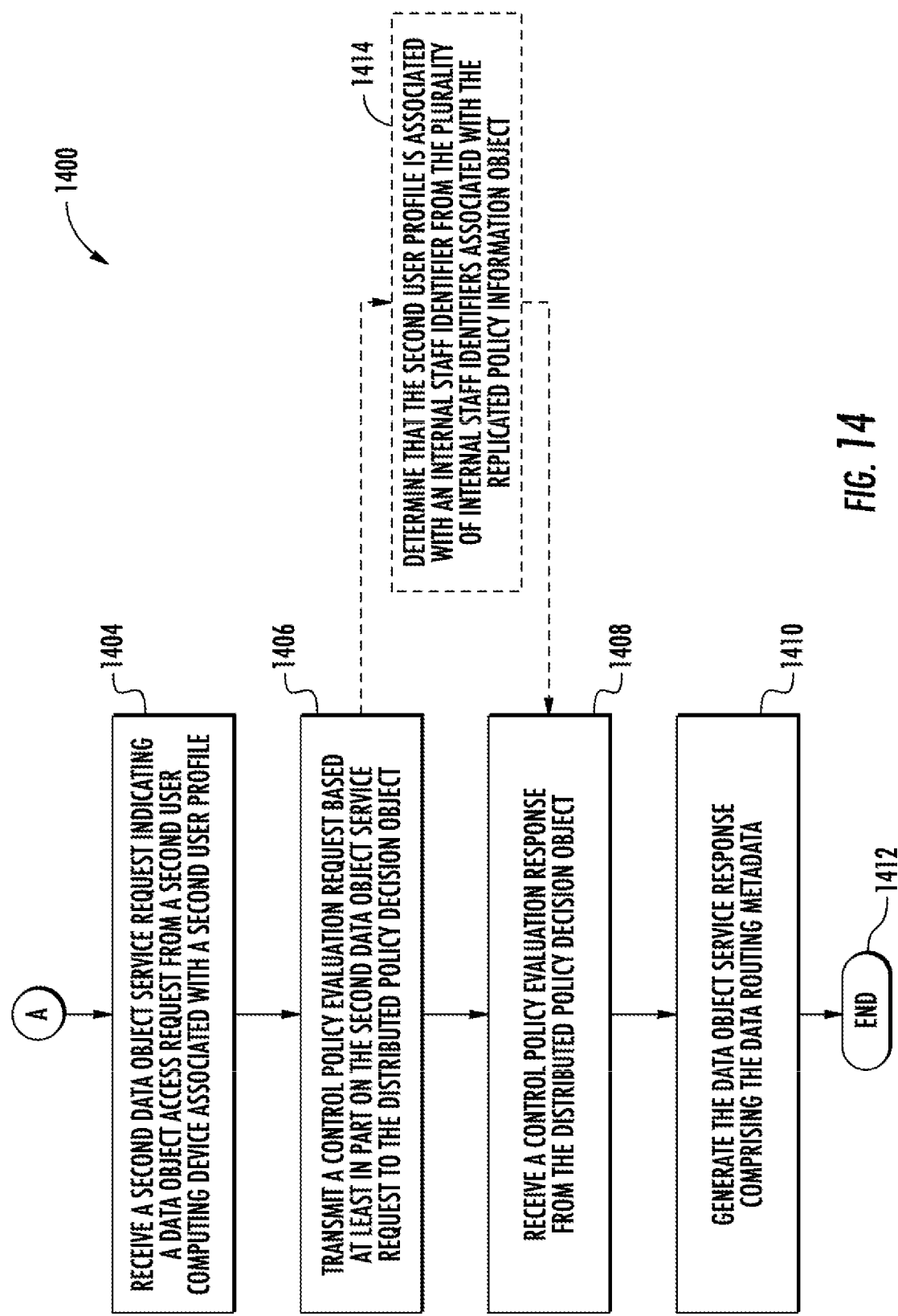
Figure 15:
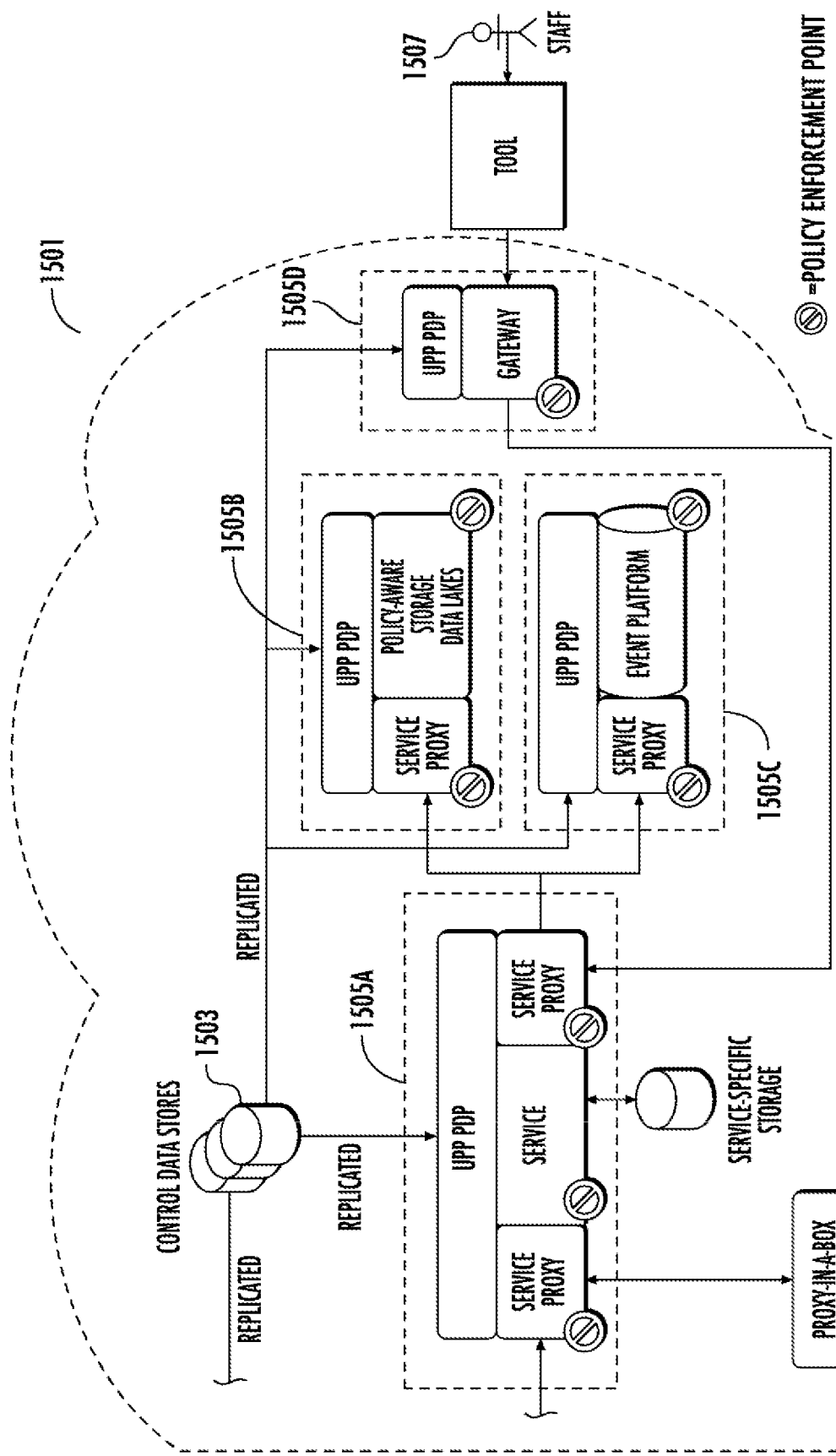
Figure 16:
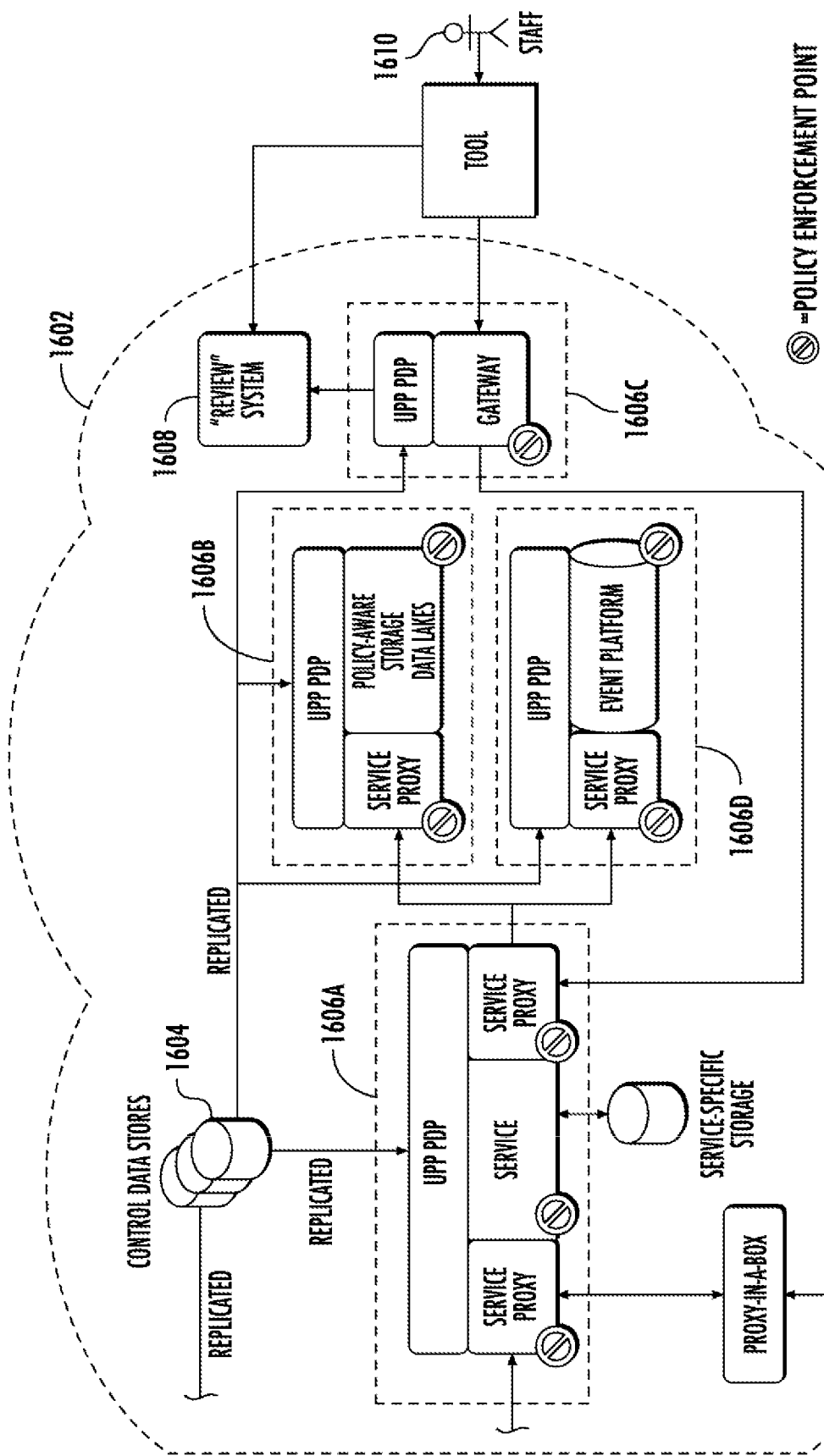
Figure 17:
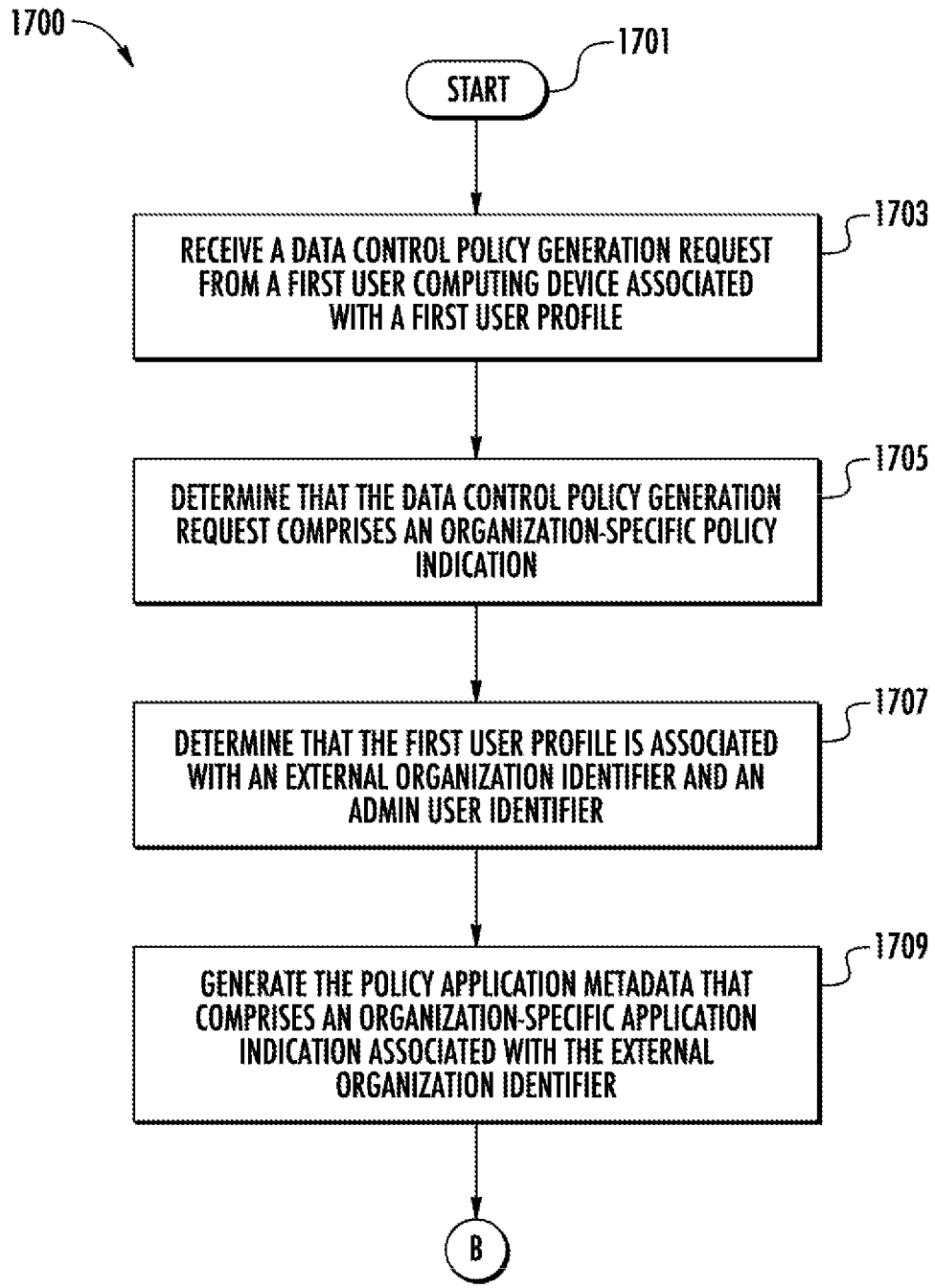
Figure 18:
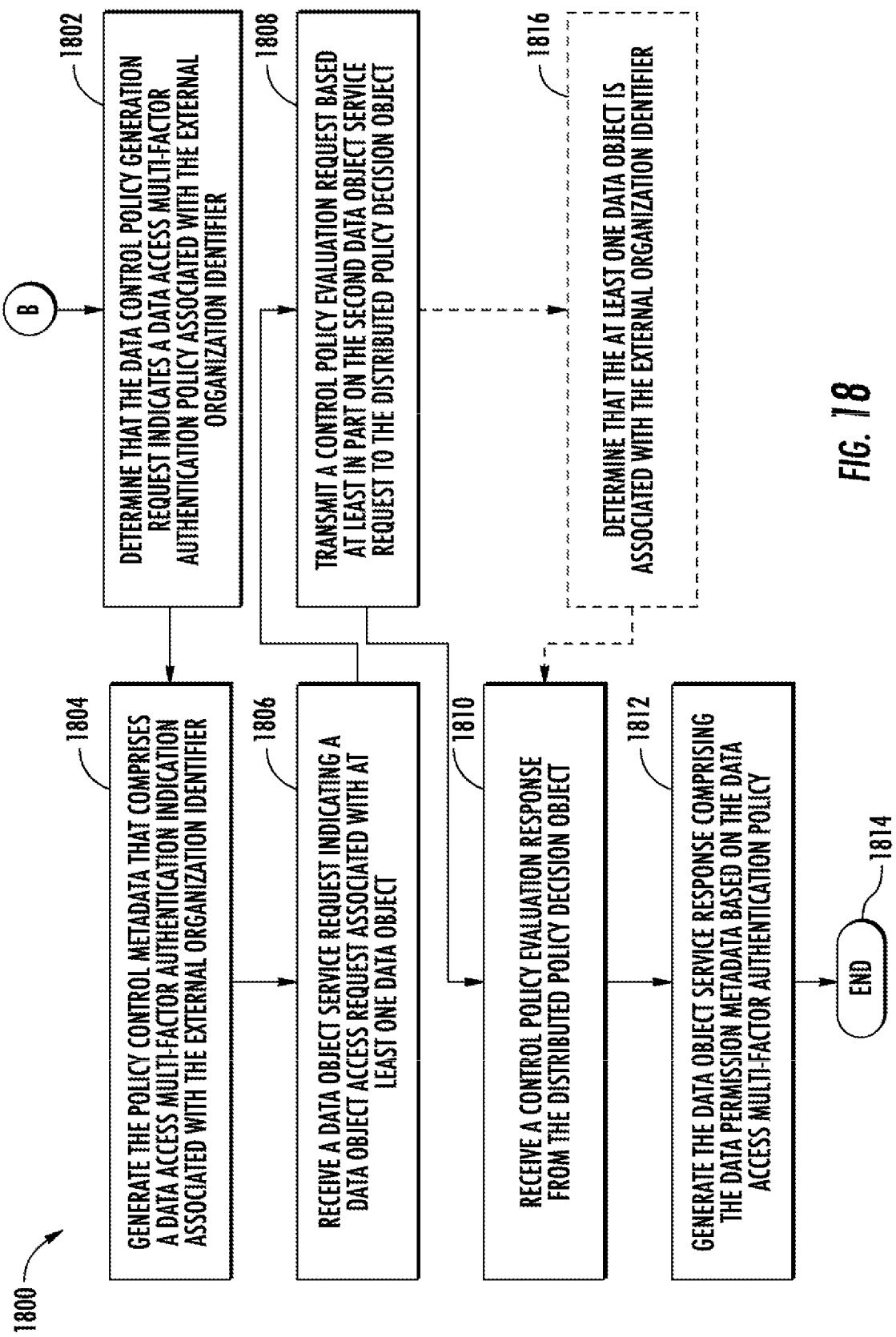
Figure 19:
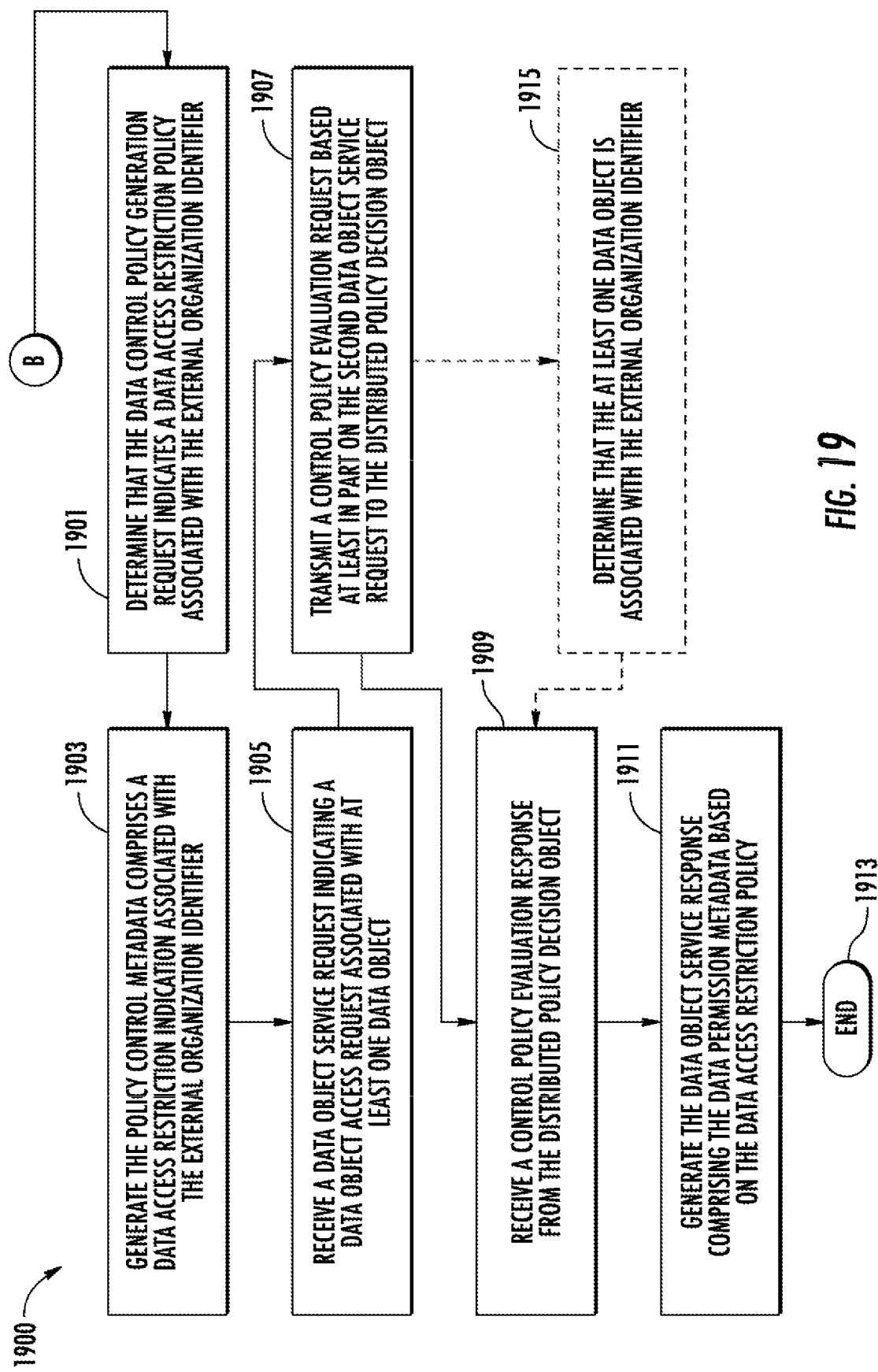
Figure 20:
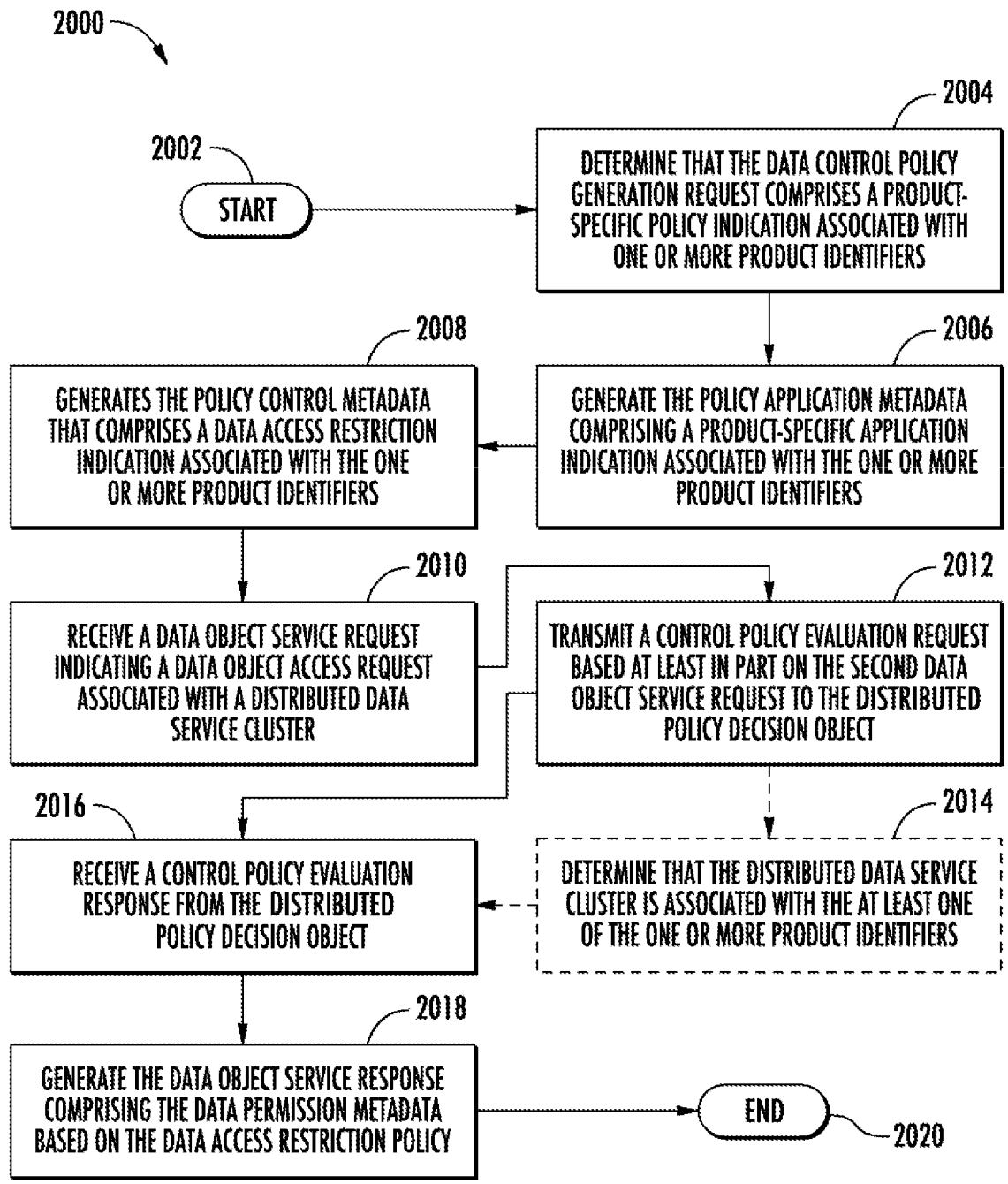
Figure 21:
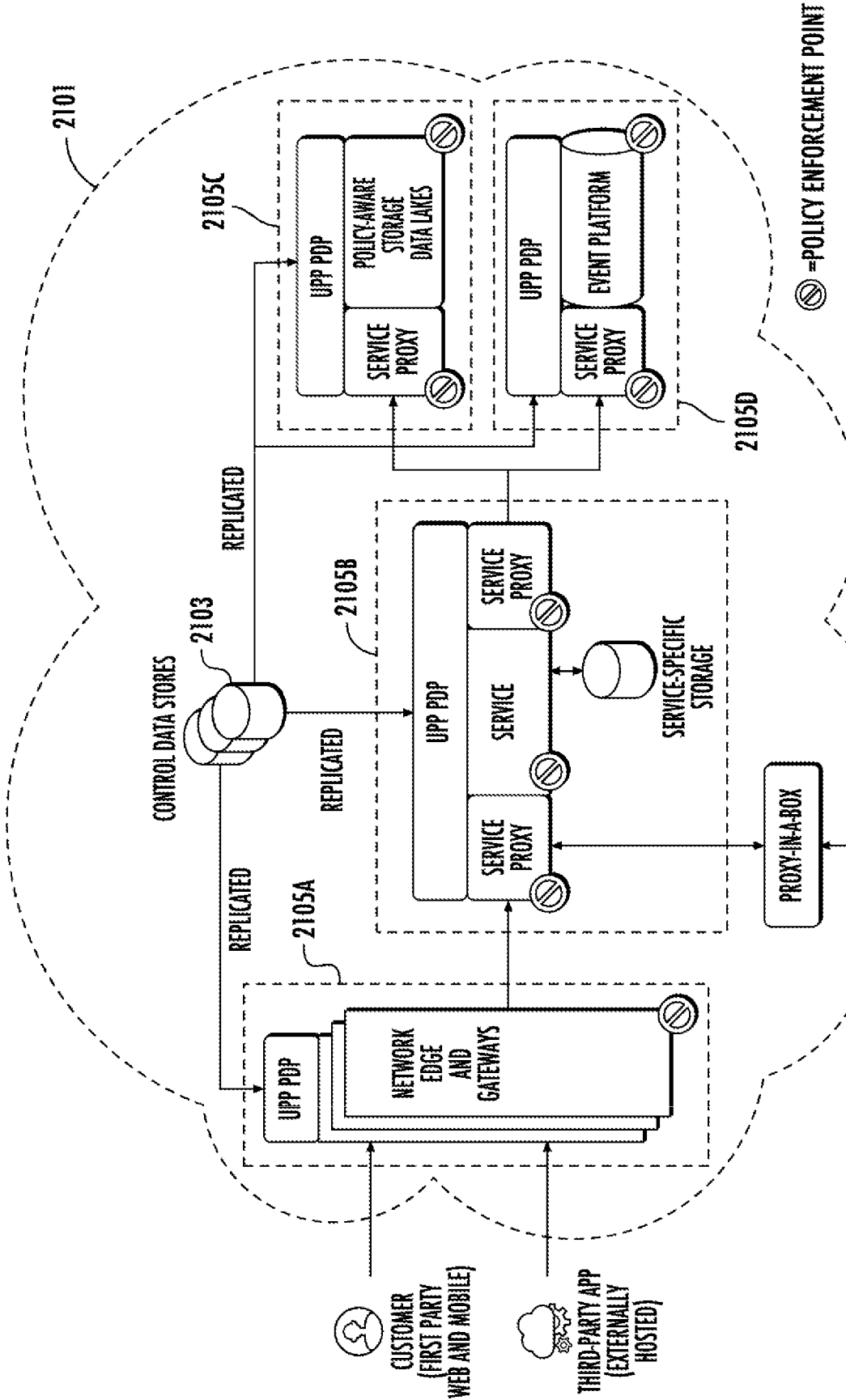

Having thus described some embodiments in general terms, references will now be made to the accompanying drawings, which are not necessarily drawn to scale, and wherein:

FIG. 1 is an example system architecture diagram illustrating an example distributed and product-oriented computing platform in communication with other devices (such as, but not limited to, user computing devices associated with user entities) in accordance with some embodiments of the present disclosure;

FIG. 2 is an example infrastructure diagram illustrating an example user computing device in accordance with some embodiments of the present disclosure;

FIG. 3 is an example infrastructure diagram illustrating an example distributed computing server in accordance with some embodiments of the present disclosure;

FIG. 4 is an example system schematic diagram illustrating an example distributed computing platform;

FIG. 5 is an example system schematic diagram illustrating an example distributed and product-oriented computing platform in accordance with some embodiments of the present disclosure;

FIG. 6 is an example block diagram illustrating example policy information objects, an example distributed policy decision object and example distributed policy enforcement objects;

FIG. 7 is an example system layer diagram of an example distributed and product-oriented computing platform in accordance with some embodiments of the present disclosure;

FIG. 8 is an example flowchart illustrating an example method for generating an example data object service response based on an example control policy evaluation response in accordance with some embodiments of the present disclosure;

FIG. 9 illustrates example data flows between an example distributed policy enforcement object and an example distributed policy decision object in accordance with some embodiments of the present disclosure;

FIG. 10 is an example flowchart illustrating an example method for generating an example policy information object based on an example data control policy generation request in accordance with some embodiments of the present disclosure;

FIG. 11 is an example block diagram illustrating example implementations of data control policies from user entities of the distributed and product-oriented computing platform in accordance with some embodiments of the present disclosure;

FIG. 12 is an example block diagram illustrating an example formation of an example centralized policy information repository in accordance with some embodiments of the present disclosure;

FIG. 13 is an example flowchart illustrating an example method for generating an example policy information object based on an example data control policy generation request in accordance with some embodiments of the present disclosure;

FIG. 14 is an example flowchart illustrating an example method for generating an example data object service response comprising example data routing metadata in accordance with some embodiments of the present disclosure;

FIG. 15 is an example system schematic diagram illustrating at least an example portion of an example distributed and product-oriented computing platform in accordance with some embodiments of the present disclosure;

FIG. 16 is an example system schematic diagram illustrating at least an example portion of an example distributed and product-oriented computing platform in accordance with some embodiments of the present disclosure;

FIG. 17 is an example flowchart illustrating an example method for generating an example policy information object based on an example data control policy generation request in accordance with some embodiments of the present disclosure;

FIG. 18 is an example flowchart illustrating an example method for generating an example data object service response comprising example data permission metadata based on an example data access multi-factor authentication policy in accordance with some embodiments of the present disclosure;

FIG. 19 is an example flowchart illustrating an example method for generating an example data object service response comprising example data permission metadata based on an example data access restriction policy in accordance with some embodiments of the present disclosure;

FIG. 20 is an example flowchart illustrating an example method for generating an example data object service response comprising example data permission metadata based on an example data access restriction policy in accordance with some embodiments of the present disclosure; and FIG. 21 is an example system schematic diagram illustrating at least an example portion of an example distributed and product-oriented computing platform in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to implementing unified data policies between and among distributed data service clusters in distributed and product-oriented computing platforms. For example, an example distributed and product-oriented computing platform in accordance with various embodiments of the present disclosure may comprise a plurality of example distributed data service clusters and an example centralized policy information repository. In some embodiments, an example distributed data service cluster may receive example data object service requests and may transmit example control policy evaluation requests to an example distributed policy decision object that is in data communications with the example centralized policy information repository. In some embodiments, the example distributed policy decision object may transmit example control policy evaluation responses to the example distributed data service cluster, and the example distributed data service cluster may generate example data object service responses based on the example control policy evaluation responses.

In the present disclosure, the term "distributed computing platform" or "distributed computing network" refers to a computing platform or network where software components (such as, but not limited to, program codes, data objects, and/or the like) are stored on, processed by, and/or transmitted between multiple, different hardware components that are in data communications with one another. Example hardware components in an example distributed computing platform include, but not limited to, one or more computing servers (such as, but not limited to, mainframes, workstations, and/or the like), one or more data repositories (such as, but not limited to, databases, data stores, and/or the like), one or more central processing units (CPUs), one or more memory units (such as, but not limited to, random-access memories, hard disk drives, and/or the like), one or more relays, one or more routers, and/or the like.

In some embodiments, example hardware components in an example distributed computing platform can be physically close to one another and connected to one another by a local area network. In some embodiments, example hardware components in an example distributed computing platform can be geographically distant from one another and connected to one another by a wide area network (such as, but not limited to, the Internet).

In some embodiments, components of an example distributed computing platform are organized and grouped into distributed data service clusters that are in data communications with one another. In the present disclosure, the term "distributed data service cluster" refers to an organized set of one or more software components (such as, but not limited to, program codes, data objects, and/or the like) and one or more hardware components (such as, but not limited to, one or more computing servers, one or more data object repositories, and/or the like), where the one or more hardware components execute and/or carry out the one or more software components to provide one or more data services (for example, but not limited to, accessing data objects, generating data objects, routing data objects, processing data objects, transforming data objects, storing data objects, and/or the like) for the example distributed computing platform.

In some embodiments, a distributed computing platform can be product oriented. In the present disclosure, the term "distributed and product-oriented computing platform" refers to a type of distributed computing platform that provides one or more cloud-based software products. Similar to those described above, a distributed and product-oriented computing platform in accordance with some embodiments of the present disclosure also comprises a plurality of distributed data service clusters that provide one or more data services.

In some embodiments, an example distributed and product-oriented computing platform groups, arranges and/or organizes distributed data service clusters based on the one or more cloud-based software products that are provided by the example distributed and product-oriented computing platform, such that each distributed data service cluster provides one or more data services to one or more cloud-based software products that are provided by the example distributed and product-oriented computing platform.

For example, an example distributed and product-oriented computing platform may provide cloud-based software products that include, but not limited to, a project and issue tracking software product (such as, but not limited to, Jira®), a document collaboration software product (such as, but not limited to, Confluence®), a code management software product (such as, but not limited to, Bitbucket®), and/or the like. In some embodiments, each of the cloud-based software products may be associated with one or more distributed data service clusters. For example, one or more distributed data service clusters generate data objects for one or more cloud-based software products that are provided by the example distributed and product-oriented computing platform, one or more distributed data service clusters process data objects for one or more cloud-based software products that are provided by the example distributed and product-oriented computing platform, one or more distributed data service clusters transform data objects for one or more cloud-based software products that are provided by the example distributed and product-oriented computing platform, one or more distributed data service clusters store data objects for one or more cloud-based software products that are provided by the example distributed and product-oriented computing platform, one or more distributed data service clusters transmit data objects for one or more cloud-based software products that are provided by the distributed and product-oriented computing platform, and/or the like.

As illustrated in the examples above, an example distributed and product-oriented computing platform may be hosted/provided by a development and collaboration software company (for example, Acme Corporation) that offers cloud-based software products. In some embodiments, user entities that access the example distributed and product-oriented computing platform may include, but not limited to, internal staffs, external organizations (for example, users within the external organizations), and/or the like.

In the present disclosure, the term "internal staff" refers to a type of user entity who is employed by the provider of the distributed and product-oriented computing platform to build, configure, maintain, and/or manage the distributed and product-oriented computing platform. Continuing from the Acme Corporation example described above, an example internal staff of the distributed and product-oriented computing platform may include, but not limited to, a software engineer who is employed by Acme Corporation (i.e., the provider of the distributed and product-oriented computing platform) to build, configure, maintain, and/or manage the distributed and product-oriented computing platform. For example, an internal staff (for example, the software engineer) may build, configure, maintain, and/or manage one or more cloud-based software products and/or one or more distributed data service clusters for the distributed and product-oriented computing platform.

In the present disclosure, the term "external organization" refers to a type of user entity who purchases and/or subscribes to one or more of the cloud-based software products that are provided by the distributed and product-oriented computing platform. Continuing from the example described above, an external organization (for example, Brand Corporation) may purchase and/or subscribe to one or more cloud-based software products provided by Acme Corporation. For example, Brand Corporation may subscribe to the document collaboration software product provided by Acme Corporation through the distributed and product-oriented computing platform. In this example, Brand Corporation is an external organization of the distributed and product-oriented computing platform, and users employed by the Brand Corporation (such as, but not limited to, employees, contractors, and/or the like) may access the document collaboration software product through the distributed and product-oriented computing platform provided by the Acme Corporation.

In some embodiments, user entities of the distributed and product-oriented computing platform may access the cloud-based software product(s) through, such as, but not limited not, one or more web browser interfaces on one or more computing devices, one or more local software applications on one or more computing devices, one or more Application Programming Interface (API) requests, and/or the like.

As illustrated in the examples above, an example distributed and product-oriented computing platform in accordance with some embodiments of the present disclosure provides various cloud-based software products. Such cloud-based software products should not only be bug-free, performant and reliable, but also proactively and uniformly enforce data control policies as required by user entities of the distributed and product-oriented computing platform (such as, but not limited to, individual users, external organizations, and/or the like).

However, there are many technical challenges and difficulties associated with implementing unified data control policies in distributed and product-oriented computing platforms. In the present disclosure, the term "data control policy" refers to one or more rules, principles, and guidelines that define one or more areas of data management, such as, but not limited to, data governance, data restriction, data quality, data residency, data architecture, and/or the like.

It is technically challenging to implement unified data control policies in a distributed and product-oriented computing platform because the number of data control policies can increase exponentially over time due to, for example, but not limited to, regulations, market competitions, and/or the like.

As an example, the implementation of General Data Protection Regulation (GDPR) requires organizations to define and implement data privacy policies. When an external organization uses one or more cloud-based software products provided by a distributed and product-oriented computing platform, the distributed and product-oriented computing platform is required to implement such data privacy policies when performing data services for the external organization (for example, but not limited to, accessing data objects associated with the external organization, generating data objects associated with the external organization, processing data objects associated with the external organization, transforming data objects associated with the external organization, storing data objects associated with the external organization, routing data objects associated with the external organization, and/or the like).

As another example, more and more organizations are implementing data control policies in order to stand out from market competition. For example, as more and more organizations are implementing data control policies based on the Federal Risk and Authorization Management Program (FedRAMP), such data control policies are becoming commonplace among external organizations, compounding requirements for implementing data control policies for these external organizations in the distributed and product-oriented computing platform.

In addition, it is technically challenging to implement unified data control policies in a distributed and product-oriented computing platform with an increasing number of cloud-based software products, an increasing number of distributed data service clusters, and/or an increasing number of user entities (such as, but not limited to, internal staffs and/or external organizations) who access the distributed and product-oriented computing platform.

On one hand, as an example distributed and product-oriented computing platform develops and grows, more and more cloud-based software products and/or distributed data service clusters are added to the example distributed and product-oriented computing platform. As described above, different distributed data service clusters can provide data services to different cloud-based software products. Because different cloud-based software products can have different data control policies, it is technically challenging to ensure that each distributed data service cluster follows the correct data control policy or policies when providing data services to one or more cloud-based software products. When new cloud-based software products and/or distributed data service clusters are added to the distributed and product-oriented computing platform, it is technically challenging to ensure that that the new cloud-based software products are governed by the correct data control policies, and/or that the new distributed data service clusters follow the correct data control policies when providing data services to the new cloud-based software products.

On the other hand, as the example distributed and product-oriented computing platform develops and grows, more and more user entities (such as, but not limited to, internal staffs and/or external organizations) can gain access to the example distributed and product-oriented computing platform. Different user entities can have different data control policies, and it is technically challenging for the distributed and product-oriented computing platform to apply the correct data control policies when different user entities access the distributed and product-oriented computing platform. Continuing from the Acme Corporation example above, two different external organizations, Brand Corporation and Channel Communications, may subscribe to the document collaboration software product that is provided by the distributed and product-oriented computing platform. In such an example, Brand Corporation and Channel Communications may have different data control policies regarding data associated with the document collaboration software product. For example, Brand Corporation and Channel Communications may define different data control policies on who can access data that is generated by each respective organization through the document collaboration software product. As another example, Acme Corporation (i.e., the provider of the distributed and product-oriented computing platform) may implement one or more data control policies that are different from the data control policies defined by the Brand Corporation and Channel Communications. As illustrated in the examples above, the complex and different natures of user entities that access the distributed and product-oriented computing platform can cause technical challenges and difficulties in ensuring that the correct data control policies are applied.

Further, it is technically challenging to implement unified data control policies in a distributed and product-oriented computing platform because of the distributed computing nature of such a platform.

As described above, an example distributed and product-oriented computing platform may comprise a plurality of distributed data service clusters that provide data services for the cloud-based software products in the distributed and product-oriented computing platform. In some embodiments, one distributed data service cluster may provide data services to different cloud-based software products, and each cloud-based software product can be associated with a different data control policy. Additionally, or alternatively, one distributed data service cluster may provide data services to different external organizations, and each external organization may require a different data control policy. While the distributed computing nature of the distributed and product-oriented computing platform may provide scalability (for example, adding more distributed data service clusters if there is a higher computing demand), the distributed computing nature requires implementing distributed data service clusters, and it can be technically challenging to enforce unified data control policies among distributed data service clusters in an example distributed and product-oriented computing platform.

In contrast, various embodiments of the present disclosure overcome these technical challenges and difficulties and provide various technical improvements and benefits.

For example, various embodiments of the present disclosure provide a centralized policy information repository that is in data communications with the distributed data service clusters in an example distributed and product-oriented computing platform. In some embodiments, the centralized policy information repository stores policy information objects that define data control policies associated with the distributed and product-oriented computing platform. For example, such policy information objects include, but not limited to, data control policies associated with one or more user entities who access the distributed and product-oriented computing platform (such as, but not limited to, internal staff, external organizations, and/or the like), data control policies associated with one or more cloud-based software products that are provided by the distributed and product-oriented computing platform, and/or the like.

In some embodiments, each distributed data service cluster in the distributed and product-oriented computing platform comprises one distributed policy decision object and one or more distributed policy enforcement objects. In some embodiments, the centralized policy information repository is in data communications with the distributed policy decision object, such that policy information objects from the centralized policy information repository can be replicated and distributed to all the distributed policy decision objects of all the distributed data service clusters in the distributed and product-oriented computing platform.

In some embodiments, when the distributed data service cluster receives a data object service request, the distributed data service cluster transmits a control policy evaluation request to the distributed policy decision object. In some embodiments, the distributed policy decision object generates a control policy evaluation response based on whether there is any data control policy that is applicable to the data object service request. In some embodiments, the distributed data service cluster receives the control policy evaluation response, and the one or more distributed policy enforcement objects generate a data object service response based on the control policy evaluation response.

As illustrated in the examples above, various embodiments of the present disclosure overcome the technical challenges and difficulties in enforcing unified data control policies in a distributed and product-oriented computing platform.

For example, by implementing a centralized policy information repository in the distributed and product-oriented computing platform, various embodiments of the present disclosure overcome the technical challenges of implementing unified data control policies in a distributed and product-oriented computing platform due to the increasing number of data control policies. When there is a new data control policy that is added to the distributed and product-oriented computing platform, the distributed and product-oriented computing platform generates a policy information object and stores the policy information object in the centralized policy information repository. Subsequently, the centralized policy information repository distributes the policy information objects to distributed policy decision objects of distributed data service clusters in the distributed and product-oriented computing platform, such that each distributed data service cluster can receive the most up-to-date data policies associated with the distributed and product-oriented computing platform.

As another example, by implementing a distributed policy decision object in each distributed data service cluster, various embodiments of the present disclosure overcome technical challenges of implementing unified data control policies in a distributed and product-oriented computing platform due to an increasing number of cloud-based software products, an increasing number of distributed data service clusters, and/or an increasing number of user entities. For example, when a new user entity gains access to the distributed and product-oriented computing platform, the distributed policy decision objects of the distributed data service clusters can retrieve replicated policy information objects based on the policy information objects stored in the centralized policy information repository, such that any data policies associated with the new user entity can be implemented. As another example, policy information objects for data control policies that are specific and only applicable to one or more cloud-based software products can be stored in the centralized policy information repository and/or in the distributed policy decision objects of distributed data service clusters that provide data services to such one or more cloud-based software products, so that the product-specific data control policies can be enforced.

As another example, by implementing one or more distributed policy enforcement objects that are in data communications with the distributed policy decision object in each distributed data service cluster, various embodiments of the present disclosure overcome technical challenges of implementing unified data control policies in a distributed and product-oriented computing platform that are caused by the distributed computing nature of such a platform. For example, when a distributed data service cluster receives a data object service request from a user entity that is associated with a cloud-based software product, the distributed policy decision object can determine whether there is any applicable data control policy based on the software product and the user entity. Because the distributed policy decision object is in consistent data communications with the centralized policy information repository and receives policy information objects from the centralized policy information repository, various embodiments of the present disclosure overcome the technical challenges and difficulties of implementing unified data control policies in a distributed and product-oriented computing platform.

As such, various example embodiments of the present disclosure improve the functioning of complex computing systems (such as a distributed and product-oriented computing platform), details of which are described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the terms "set" or "subset" refer to a collection of zero or more elements.

As described above, user entities that may access the distributed and product-oriented computing platform include, but are not limited to, internal staff, external organization, and/or the like.

In the present disclosure, the term "user computing device" refers to a computing device that is operated by a user entity to access the distributed and product-oriented computing platform. Examples of user computing devices include, but are not limited to, desktop computers, workstations, portable digital assistant (PDA) devices, mobile telephones, smartphones, laptop computers, tablet computers, wearables, or any combination of the aforementioned devices.

In the present disclosure, the terms "user profile" "client profile," "user profile," "user account," and "user account details" refer to data, files, and other information associated with a user entity of an example distributed and product-oriented computing platform in accordance with some embodiments of the present disclosure. In some examples, the collection of data items in the client profile may include identifiers, which may be in the form of text string(s), numerical character(s), alphabetical character(s), alphanumeric code(s), American Standard Code for Information Interchange (ASCII) character(s), and/or the like that uniquely identify data and/or information. For example, a user profile may include, but not limited to, a user identifier (or a client identifier), one or more external organization identifiers, one or more product identifiers, and/or the like.

In some embodiments, a user computing device may be associated with a user profile. For example, a user computing device may store data items associated with a user profile. Additionally, or alternatively, a user computing device may be assigned with a user identifier from the user profile by the distributed and product-oriented computing platform.

In the present disclosure, the terms "user identifier" or "client identifier" refer to an identifier that uniquely identifies information stored in an example distributed and product-oriented computing platform that is related to a client. For example, a user identifier may comprise a username, a user email address, a user ID number, and/or the like. In some embodiments, the user identifier may be in the form of text string(s), numerical character(s), alphabetical character (s), alphanumeric code(s), ASCII character(s), and/or the like.

In the present disclosure, the term "external organization identifier" refers to an identifier that uniquely identifies an external organization that accesses the distributed and product-oriented computing platform. For example, various organizations (such as, but not limited to, Brand Corporation, Channel Communications, etc. as described above) may access the distributed and product-oriented computing platform to use the cloud-based software products provided by the distributed and product-oriented computing platform. In such an example, the distributed and product-oriented computing platform may assign an identifier for each external organization. In some embodiments, the external organization identifier may be in the form of text string(s), numerical character(s), alphabetical character(s), alphanumeric code(s), ASCII character(s), and/or the like.

In some embodiments, a user profile may comprise not only a user identifier, but also an external organization identifier if the user entity is a user from an external organization that accesses the distributed and product-oriented computing platform. For example, if John is an employee of Brand Corporation, a user profile of John may comprise the external organization identifier for Brand Corporation.

In some embodiments, an external organization that accesses the distributed and product-oriented computing platform may comprise one or more "administrator users" or "admin users," which refer to a user or client associated with the external organization who has authority to manage or control user computing devices and associated resources (and to make decisions on behalf) of other non-administrator users (or non-admin users) of the external organization regarding various interactions associated with an example distributed and product-oriented computing platform (such as, but not limited to, interactions with one or more cloud-based software products that the example distributed and product-oriented computing platform provides to the external organization). In contrast, "non-administrator users" or "non-admin users" refer to a user or a client of the external organization who does not have the authority to manage or control computing devices and associated resources of other users in the organization.

For example, an admin user of an external organization has the authority to set up one or more data control policies related to one or more cloud-based software products offered by the distributed and product-oriented computing platform that the external organization has purchased and/or subscribed to. For example, when a user of the external organization (including admin users and non-admin users) uses a cloud-based software product to generate data objects, the admin user of the external organization may provide data control policies that defines where the data objects should be stored, who can access the data objects, and/or the like.

As another example, an admin user of an external organization has the authority to set up one or more data control policies related to user entities of the external organization who access the distributed and product-oriented computing platform. For example, an admin user of an external organization may create a data control policy that requires all users (including, but not limited to, non-admin users) to satisfy multi-factor authentication requirements prior to accessing the one or more cloud-based software products purchased by and/or subscribed by the external organization, and/or prior to accessing data objects that are generated by a user entity of the external organization. As another example, an admin user of an external organization may create a data control policy that restricts access of certain data objects in the distributed and product-oriented computing platform by other user entities of the external organization (including, but not limited to, non-admin users, third-party applications, and/or the like).

In the present disclosure, the term "admin user identifier" refers to a type of user identifier that not only uniquely identifies a user within an external organization, but also indicates that the user is an admin user of an organization.

As an example, the user profile of an admin user John may comprise an admin user identifier.

In the present disclosure, the term "non-admin user identifier" refers to a type of user identifier that not only uniquely identifies a user within an external organization, but also indicates that the user is a non-admin user of an organization. As an example, the user profile of a non-admin user Mary may comprise a non-admin user identifier.

In the present disclosure, the terms "admin user computing device," "admin client device," "admin user device," or "admin device" refer to a user computing device that is associated with an admin user. For example, an admin client device may be associated with a user profile that comprises an admin user identifier.

In the present disclosure, the terms "non-admin user computing device," "non-admin client device," "non-admin user device," or "non-admin device" refer to a user computing device associated with a non-admin user. For example, a non-admin client device may be associated with a user profile that comprises a non-admin user identifier.

As described above, user entities of the distributed and product-oriented computing platform include not only external organizations, but also internal staffs. In the present disclosure, the term "internal staff identifier" refers to a type of user identifier that not only uniquely identifies a user, but also indicates that the user is an internal staff of the distributed and product-oriented computing platform.

In the present disclosure, the term "product identifier" refers to an identifier that indicates one or more cloud-based software products of an example distributed and product-oriented computing platform in accordance with some embodiments of the present disclosure. For example, each cloud-based software product provided by the distributed and product-oriented computing platform is assigned with a unique product identifier. In some embodiments, the product identifier may be in the form of text string(s), numerical character(s), alphabetical character(s), alphanumeric code(s), ASCII character(s), and/or the like.

As described above, an external organization may purchase or subscribe to one or more cloud-based software products provided by the distributed and product-oriented computing platform. In such an example, user profiles associated with the external organization may comprise product identifiers of the one or more cloud-based software products. Continuing from the Acme Corporation example above, when an external organization Brand Corporation purchases a document collaboration software product that is provided by the Acme Corporation through the distributed and product-oriented computing platform, user profiles associated with users from Brand Corporation (including, but not limited to, admin users and non-admin users) comprise a product identifier of the document collaboration software product. As another example, a user John may install a client of the document collaboration software product on his user computing device, and the user profile of John may include a product identifier that corresponds to the document collaboration software product, indicating an association between the document collaboration software product and John's user computing device.

As described above, an example distributed and product-oriented computing platform in accordance with some embodiments of the present disclosure comprises a centralized policy information repository. In some embodiments, the centralized policy information repository stores policy information objects.

In the present disclosure, the term "data object" refers to a data structure that represents, provides, and/or describes one or more content, functionalities and/or characteristics associated with data and/or information.

In an example distributed and product-oriented computing platform in accordance with some embodiments of the present disclosure, user entities may generate data objects through the cloud-based software products. Continuing from the Acme Corporation example above, an external organization Brand Corporation may subscribe to a document collaboration software product that is provided by Acme Corporation through the distributed and product-oriented computing platform. In such an example, users of Brand Corporation may generate data objects by using the document collaboration software product, and the generated data objects are associated with the external organization for Brand Corporation.

In the present disclosure, the term "policy information object" refers to a data object that describes a data control policy. In some embodiments, the policy information object may be in the form of text string(s), numerical character(s), alphabetical character(s), alphanumeric code(s), ASCII character(s), and/or the like.

In the present disclosure, the term "centralized policy information repository" refers to a data storage entity (such as, but not limited to, data store, database, data library, data archive, and/or the like) that stores policy information objects associated with the distributed and product-oriented computing platform. In some embodiments, an example distributed and product-oriented computing platform comprises only one centralized policy information repository, providing technical benefits such as, but not limited to, unified distributions of data control policies across the distributed and product-oriented computing platform, details of which are described herein.

In the present disclosure, the term "data control policy generation request" refers to an electronic message from a user computing device to the distributed and product-oriented computing platform that indicates a request to generate a policy information object. For example, the distributed and product-oriented computing platform may provide one or more Application programming interfaces (APIs) that enable user entities to generate policy information objects. In such an example, the data control policy generation request may be in the form of an API call.

In some embodiments, the term "metadata" refers to a parameter, a data field, a data element, or the like that describes an attribute or a property of a data object, a request, a response, and/or the like. For example, an example policy information object in accordance with some embodiments of the present disclosure comprises metadata such as, but not limited to, policy application metadata and policy control metadata.

In the present disclosure, the term "policy application metadata" refers to metadata of an example policy information object that describes the applicability of a data control policy in the distributed and product-oriented computing platform. For example, the policy application metadata defines how a distributed and product-oriented computing platform should implement the data control policy. In some embodiments, an example policy application metadata may comprise one of a platform-wide application indication, an organization-specific application indication, or a product-specific application indication.

In the present disclosure, the term "platform-wide application indication" refers to an electronic indication in the policy application metadata (of an example policy information object) specifying that the data control policy described in the example policy information object is applicable to all cloud-based software products, all distributed data service clusters, and data objects associated with all user entities of the distributed and product-oriented computing platform. In other words, the policy application metadata with a platform-wide application indication describes that the distributed and product-oriented computing platform should implement the data control policy to all data in the distributed and product-oriented computing platform (including data associated with all distributed data service clusters and all cloud-based software products).

Continuing from the Acme Corporation example above, an external organization Brand Corporation and an external organization Channel Communications may subscribe to a document collaboration software product provided by Acme Corporation through the distributed and product-oriented computing platform. As described above, the distributed and product-oriented computing platform comprises a centralized policy information repository storing policy information objects. In such an example, if a policy information object stored in the centralized policy information repository comprises policy application metadata with a platform-wide application indication, the data control policy associated with policy information object is applicable to all cloud-based software products of the distributed and product-oriented computing platform (including, the document collaboration software product), all distributed data service clusters within the distributed and product-oriented computing platform, and all data related to all external organizations (including Brand Corporation and Channel Communications) in the distributed and product-oriented computing platform.

In some embodiments, an example distributed and product-oriented computing platform generates a policy information object with the policy application metadata providing a platform-wide application indication in response to receiving a data control policy generation request that comprises a platform-wide policy indication and one or more internal staff identifiers. In the present disclosure, the term "platform-wide policy indication" refers to an electronic indication in the data control policy generation request that the data control policy is applicable to all data in the distributed and product-oriented computing platform (including data associated with all distributed data service clusters and all cloud-based software products).

In the present disclosure, the term "organization-specific application indication" refers to an electronic indication in the policy application metadata (of an example policy information object) specifying that the data control policy described in the example policy information object is applicable to only data objects in the distributed and product-oriented computing platform that are associated with a particular external organization. In other words, the policy application metadata with an organization-specific application indication describes that the distributed and product-oriented computing platform should implement the data control policy to data objects in the distributed and product-oriented computing platform that are associated with the particular external organization.

Continuing from the Acme Corporation example above, an external organization Brand Corporation and an external organization Channel Communications may subscribe to a document collaboration software product provided by Acme Corporation through the distributed and product-oriented computing platform. In such an example, if a policy information object stored in the centralized policy information repository comprises policy application metadata with an organization-specific application indication associated with the Brand Corporation, the data control policy associated with policy information object is applicable to data objects in the distributed and product-oriented computing platform that are associated with Brand Corporation. In other words, the data control policy described in the policy information object with an organization-specific application indication associated with the Brand Corporation do not apply to data objects associated with Channel Communications.

In some embodiments, an example distributed and product-oriented computing platform generates a policy information object with the policy application metadata providing an organization-specific application indication in response to receiving a data control policy generation request from a user computing device associated with an external organization identifier and an admin user identifier. In particular, the data control policy generation request comprises an organization-specific policy indication. In the present disclosure, the term "organization-specific policy indication" refers to an electronic indication in the data control policy generation request that the data control policy is only applicable to data objects associated with a particular external organization.

In the present disclosure, the term "product-specific application indication" refers to an electronic indication in the policy application metadata (of an example policy information object) specifying that the data control policy described in the example policy information object is applicable to a particular cloud-based software product (or particular cloud-based software products) provided by the distributed and product-oriented computing platform. In other words, the policy application metadata with a product-specific application indication describes that the distributed and product-oriented computing platform should implement the data control policy on the particular cloud-based software product(s) that is specified by the product-specific application indication.

In some embodiments, the product-specific application indication is associated with (for example, comprises) one or more product identifiers that identify the cloud-based software product(s) where the data control policy should be applied. Continuing from the Acme Corporation example above, if the product-specific application indication comprises a product identifier of a document collaboration software product, the corresponding data control policy is only applicable to the document collaboration software product and is not applicable to other cloud-based software product(s) provided by the distributed and product-oriented computing platform.

In some embodiments, an example distributed and product-oriented computing platform generates a policy information object with the policy application metadata providing a product-specific application indication in response to receiving a data control policy generation request that comprises a product-specific policy indication. In the present disclosure, the term "product-specific policy indication" refers to an electronic indication in the data control policy generation request that the data control policy is only applicable to one or more particular cloud-based software products provided by the distributed and product-oriented computing platform.

As described above, an example policy information object comprises not only policy application metadata, but also policy control metadata. In the present disclosure, the term "policy control metadata" refers to metadata of an example policy information object that describes a data control policy. Examples of data control policies include, but are not limited to, data access multi-factor authentication policy, data access peer review indication, data access restriction policy, and/or the like.

In the present disclosure, the term "data access multi-factor authentication policy" refers to a type of data control policy that requires a user entity to complete two or more independent credential authentication processes when the user entity transmits one or more data object access requests from a user computing device associated with the user entity. For example, the data access multi-factor authentication policy may require a user of an external organization to authenticate his or her credential by providing both a password and an authentication code from a separate authentication application.

In the present disclosure, the term "data access multi-factor authentication indication" refers to an electronic indication in the policy control metadata (of an example policy information object) specifying that the data control policy described in the example policy information object is a data access multi-factor authentication policy.

In the present disclosure, the term "data access peer review policy" refers to a type of data control policy that requires peer reviews of data object access requests. For example, the data access peer review policy may require an internal staff to submit a support ticket to request access to data objects within the distributed and product-oriented computing platform. In such an example, the support ticket may be reviewed by a peer (for example, the manager of the internal staff). After the peer approves the support ticket, the internal staff can access the requested data objects.

In some embodiments, an example data access peer review policy may define and/or indicate a distributed data service cluster that provides a peer review service. In the present disclosure, the term "peer review service" refers to a type of data service that enables peer reviews of data object access requests. For example, the distributed data service cluster that provides peer review service may comprise one or more software components (such as, but not limited to, program codes, data objects, and/or the like) and one or more hardware components (such as, but not limited to, one or more computing servers, one or more data object repositories, and/or the like) that generate, track, and monitor support tickets for requesting access to data objects as described in the example above.

In the present disclosure, the term "data access peer review indication" refers to an electronic indication in the policy control metadata (of an example policy information object) specifying that the data control policy described in the example policy information object is a data access peer review policy.

In the present disclosure, the term "data access restriction policy" refers to a type of data control policy that defines data access restrictions associated with certain user identifiers and/or certain external organization identifiers.

In some embodiments, the data access restriction policy may define data access restriction based at least in part on user identifiers. For example, the data access restriction policy may specify that user entities associated with certain user identifiers do not have access to certain data objects (for example, certain data objects associated with an external organization).

In some embodiments, the data access restriction policy may define data access restriction based at least in part on both data content and user identifier. For example, the data access restriction policy may specify that certain data objects (for example, certain data objects associated with an external organization) cannot be accessed by users associated with certain user identifiers, while other data objects (for example, other data objects associated with the external organization) can be accessed by users associated with certain user identifiers.

In the present disclosure, the term "data access restriction indication" refers to an electronic indication in the policy control metadata (of an example policy information object) specifying that the data control policy described in the example policy information object is a data access restriction policy.

As described above, an example distributed and product-oriented computing platform in accordance with some embodiments of the present disclosure comprises a plurality of distributed data service clusters. In some embodiments, each of the plurality of distributed data service clusters receives one or more data object service requests and generates one or more data object service responses.

In the present disclosure, the term "data object service request" refers to an electronic message that indicates a request for one or more data services associated with one or more data objects. In some embodiments, an example data object service request is received by a distributed data service cluster and transmitted from a user computing device or from another distributed data service cluster.

For example, an example data object service request in accordance with some embodiments of the present disclosure may be in the form of a "data object access request." In the present disclosure, the term "data object access request" refers to a type of data object service request that indicates a request to access one or more data objects stored in the distributed and product-oriented computing platform.

As another example, an example data object service request in accordance with some embodiments of the present disclosure may be in the form of a "data object generation request." In the present disclosure, the term "data object generation request" refers to a type of data object service request that indicates a request to generate one or more data objects through one or more cloud-based software products in the distributed and product-oriented computing platform.

As another example, an example data object service request in accordance with some embodiments of the present disclosure may be in the form of a "data object routing request." In the present disclosure, the term "data object routing request" refers to a type of data object service request that indicates a request to transmit one or more data objects to one or more distributed data service clusters in the distributed and product-oriented computing platform.

While the description above provides example types of data object service requests, it is noted that the scope of the present disclosure is not limited to the examples above. In some examples, an example data object service request may be associated with other type(s).

In some embodiments, in response to receiving a data object service request, an example distributed data service cluster may transmit a control policy evaluation request to its distributed policy decision object.

As described above, each distributed data service cluster in the distributed and product-oriented computing platform comprises a distributed policy decision object and one or more distributed policy enforcement objects. In the present disclosure, the term "distributed policy decision object" or "centralized policy decision object" refer to an organized set of one or more software components (such as, but not limited to, program codes, data objects, and/or the like) and one or more hardware components (such as, but not limited to, one or more computing servers, one or more data object repositories, and/or the like), where the one or more hardware components execute and/or carry out the one or more software components to determine whether there are any data control policies that are applicable to one or more data object service requests received by the distributed data service cluster.

In the present disclosure, the term "control policy evaluation request" refers to an electronic message that requests the distributed policy decision object to evaluate a data object service request and determine whether there are any data control policies that are applicable to the data object service request. In some embodiments, an example control policy evaluation request is received by the distributed policy decision object and transmitted from a user computing device and/or from another distributed data service cluster.

In the present disclosure, the term "control policy evaluation response" refers electronic message that indicates a response to a control policy evaluation request. For example, the control policy evaluation response may indicate one or more replicated policy information objects that provide data control policies applicable to the control policy evaluation request (for example, applicable to the data object service request).

In some embodiments, the distributed policy decision object generates control policy evaluation responses based on replicated policy information objects. In the present disclosure, the term "replicated policy information object" refers to policy information objects that have been replicated based on the policy information objects stored in the centralized policy information repository. For example, the centralized policy information repository may distribute the policy information objects to distributed policy decision objects of distributed data service clusters through one or more data synchronization mechanisms and/or data distribution mechanisms.

As an example, the centralized policy information repository may transmit an electronic message to distributed policy decision objects of distributed data service clusters and request the distributed policy decision objects to replicate policy information objects from the centralized policy information repository. In such an example, the distributed policy decision objects generate and store replicated policy information objects based on the policy information objects stored in the centralized policy information repository.

As another example, distributed policy decision objects of distributed data service clusters may proactively request replicated copies of the policy information objects from the centralized policy information repository as the replicated policy information objects.

In the present disclosure, the term "data object service response" refers to an electronic message that indicates a response to a data object access request. For example, an example data object service response may indicate one or more data operations to be performed by an example distributed policy enforcement object in response to the data object access request and based on the control policy evaluation response.

In some embodiments, an example data object service response is generated by a distributed data service cluster, and transmitted to another distributed data service cluster or to a user computing device. In some embodiments, the distributed data service cluster generates the example data object service response based on the example control policy evaluation response from the distributed policy decision object of the distributed data service cluster.

In some embodiments, an example data object service response comprises metadata such as, but not limited to, data permission metadata, data routing metadata, data transformation metadata, and/or data filter metadata.

In the present disclosure, the term "data permission metadata" refers to a type of metadata in the data object service response that indicates a response to the data object service request based on data control policies associated with permission controls. For example, example data permission metadata may comprise one of an allowance indication, a denial indication, or an additional information request indication.

In the present disclosure, the term "allowance indication" refers to an electronic indication in the data permission metadata specifying that the data object service request is allowed. For example, if the data object service request is a data object access request, the allowance indication indicates that the access to the data object is granted.

In the present disclosure, the term "denial indication" refers to an electronic indication in the data permission metadata specifying that the data object service request is denied. For example, if the data object service request is a data object access request, the allowance indication indicates that the access to the data object is denied.

In the present disclosure, the term "additional information request indication" refers to an electronic indication in the data permission metadata specifying that more information is needed to determine whether to allow or deny the data object service request. For example, if the data object service request is a data object access request, the additional information request indication indicates that more information is needed to determine whether to allow or deny the data object access request (for example, information on whether the user entity who submitted the data object access request has completed a multi-factor authentication process).

In the present disclosure, the term "data routing metadata" refers to a type of metadata in the data object service response that indicates a response to the data object service request based on data control policies associated with routing controls. In some embodiments, the data routing metadata indicates that the data object access request should be transmitted to another distributed data service cluster for processing.

For example, example data routing metadata may comprise a network address indication. In the present disclosure, the term "network address indication" refers to an electronic indication in the data permission metadata specifying the network address of another distributed data service cluster to which the data object access request should be transmitted.

In the present disclosure, the term "data transformation metadata" refers to a type of metadata in the data object service response that indicates a response to the data object service request based on data control policies associated with transformation controls. In some embodiments, data transformation metadata indicates that one or more data objects associated with the data object service request should be transformed or changed in response to the data object service request.

For example, the data transformation metadata may comprise a data encryption indication. In the present disclosure, the term "data encryption indication" refers to an electronic indication in the data permission metadata specifying that one or more data encryption processes should be performed on one or more data objects associated with the data object service request.

In the present disclosure, the term "data filter metadata" refers to a type of metadata in the data object service response that indicates a response to the data object service request based on data control policies associated with data filters. In some embodiments, data filter metadata indicates that one or more data auditing processes should be performed on one or more data objects associated with the data object service request.

For example, the data filter metadata may comprise a data filter indication. In the present disclosure, the term "data filter indication" refers to an electronic indication in the data permission metadata specifying that one or more data objects associated with the data object service request should be filtered and/or removed. As an example, the data filter indication may request auditing of the data objects (for example, checking data completeness, accuracy, and/or integrity) and removing data objects that do not satisfy the data audit.

In some embodiments, the distributed policy decision object and the one or more distributed policy enforcement objects of the distributed data service cluster are in data communications with one another. In the present disclosure, the term "distributed policy enforcement object" refers to an organized set of one or more software components (such as, but not limited to, program codes, data objects, and/or the like) and one or more hardware components (such as, but not limited to, one or more computing servers, one or more data object repositories, and/or the like), where the one or more hardware components execute and/or carry out the one or more software components to perform one or more data operations indicated by one or more data object service responses.

In various embodiments of the present disclosure, examples of distributed policy enforcement objects may be associated with a variety of types.

For example, an example distributed data service cluster may comprise one or more distributed policy enforcement objects that are in the form of data service objects. In some embodiments, an example data service object refers to an organized set of one or more software components (such as, but not limited to, program codes, data objects, and/or the like) and one or more hardware components (such as, but not limited to, one or more computing servers, one or more data object repositories, and/or the like) that perform one or more data services in response to data object service requests. For example, an example data service object may retrieve one or more data objects from a data object repository and transmit the one or more data objects to one or more user computing devices in response to a data object service request. As another example, an example data service object may generate one or more data objects and transmit the one or more data objects to one or more user computing devices in response to a data object service request.

Additionally, or alternatively, an example distributed data service cluster may comprise one or more distributed policy enforcement objects that are in the form of service proxy objects. In the present disclosure, the term "service proxy object" refers to an organized set of one or more software components (such as, but not limited to, program codes, data objects, and/or the like) and one or more hardware components (such as, but not limited to, one or more computing servers, one or more data object repositories, and/or the like) that act an intermediary between a data service object and a user computing device, or between the data service object and another distributed data service cluster.

Additionally, or alternatively, an example distributed data service cluster may comprise one or more distributed policy enforcement objects that are in the form of network edge objects. In the present disclosure, the term "network edge object" refers to an organized set of one or more software components (such as, but not limited to, program codes, data objects, and/or the like) and one or more hardware components (such as, but not limited to, one or more computing servers, one or more data object repositories, and/or the like) that are at the "edge" of the distributed and product-oriented computing platform and interface with user computing devices. For example, the network edge object receives data object service requests from user computing devices.

While the description above provides example types of distributed policy enforcement objects, it is noted that the scope of the present disclosure is not limited to the examples above. In some embodiments, an example distributed policy enforcement object may be associated with other type(s).

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a network service server and/or a platform user computing device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example distributed and product-oriented computing environment 100 within which embodiments of the present disclosure may operate. In the example shown in FIG. 1, the distributed and product-oriented computing environment 100 may comprise a distributed and product-oriented computing platform 109 in electronic communication with one or more user computing devices (such as, but not limited to, user computing devices 101A, 101B, . . . 101N, user computing devices 105A, 105B, . . . 105N) via, for example, one or more local area networks and/or one or more wide area networks. For example, user entities may access the distributed and product-oriented computing platform 109 via the one or more local area networks and/or one or more wide area networks and using the one or more user computing devices.

In some embodiments, the user computing devices 101A, 101B, . . . 101N and the user computing devices 105A, 105B, . . . 105N may be computing devices as described herein, including, but not limited to, desktop computers, laptop computers, smartphones, netbooks, tablet computers, wearables, and the like. As described above, user computing devices can be used by user entities to access the distributed and product-oriented computing platform, and user entities may include, but not limited to, internal staff of the distributed and product-oriented computing platform, users from external organizations, and/or the like.

In the example shown in FIG. 1, some of the user computing devices (such as 101A, 101B, . . . 101N) may be used by user entities from external organizations of the distributed and product-oriented computing platform. In some embodiments, some of the user computing devices 101A, 101B, . . . 101N may be associated with an external organization that is different from the external organization associated with other of the user computing devices 101A, 101B, . . . 101N. For example, the user computing device 101A may be associated with a first external organization, and the user computing device 101B may be associated with a second external organization that is different from the first external organization.

While the description above provides examples of user computing devices, it is noted that the scope of the present disclosure is not limited to the examples above. In some examples, an example user computing device may be in the form of a network server. In the example shown in FIG. 1, one or more network servers (such as, but not limited to, the network server 103A, the network server 103B, and/or the like) may communicate with the distributed and product-oriented computing platform 109. For example, the one or more network servers (such as, but not limited to, the network server 103A, the network server 103B, and/or the like) may host third-party software applications and may be located outside the external organizations and the distributed and product-oriented computing platform 109. In such an example, one or more of the external organizations of the distributed and product-oriented computing platform 109 may purchase or subscribe to one or more of the third-party software applications, such that the one or more third-party software applications can be used in conjunction with the one or more cloud-based software products provided by the distributed and product-oriented computing platform 109.

Similar to those described above, the distributed and product-oriented computing platform 109 may comprise a plurality of distributed data service clusters 107 and a centralized policy information repository 111. In some embodiments, the centralized policy information repository 111 is in data communications with the plurality of distributed data service clusters 107.

As described above, the centralized policy information repository 111 stores policy information objects associated with the distributed and product-oriented computing platform 109. In some embodiments, the policy information objects are generated by the distributed and product-oriented computing platform 109 in response to data control policy generation requests received from the user computing devices (such as, but not limited to, user computing device 101A, user computing device 101B, user computing device 101N, user computing device 105A, user computing device 105B, user computing device 105N as shown in FIG. 1).

For example, a user computing device associated with an internal staff identifier (such as, but not limited to, user computing device 105A, user computing device 105B, . . . user computing device 105N) may transmit one or more data control policy generation requests to the distributed and product-oriented computing platform 109. Additionally, or alternatively, a user computing device associated with an external organization and an admin user identifier (such as, but not limited to, user computing device 101A, user computing device 101B, . . . user computing device 101N) may transmit one or more data control policy generation requests to the distributed and product-oriented computing platform 109.

In some embodiments, upon receiving the one or more data control policy generation requests from one or more user computing devices, the distributed and product-oriented computing platform 109 generates one or more policy information objects based on the one or more data control policy generation requests. As described above, each policy information object comprises policy application metadata and policy control metadata. In particular, the policy application metadata describes the applicability of a data control policy in the distributed and product-oriented computing platform (such as, but not limited to, whether the data control policy is applicable platform wide, applicable to one or more specific external organizations, or applicable to one or more specific cloud-based software products). In some embodiments, the policy control metadata describes the data control policy from the control policy generation request (such as, but not limited to, data access peer review policy, data access restriction policy, data access multi-factor authentication policy, and/or the like).

In some embodiments, the distributed and product-oriented computing platform 109 generates the policy application metadata and the policy control metadata of the policy information objects based at least in part on the one or more data control policy generation requests and/or the one or more user profiles associated with the one or more user computing devices, details of which are described herein. In some embodiments, subsequent to generating the policy information objects, the distributed and product-oriented computing platform 109 stores the policy information objects in the centralized policy information repository 111.

In some embodiments, the centralized policy information repository 111 stores only policy information objects with policy application metadata that provide platform-wide application indications.

In some embodiments, the centralized policy information repository 111 stores policy information objects with policy application metadata that provide platform-wide application indications and organization-specific application indications.

In some embodiments, the centralized policy information repository 111 stores policy information objects with policy application metadata that provide platform-wide application indications, organization-specific application indications, and product-specific application indications.

Referring back to FIG. 1, the plurality of distributed data service clusters 107 comprises a distributed data service cluster 107A, a distributed data service cluster 107B, a distributed data service cluster 107C, a distributed data service cluster 107D, a distributed data service cluster 107E, a distributed data service cluster 107F, and a distributed data service cluster 107N. As described above, a distributed data service cluster refers to an organized set of one or more software components (such as, but not limited to, program codes, data objects, and/or the like) and one or more hardware components (such as, but not limited to, one or more computing servers, one or more data object repositories, and/or the like), where the one or more hardware components execute and/or carry out the one or more software components to provide one or more data services for one or more cloud-based software products for the distributed and product-oriented computing platform 109. In the example shown in FIG. 1, the plurality of distributed data service clusters 107 are shown as network servers.

In some embodiments, the distributed data service cluster 107A, the distributed data service cluster 107B, the distributed data service cluster 107C, the distributed data service cluster 107D, the distributed data service cluster 107E, the distributed data service cluster 107F, and the distributed data service cluster 107N are in data communications with one another to provide data services for one or more cloud-based software products in the distributed and product-oriented computing platform 109.

In some embodiments, each of the distributed data service clusters 107 (such as, but not limited to distributed data service cluster 107A, the distributed data service cluster 107B, the distributed data service cluster 107C, the distributed data service cluster 107D, the distributed data service cluster 107E, the distributed data service cluster 107F, and the distributed data service cluster 107N) comprises a distributed policy decision object and one or more distributed policy enforcement objects. In some embodiments, each distributed policy decision object is in data communications with the centralized policy information repository 111 and comprises replicated policy information objects that are distributed from the centralized policy information repository 111.

In some embodiments, user computing devices (such as, but not limited to, user computing devices 101A, 101B, . . . 101N, user computing devices 105A, 105B, . . . 105N, network server 103A, the network server 103B) may transmit data object service requests to the distributed and product-oriented computing platform 109. In some embodiments, data object service requests from the user computing devices are received by one of the plurality of distributed data service clusters 107 (for example, the distributed data service cluster 107A).

As described above, a data object service request indicates a request for one or more data services associated with one or more data objects. In some embodiments, upon receiving the data object service request, the distributed data service cluster (for example, the distributed data service cluster 107A) needs to determine whether there is any data control policy that is applicable to the data object service request. For example, if the data object service request is in the form of a data object access request, the distributed data service cluster (for example, the distributed data service cluster 107A) needs to determine whether there is any data control policy (such as, but not limited to, data access peer review policy, data access restriction policy, data access multi-factor authentication policy, and/or the like) that should be applied in handling the data object access request.

In some embodiments, to determine whether there is any applicable data control policy, the distributed data service cluster (for example, the distributed data service cluster 107A) transmits a control policy evaluation request to its distributed policy decision object. As described above, the distributed policy decision object comprises replicated policy information objects that are replicates of policy information objects stored in the centralized policy information repository 111. In some embodiments, the distributed policy decision object retrieves the replicated policy information objects and determines whether there is any data control policy described in the replicated policy information objects that is applicable to the data object access request. In some embodiments, based on the replicated policy information objects, the distributed policy decision object generates a control policy evaluation response, and transmits the control policy evaluation response to one or more distributed policy enforcement objects of the distributed data service cluster.

In some embodiments, based on the control policy evaluation response, the one or more distributed policy enforcement objects of the distributed data service cluster generates data object service responses to the data object service requests. As described above, data object service responses indicate data operations to be performed by the one or more distributed policy enforcement objects. In some embodiments, the data object service responses may comprise one or more data permission metadata, data routing metadata, data transformation metadata, and/or data filter metadata.

For example, when the data object service response comprises the data permission metadata, the one or more distributed policy enforcement objects may allow the data object service request, deny the data object service request, and/or request more information on the data object service request.

As another example, when the data object service response comprises the data routing metadata, the one or more distributed policy enforcement objects may transmit the data object service request to another distributed data service cluster.

As another example, when the data object service response comprises the data transformation metadata, the one or more distributed policy enforcement objects may perform one or more data transformation operations (such as, but not limited to, data encryption) on the one or more data objects associated with the data object service request.

As another example, when the data object service response comprises the data filter metadata, the one or more distributed policy enforcement objects may perform one or more data filtering operations (such as, but not limited to, data auditing) on the one or more data objects associated with the data object service request.

While the description above and FIG. 1 provide an example illustration of a distributed and product-oriented computing environment, it is noted that the scope of the present disclosure is not limited to the description above and FIG. 1. For example, the number of user computing devices and/or the number of distributed data service clusters in an example distributed and product-oriented computing environment may be less than or more than those shown in FIG. 1.

It is noted that various components of the distributed and product-oriented computing environment 100 may leverage the same computer or computing apparatus to perform various operations. For example, various components of one or more distributed data service cluster (such as, but not limited to, the distributed data service cluster 107A, the distributed data service cluster 107B, the distributed data service cluster 107C, the distributed data service cluster 107D, the distributed data service cluster 107E, the distributed data service cluster 107F, . . . , the distributed data service cluster 107N in the example shown in FIG. 1) in the distributed and product-oriented computing platform 109 may leverage the same computer or computing apparatus to perform various operations.

Example Apparatuses for Implementing Embodiments of the Present Disclosure

The user computing devices 101A, 101B, 101N, 105A, 105B, 105N, . . . of FIG. 1 may include one or more computing systems, such as the apparatus 200 shown in FIG. 2. The apparatus 200 may be configured to execute at least some of the operations described above with respect to FIG. 1 and below with respect to FIG. 4 to FIG. 21. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a user computing device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

As described above, each distributed data service cluster may comprise one or more one or more software components that are stored or executed by one or more hardware components. In some embodiments, each of the plurality of distributed data service clusters 107 shown in FIG. 1 (such as, but not limited to, distributed data service cluster 107A, a distributed data service cluster 107B, a distributed data service cluster 107C, a distributed data service cluster 107D, a distributed data service cluster 107E, a distributed data service cluster 107F, and a distributed data service cluster 107N) may be embodied by one or more computing systems, such as apparatus 300 shown in FIG. 3.

The apparatus 300 may include a processor 305, a memory 301, an input/output circuitry 307, and a communications circuitry 303. The apparatus 300 may be configured to execute at least some of the operations described above with respect to FIG. 1 and below with respect to FIG. 4 to FIG. 21. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or co-processor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a user computing device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 21, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4 to FIG. 21 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Example Generations of Example Data Object Service Responses

Referring now to FIG. 4, an example system schematic diagram 400 is illustrated. In particular, the example system schematic diagram 400 illustrates an example distributed computing platform 402 that is plagued with many technical challenges and difficulties.

In the example shown in FIG. 4, the example distributed computing platform 402 is implemented in a microservice architecture. In particular, the example distributed computing platform 402 arranges software applications as a collection of microservices, and each microservice comprises an organized set of one or more software components and one or more hardware components. In the example shown in FIG. 4, the example distributed computing platform 402 comprises microservices such as, but not limited to, microservice 401A, microservice 401B, microservice 401C, microservice 401D, microservice 401E, microservice 401F, microservice 401G, and microservice 401H.

As shown in FIG. 4, each of the microservice 401A, microservice 401B, microservice 401C, microservice 401D, microservice 401E, microservice 401F, microservice 401G, and microservice 401H is a separate a policy decision point. In other words, each of the microservice 401A, microservice 401B, microservice 401C, microservice 401D, microservice 401E, microservice 401F, microservice 401G, and microservice 401H separately stores data control policies that are associated with the example distributed computing platform 402 and separately determines whether the stored data control policies are applicable to data object service requests.

As further shown in FIG. 4, each of the microservice 401A, microservice 401B, microservice 401C, microservice 401D, microservice 401E, microservice 401F, microservice 401G, and microservice 401H is a separate a policy enforcement point. In other words, each of the microservice 401A, microservice 401B, microservice 401C, microservice 401D, microservice 401E, microservice 401F, microservice 401G, and microservice 401H separately generates data object service responses based on the data control policies that are stored in the corresponding microservice.

As described above, the example distributed computing platform 402 is faced with many technical challenges and difficulties.

For example, because each of the microservices separately stores data control policies, data control policies stored in different microservices can be different and not unified. For example, a data object service request may be transmitted to the microservice 401A, and the microservice 401A may determine a data control policy stored in the microservice 401A that is applicable to the data object service request. Based on the data control policy stored in the microservice 401A, the microservice 401A may generate a response. The same data object service request may be transmitted to the microservice 401B, and the microservice 401B may determine a different data control policy stored in the microservice 401B that is applicable to the data object service request. Based on the data control policy stored in the microservice 401B, the microservice 401B may generate a response. Because the data control policy stored in the microservice 401A is different from the data control policy stored in the microservice 401B, the response generated by the microservice 401A is different form the response generated by the microservice 401B, despite that they are responses to the same data object service request. As such, the example distributed computing platform 402 fails to implement unified data control policies for data object service requests that are submitted to the distributed computing platform 402.

As another example, when new data control policies are added to the distributed computing platform 402, it is technically challenging to ensure that the new data control policies are separately added to each of the microservices, especially when there are hundreds to thousands microservices in the example distributed computing platform 402. When a new microservice is added to the distributed computing platform 402, it is also technically challenging to ensure that all the data control policies from the example distributed computing platform 402 are stored in the microservice, especially when different microservices store different data control policies.

Referring now to FIG. 5, FIG. 6, and FIG. 7, example diagrams in accordance with some embodiments of the present disclosure are provided. In particular, FIG. 5 provides an example system schematic diagram 500 highlighting an example distributed and product-oriented computing platform 501 that provides various technical benefits and improvements in accordance with some embodiments of the present disclosure. FIG. 6 is an example block diagram 600 that illustrates example data and operation flows through example policy information objects, an example distributed policy decision object and example distributed policy enforcement objects. FIG. 7 is an example system layer diagram 700 corresponding to the example distributed and product-oriented computing platform 501 shown in FIG. 5.

In some embodiments, the example distributed and product-oriented computing platform 501 shown in FIG. 5 is similar to the distributed and product-oriented computing platform 109 described above in connection with FIG. 1.

For example, the example distributed and product-oriented computing platform 501 comprises a centralized policy information repository 503 that is data communications with a plurality of distributed data service clusters (including, but not limited to, distributed data service cluster 505A, the distributed data service cluster 505B, the distributed data service cluster 505C, and the distributed data service cluster 505D).

In some embodiments, each of the plurality of distributed data service clusters comprises a distributed policy decision object and one or more distributed policy enforcement objects. For example, the distributed data service cluster 505A comprises a distributed policy decision object 507A and a plurality of distributed policy enforcement objects (such as, but not limited to, the distributed policy enforcement object 509A, the distributed policy enforcement object 509B, and the distributed policy enforcement object 509C). As another example, the distributed data service cluster 505B comprises a distributed policy decision object 507B and a plurality of distributed policy enforcement objects (such as, but not limited to, the distributed policy enforcement object 509D and the distributed policy enforcement object 509E). As another example, the distributed data service cluster 505C comprises a distributed policy decision object 507C and a plurality of distributed policy enforcement objects (such as, but not limited to, the distributed policy enforcement object 509F) As another example, the distributed data service cluster 505D comprises a distributed policy decision object 507D and a plurality of distributed policy enforcement objects (such as, but not limited to, the distributed policy enforcement object 509G, and the distributed policy enforcement object 509H).

In some embodiments, the centralized policy information repository 503 stores policy information objects, similar to those described above. As shown in FIG. 5, the centralized policy information repository 503 distributes replicated policy information objects to each distributed policy decision object associated with each distributed data service cluster. For example, the centralized policy information repository 503 distributes policy information objects to the distributed policy decision object 507A of the distributed data service cluster 505A, to the distributed policy decision object 507B of the distributed data service cluster 505B, to the distributed policy decision object 507C of the distributed data service cluster 505C, and to the distributed policy decision object 507D of the distributed data service cluster 505D.

As such, each of the distributed data service cluster 505A, distributed data service cluster 505B, distributed data service cluster 505C and distributed data service cluster 505D has the same policy information objects that are replicated from the centralized policy information repository 503. In such an example, the distributed data service cluster 505A generates a response to a data object service request based on applicable data control policies from the replicated policy information objects, and such a response would be the same if it is generated by the distributed data service cluster 505B in response to the same distributed data service cluster. As such, the example distributed and product-oriented computing platform 501 can implement unified data control policies when responding to data object service requests.

As another example, when a new data control policy is added to the example distributed and product-oriented computing platform 501, the example distributed and product-oriented computing platform 501 generates a new policy information object based on the new data control policy and stores the new policy information object in the centralized policy information repository 503. In some embodiments, the centralized policy information repository 503 distributes the new policy information object to each distributed policy decision object associated with each distributed data service cluster (including, but limited to, the distributed policy decision object 507A of the distributed data service cluster 505A, the distributed policy decision object 507B of the distributed data service cluster 505B, the distributed policy decision object 507C of the distributed data service cluster 505C, and the distributed policy decision object 507D of the distributed data service cluster 505D), so that all distributed data service cluster in the distributed and product-oriented computing platform have the most up-to-date data control policies.

Referring now to FIG. 6, the example block diagram 600 illustrates example data/operation flows from example policy information objects 602, an example distributed policy decision object 604 and example distributed policy enforcement objects 606.

In the example shown in FIG. 6, the example policy information objects 602 comprises policy information object 602A, policy information object 602B, and policy information object 602C. In some embodiments, each of the policy information object 602A, the policy information object 602B, and the policy information object 602C represents at least one data control policy. In some embodiments, the example policy information objects 602 are stored in a centralized policy information repository of a distributed and product-oriented computing platform in accordance with some embodiments of the present disclosure (for example, but not limited to, the centralized policy information repository 111 of the distributed and product-oriented computing platform 109 as described above in connection with FIG. 1, and/or the centralized policy information repository 503 of the distributed and product-oriented computing platform 501 as described above in connection with FIG. 5).

As described above, each of the distributed data service clusters comprises a distributed policy decision object that is in data communication with the centralized policy information repository. In the example shown in FIG. 6, the example distributed policy decision object 604 receives policy information objects that are distributed and replicated from the centralized policy information repository.

In some embodiments, by traversing the replicated policy information objects, the example distributed policy decision object 604 can determine whether there is any data control policy that is applicable to a data object service request. In some embodiments, the example distributed policy decision object 604 transmits a control policy evaluation response to one or more of example distributed policy enforcement objects 606 (such as, but not limited to, example distributed policy enforcement object 606A, example distributed policy enforcement object 606B, example distributed policy enforcement object 606C, example distributed policy enforcement object 606D, example distributed policy enforcement object 606E, example distributed policy enforcement object 606F, example distributed policy enforcement object 606G, example distributed policy enforcement object 606H, and example distributed policy enforcement object 606I).

In some embodiments, upon receiving the control policy evaluation response, the one or more of the example distributed policy enforcement objects 606 generate data object service responses, similar to those described above.

Referring now to FIG. 7, an example system layer diagram 700 corresponding to the example distributed and product-oriented computing platform 501 shown in FIG. 5 is provided.

In the example shown in FIG. 7, the example system layer diagram 700 illustrates four different layers of the example distributed and product-oriented computing platform 501. For example, the example distributed and product-oriented computing platform 501 comprises an infrastructure layer 701, a unified policy platform (UPP) owner and platform integrators layer 703 that is above the infrastructure layer 701, a control implementation teams layer 705 that is above the UPP owner and platform integrators layer 703, and a features team layer 707 that is above the control implementation teams layer 705.

In some embodiments, the infrastructure layer 701 provides tooling and infrastructure that the UPP owner and platform integrators layer 703 relies on. For example, the infrastructure layer 701 provides the underlying infrastructure that distributes data and policies to each distributed policy decision object associated with each distributed data service cluster.

In some embodiments, the UPP owner and platform integrators layer 703 owns the example distributed and product-oriented computing platform 501 and drives the data operations of the example distributed and product-oriented computing platform 501. For example, the UPP owner and platform integrators layer 703 comprises a UPP owner component 711 and a platform integrators component 713.

In some embodiments, the UPP owner component 711 provides the centralized policy information repository for the example distributed and product-oriented computing platform 501.

In some embodiments, the platform integrators component 713 enables the data communications between the centralized policy information repository and the distributed data service clusters of the example distributed and product-oriented computing platform 501. For example, the platform integrators component 713 provides tools and teams that for integrating the infrastructure of the centralized policy information repository, the distributed policy decision object, and the distributed policy enforcement objects into cloud-based software products that are provided by the example distributed and product-oriented computing platform 501. In some embodiments, the platform integrators component 713 enables decision making at shared infrastructure points (such as, but not limited to, basic decision making at the shared entry point to the network of the distributed and product-oriented computing platform 501, shared database access points such that the individual cloud-based software product do not need to handle these decision making).

In some embodiments, the control implementation teams layer 705 translates data control policies into computer programming codes. For example, the control implementation teams layer 705 builds shared functionalities across cloud-based software products that are provided by the example distributed and product-oriented computing platform 501 and is responsible for authoring the data control policies that are consumed or implemented by the cloud-based software products. In some embodiments, the control implementation teams layer 705 provides the programming codes associated with the data control policies to the UPP owner component 711 and/or to the platform integrators component 713 of the UPP owner and platform integrators layer 703.

In some embodiments, the features team layer 707 provides an interface between the example distributed and product-oriented computing platform 501 and one or more user computing devices of user entities. For example, the features team layer 707 comprises data and/or information associated with cloud-based software products that are provided by the example distributed and product-oriented computing platform 501.

Referring now to FIG. 8 and FIG. 9, example flow diagrams in accordance with some embodiments of the present disclosure are illustrated.

In particular, FIG. 8 provides an example flowchart illustrating an example method 800 for generating an example data object service response based on an example control policy evaluation response in accordance with some embodiments of the present disclosure. FIG. 9 illustrates example data flows between an example distributed policy enforcement object 901 and an example distributed policy decision object 903 in accordance with some embodiments of the present disclosure.

Referring now to FIG. 8, an example method 800 in accordance with some embodiments of the present disclosure is illustrated. In particular, the example method 800 illustrates example steps/operations for implementing unified data control policies in an example distributed and product-oriented computing platform. As described above, the example distributed and product-oriented computing platform comprises a plurality of distributed data service clusters and a centralized policy information repository.

In the example shown in FIG. 8, the example method 800 starts at block 802 and then proceeds to step/operation 804. At step/operation 804, a processing circuitry (such as, but not limited to, the processor 305 of the distributed data service cluster 107A described above in connection with at least FIG. 1 and FIG. 3) receives a data object service request associated with a distributed data service cluster.

In some embodiments, the processing circuitry receives a data object service request associated with a distributed data service cluster of the plurality of distributed data service clusters in the example distributed and product-oriented computing platform. As described above, the data object service request may be in the form of an electronic message that indicates a request for one or more data services associated with one or more data objects. In some embodiments, the data object service request may be transmitted from a user computing device and received by the distributed data service cluster.

In some embodiments, the distributed data service cluster is associated with a distributed policy decision object and one or more distributed policy enforcement objects. For example, the distributed data service cluster may comprise the distributed policy decision object and the one or more distributed policy enforcement objects. In some embodiments, the one or more distributed policy enforcement objects and distributed policy decision object are in data communications with one another.

Referring back to FIG. 8, subsequent and/or in response to step/operation 804, the example method 800 proceeds to step/operation 806. At step/operation 806, a processing circuitry (such as, but not limited to, the processor 305 of the distributed data service cluster 107A described above in connection with at least FIG. 1 and FIG. 3) transmits a control policy evaluation request based at least in part on the data object service request to the distributed policy decision object.

For example, upon receiving the data object service request, the processing circuitry generates a control policy evaluation request based on the data object service request. As described above, the data object service request is received from a user computing device and indicates a request for one or more data services associated with one or more data objects.

In some embodiments, the control policy evaluation request comprises metadata that indicates an identifier of the data object service request. Additionally, or alternatively, the control policy evaluation request comprises metadata that indicates a user identifier associated with the user computing device that transmitted the data object service request. Additionally, or alternatively, the control policy evaluation request comprises metadata that indicates one or more identifiers of one or more data objects that are associated with the data object service request. Additionally, or alternatively, the control policy evaluation request comprises metadata that indicates one or more product identifiers of one or more cloud-based software products that are associated with the data object service request. Additionally, or alternatively, the control policy evaluation request comprises metadata that indicates an identifier of the distributed data service cluster that received the data object service request. Additionally, or alternatively, the control policy evaluation request comprises other type(s) of metadata.

In some embodiments, the processing circuitry transmits the control policy evaluation request to the distributed policy decision object of the distributed data service cluster. As described above, the distributed policy decision object comprises a plurality of replicated policy information objects that are distributed from the centralized policy information repository. For example, the distributed policy decision object is in data communications with the centralized policy information repository, and receives policy information objects from the centralized policy information repository.

Referring back to FIG. 8, subsequent and/or in response to step/operation 806, the example method 800 proceeds to step/operation 808. At step/operation 808, a processing circuitry (such as, but not limited to, the processor 305 of the distributed data service cluster 107A described above in connection with at least FIG. 1 and FIG. 3) receives a control policy evaluation response from the distributed policy decision object.

In some embodiments, the control policy evaluation response indicates at least one replicated policy information object from the plurality of replicated policy information objects that are stored in the distributed policy decision object. For example, the distributed policy decision object retrieves the plurality of replicated policy information objects and generates the control policy evaluation response based at least in part on the control policy evaluation request received at step/operation 806 and the plurality of replicated policy information objects.

In some embodiments, the distributed policy decision object may compare metadata from the control policy evaluation request with the metadata from the replicated policy information objects (such as, but not limited to, policy application metadata and/or policy control metadata). In some embodiments, the distributed policy decision object determines whether there is any match between metadata from the control policy evaluation request and the metadata from the replicated policy information objects (such as, but not limited to, policy application metadata and/or policy control metadata). If there is a match between metadata from the control policy evaluation request and metadata from at least one replicated policy information object, the distributed policy decision object generates the control policy evaluation response indicating the at least one replicated policy information object.

As an example, the control policy evaluation request may comprise metadata that indicates a user identifier associated with the user computing device that transmitted the data object service request. In such an example, the distributed policy decision object determines whether there is at least one replicated policy information object comprising metadata (such as, but not limited to, policy application metadata and/or policy control metadata) that also indicates the user identifier. If so, the distributed policy decision object generates a control policy evaluation response that indicates the at least one replicated policy information object.

Additionally, or alternatively, the control policy evaluation request may comprise metadata that indicates one or more identifiers of one or more data objects that are associated with the data object service request. In such an example, the distributed policy decision object determines whether there is at least one replicated policy information object comprising metadata (such as, but not limited to, policy application metadata and/or policy control metadata) that also indicates at least one of the one or more identifiers of one or more data objects. If so, the distributed policy decision object generates a control policy evaluation response indicating at least one replicated policy information object associated with the one or more identifiers of one or more data objects.

Additionally, or alternatively, the control policy evaluation request may comprise metadata that indicates one or more product identifiers of one or more cloud-based software products that are associated with the data object service request. In such an example, the distributed policy decision object determines whether there is at least one replicated policy information object comprising metadata (such as, but not limited to, policy application metadata and/or policy control metadata) that indicates at least one of the one or more product identifiers. If so, the distributed policy decision object generates a control policy evaluation response indicating at least one replicated policy information object associated with the at least one of the one or more product identifiers.

Additionally, or alternatively, the control policy evaluation request may comprise metadata that indicates an identifier of the distributed data service cluster that received the data object service request. In such an example, the distributed policy decision object determines whether there is at least one replicated policy information object comprising metadata (such as, but not limited to, policy application metadata and/or policy control metadata) that indicates the identifier of the distributed data service cluster. If so, the distributed policy decision object generates a control policy evaluation response indicating the at least one replicated policy information object associated with the identifier of the distributed data service cluster.

While the description above provides examples of generating control policy evaluation responses, it is noted that the scope of the present disclosure is not limited to the description above. Additional details associated with examples of generating control policy evaluation responses are described herein.

In some embodiments, subsequent to generating the control policy evaluation response, the distributed policy decision object transmits the control policy evaluation response to the processing circuitry.

Referring back to FIG. 8, subsequent and/or in response to step/operation 808, the example method 800 proceeds to step/operation 810. At step/operation 810, a processing circuitry (such as, but not limited to, the processor 305 of the distributed data service cluster 107A described above in connection with at least FIG. 1 and FIG. 3) generates a data object service response based on the control policy evaluation response.

In some embodiments, the processing circuitry generates a data object service response based at least in part on the control policy evaluation response that is received at step/operation 808. In some embodiments, the data object service response indicates a response to the data object access request received at step/operation 804, and specifies one or more data operations to be performed by one or more distributed policy enforcement objects of the distributed data service cluster.

As described above, the data object service response comprises one or more of data permission metadata, data routing metadata, data transformation metadata, or data filter metadata.

For example, the data object service response comprises the data permission metadata. As described above, the data permission metadata may comprise one of an allowance indication, a denial indication, or an additional information request indication. As an example, when data object service response comprises data permission metadata with an allowance indication, the processing circuitry causes one or more distributed policy enforcement objects of the distributed data service cluster to grant/allow the data object service request (for example, enabling data access of the one or more data objects by the user computing device). As another example, when data object service response comprises data permission metadata with a denial indication, the processing circuitry causes one or more distributed policy enforcement objects of the distributed data service cluster to reject/deny the data object service request (for example, disabling data access of the one or more data objects by the user computing device). As another example, when data object service response comprises data permission metadata with an additional information request indication, the processing circuitry causes one or more distributed policy enforcement objects of the distributed data service cluster to generate one or more additional information requests and to transmit the one or more additional information requests to the user computing device.

Additionally, or alternatively, the data object service response comprises the data routing metadata. As described above, the data routing metadata may comprise a network address indication. For example, when data object service response comprises data routing metadata with a network address indication, the processing circuitry causes one or more distributed policy enforcement objects of the distributed data service cluster to transmit or relay the data object service request to another distributed data service cluster as specified by the network address indication.

Additionally, or alternatively, the data object service response comprises the data transformation metadata. As described above, the data transformation metadata may comprise a data encryption indication. For example, when data object service response comprises data transformation metadata with a data encryption indication, the processing circuitry causes one or more distributed policy enforcement objects of the distributed data service cluster to execute one or more encryption algorithms on the one or more data objects associated with the data object service request.

Additionally, or alternatively, the data object service response comprises the data filter metadata. As described above, the data filter metadata may comprise a data filter indication. For example, when data object service response comprises data filter metadata with a data filter indication, the processing circuitry causes one or more distributed policy enforcement objects of the distributed data service cluster to execute one or more data filtering algorithms on the one or more data objects associated with the data object service request.

In some embodiments, the data object service response comprises only one type of metadata (for example, only the data permission metadata, only the data routing metadata, only the data transformation metadata, or only the data filter metadata). In some embodiments, the data object service response comprises more than one type of metadata.

Referring back to FIG. 8, subsequent and/or in response to step/operation 810, the example method 800 proceeds to step/operation 812 and ends.

Referring now to FIG. 9, an example data flow diagram 900 illustrates example data flows between an example distributed policy enforcement object 901 and an example distributed policy decision object 903 within a distributed data service cluster 905 in accordance with some embodiments of the present disclosure.

As described above, an example distributed data service cluster in accordance with some embodiments of the present disclosure comprises a distributed policy decision object and one or more distributed policy enforcement objects. In some embodiments, the distributed policy decision object is in data communications with the one or more distributed policy enforcement objects. In the example shown in FIG. 9, the example distributed policy enforcement object 901 is in data communications with the example distributed policy decision object 903.

As shown in FIG. 9, the example distributed data service cluster 905 receives data object service requests (for example, from a user computing device, from another distributed data service cluster) at block 907, and transmits data object service requests (for example, to another distributed data service cluster, to a user computing device) at block 909.

In some embodiments, upon receiving a data object service request at block 907, the example distributed data service cluster 905 (for example, the example distributed policy enforcement object 901 in the form of a service proxy) transmits a control policy evaluation request at block 911 to the distributed policy decision object 903. For example, the control policy evaluation request may be transmitted to an API 913 of the distributed policy decision object 903.

In some embodiments, the API 913 provides the control policy evaluation request to the policy document evaluation engine 917, and the policy document evaluation engine 917 evaluates the replicated policy information objects 919 that are distributed from the centralized policy information repository 929 based on the control policy evaluation request.

In some embodiments, the replicated policy information objects 919 retrieve data from additional data sources. For example, the replicated policy information objects 919 retrieves data from a database set 931 (for example, in the form of a caching system) comprising multiple databases that store data associated with various data services provided by the distributed and product-oriented computing platform (for example, but not limited to, the catalog service 935, the permissions service 937, the data classification service 939, and other services (including product-specific data) 941). Additionally, or alternatively, the replicated policy information objects 919 retrieve data from various schemas (such as, but not limited to, the manifold schema 933 shown in FIG. 9).

In some embodiments, the database set 931 provides another means for the end users (for example, users from the external organization) to dynamically configure data policies. In some embodiments, the database set 931 can serve as a distributed data cluster that provides tenant context data (for example, context data associated with end users). In some embodiments, retrieving data and/or information from the database set 931 provides technical advantages and benefits such as, but not limited to, enabling dynamic configurations of data policies.

In some embodiments, based on the replicated policy information objects 919, the example distributed policy decision object 903 generates a control policy evaluation response 921 and transmits the control policy evaluation response 921 to the example distributed policy enforcement object 901. In some embodiments, the example distributed policy enforcement object 901 generates a data object service response that describes one or more data operations in response to the data object service request received at block 907.

For example, the example distributed policy enforcement object 901 may allow or deny (as shown in block 923) the data object service request received at block 907. As another example, the example distributed policy enforcement object 901 may transform (as shown in block 925) the data object service request received at block 907 through mechanisms such as, but not limited to, encryption. As another example, the example distributed policy enforcement object 901 may route (as shown in block 927) the data object service request received at block 907 to a user computing device or to another distributed data service cluster.

Example Generations of Example Policy Information Objects

Referring now to FIG. 10, an example method 1000 in accordance with some embodiments of the present disclosure is illustrated. In particular, the example method 1000 illustrates example steps/operations of generating an example policy information object based on an example data control policy generation request in accordance with some embodiments of the present disclosure. In some embodiments, the example method 1000 is performed prior to receiving a data object service request (for example, prior to receiving the data object service request associated with a distributed data service cluster described above in connection with step/operation 804 of FIG. 8).

In the example shown in FIG. 10, the example method 1000 starts at block 1002 and then proceeds to step/operation 1004. At step/operation 1004, a processing circuitry (such as, but not limited to, the processor 305 of the distributed data service cluster 107A described above in connection with at least FIG. 1 and FIG. 3) receives a data control policy generation request from a first user computing device associated with a first user profile.

As described above, the data control policy generation request indicates a request to generate a policy information object. In some embodiments, the data control policy generation request is generated by a user computing device (such as, but not limited to, the user computing devices 101A, 101B, 101N, 105A, 105B, 105N described above in connection with FIG. 1) and transmitted to an example distributed and product-oriented computing platform (such as, but not limited to, the distributed and product-oriented computing platform 109 described above in connection with FIG. 1).

In some embodiments, the user computing device that transmits the data control policy generation request is associated with a user profile. As described above, the user profile comprises data and/or information associated with the user entity who operates the user computing device. In some embodiments, the user profile comprises a user identifier associated with the user entity.

In some embodiments, the user profile comprises an internal staff identifier. In such examples, the data control policy generation request indicates a request from an internal staff to generate a policy information object (including, but not limited to, platform-wide, organization-specific, and/or product-specific data policies).

Additionally, or alternatively, the user profile comprises an external organization identifier and an admin user identifier, or an external organization identifier and a non-admin user identifier. In such examples, the data control policy generation request indicates a request from an admin user of an external organization to generate a policy information object (including, but not limited to, platform-wide, organization-specific, and/or product-specific data policies).

Additionally, or alternatively, the user profile may be associated with other types of the identifiers.

In some embodiments, the data control policy generation request comprises metadata. For example, the data control policy generation request comprises metadata that describes a to-be-added data control policy. Additionally, or alternatively, the data control policy generation request comprises one or more identifiers (such as one or more product identifiers) that indicates the applicability of the to-be-added data control policy.

Referring back to FIG. 10, subsequent and/or in response to step/operation 1004, the example method 1000 proceeds to step/operation 1006. At step/operation 1006, a processing circuitry (such as, but not limited to, the processor 305 of the distributed data service cluster 107A described above in connection with at least FIG. 1 and FIG. 3) generates a policy information object based on the data control policy generation request and the first user profile.

As described above, the policy information object comprises policy application metadata and policy control metadata. In some embodiments, the processing circuitry generates the policy application metadata and/or the policy control metadata of the policy information object based at least in part on the data control policy generation request received at step/operation 1004 (and the user profile associated with the user computing device that transmitted the data control policy generation request at step/operation 1004).

For example, in response to determining that the user profile associated with the user computing device comprises an internal staff identifier, the processing circuitry generates the policy information object comprising policy application metadata with a platform-wide application indication.

As another example, in response to determining that the user profile associated with the user computing device comprises an external organization identifier and an admin user identifier, and that the data control policy generation request comprises an organization-specific policy indication, the processing circuitry generates the policy information object comprising policy application metadata with an organization-specific application indication.

As another example, in response to determining that the data control policy generation request comprises a product-specific policy indication, the processing circuitry generates the policy information object comprising policy application metadata with an product-specific application indication. Additional details are described herein.

Referring back to FIG. 10, subsequent and/or in response to step/operation 1006, the example method 1000 proceeds to step/operation 1008. At step/operation 1008, a processing circuitry (such as, but not limited to, the processor 305 of the distributed data service cluster 107A described above in connection with at least FIG. 1 and FIG. 3) stores the policy information object in the centralized policy information repository.

For example, subsequent to generating the policy information object at step/operation 1006, the processing circuitry may store the policy information object in a centralized policy information repository of an example distributed and product-oriented computing platform (such as, but not limited to, the centralized policy information repository 111 of an example distributed and product-oriented computing platform 109 described above in connection with FIG. 1, and/or the centralized policy information repository 503 of an example distributed and product-oriented computing platform 501 described above in connection with FIG. 5).

Referring back to FIG. 10, subsequent and/or in response to step/operation 1008, the example method 1000 proceeds to step/operation 1010. At step/operation 1010, a processing circuitry (such as, but not limited to, the processor 305 of the distributed data service cluster 107A described above in connection with at least FIG. 1 and FIG. 3) distributes the policy information object to the distributed policy decision object.

As described above, each distributed policy decision object of the plurality of distributed data service clusters comprises a plurality of replicated policy information objects. In some embodiments, the processing circuitry distributes the policy information object to each distributed policy decision object as a replicated policy information object of the plurality of replicated policy information objects.

As an example, the centralized policy information repository may transmit an electronic message to distributed policy decision objects of distributed data service clusters and request the distributed policy decision objects to replicate policy information objects from the centralized policy information repository. In such an example, each distributed policy decision object generates and stores replicated policy information objects based on the policy information objects from the centralized policy information repository.

As another example, each distributed policy decision object of distributed data service clusters may request replicated copies of the policy information objects from the centralized policy information repository as the replicated policy information objects. For example, each distributed policy decision object may transmit a request to the centralized policy information repository, and the centralized policy information repository may generate replicated policy information objects based on the policy information objects stored in the centralized policy information repository. In such an example, the centralized policy information repository transmits the replicated policy information objects to the distributed policy decision object for storage.

Referring back to FIG. 10, subsequent and/or in response to step/operation 1010, the example method 1000 proceeds to step/operation 1012 and ends.

Referring now to FIG. 11, an example block diagram 1100 illustrates example implementations of data control policies from user entities of the distributed and product-oriented computing platform.

As described above, example user entities of an example distributed and product-oriented computing platform in accordance with some embodiments of the present disclosure may include internal staff 1101 and external organizations 1103. In some embodiments, internal staff 1101 and external organizations 1103 have different requirements for data control policies. For example, internal staff 1101 may require data control policies to be applicable to the distributed and product-oriented computing platform as a whole (i.e., "platform-wide"), while external organizations 1103 may require data control policies to be only applicable to data specific to the external organization (i.e., "organization-specific").

In some embodiments, data control policies from the internal staff 1101 and external organizations 1103 may be implemented as control activities 1105. For example, the control activities 1105 may require manual implementations of the data control policies.

In contrast, various embodiments of the present disclosure provide programmatically enforced technical controls. In particular, various embodiments of the present disclosure generate policy information objects 1107.

In the example shown in FIG. 11, some of the policy information objects 1107 are generated based on data control policy generation requests from the internal staff 1101, and some of the policy information objects 1107 are generated based on data control policy generation requests from external organizations 1103. In particular, a portion 1109 of the policy information objects 1107 provides authorization/permission control. For example, a data object service response generated based on a policy information object from the portion 1109 of the policy information objects 1107 comprises data permission metadata that comprises one of an allowance indication, a denial indication, or an additional information request indication. Further, the policy information objects 1107 also comprise policy information objects providing data control policies that are not authorization/permission control (for example, data routing, data transformation, data filtering, and/or the like).

Referring now to FIG. 12, an example block diagram illustrates an example formation of an example centralized policy information repository in accordance with some embodiments of the present disclosure.

In particular, FIG. 12 illustrates an initial stage 1206 associated with policy information objects in the example distributed and product-oriented computing platform. At the initial stage 1206, each distributed data service cluster (for example, the distributed data service cluster 1202A, the distributed data service cluster 1202B, the distributed data service cluster 1202C, the distributed data service cluster 1202D, the distributed data service cluster 1202E, and the distributed data service cluster 1202F) stores various types of policy information objects that include, but not limited to, policy information objects with platform-wide application indications (e.g. platform-wide data control policies), policy information objects with organization-specific application indications (e.g. organization-specific data control policies), and policy information objects with product-specific application indications (e.g. product-specific data control policies).

At the centralized policy information repository formation stage 1208, policy information objects with platform-wide application indications and policy information objects with organization-specific application indications are moved from each distributed data service cluster (for example, each of the distributed data service cluster 1202A, the distributed data service cluster 1202B, the distributed data service cluster 1202C, the distributed data service cluster 1202D, the distributed data service cluster 1202E, and the distributed data service cluster 1202F) to the centralized policy information repository 1204.

As described above, the centralized policy information repository 1204 provides technical benefits and advantages such as, but not limited to, enabling the implementation of unified data control policies in the distributed and product-oriented computing platform. For example, by implementing a single policy information repository, various embodiments of the present disclosure allow for reduced technical effort to implement compliance and other security controls, and also allow for easier verification and visibility across all policies. Additional details are described herein.

Example Generations and Implementations of
Example Platform-Wide Data Control Policies Referring now to FIG. 13, an example method 1300 for generating example policy information objects in accordance with some embodiments of the present disclosure is illustrated. In particular, the example method 1300 illustrates example steps/operations of generating an example policy information object that comprises policy application metadata with a platform-wide application indication.

In the example shown in FIG. 13, the example method 1300 starts at block 1301 and then proceeds to step/operation 1303. At step/operation 1303, a processing circuitry (such as, but not limited to, the processor 305 of the distributed data service cluster 107A described above in connection with at least FIG. 1 and FIG. 3) receives a data control policy generation request from a first user computing device associated with a first user profile.

In some embodiments, the processing circuitry receives the data control policy generation request similar to those described above in connection with at least step/operation 1004 of FIG. 10.

Referring back to FIG. 13, subsequent and/or in response to step/operation 1303, the example method 1300 proceeds to step/operation 1305. At step/operation 1305, a processing circuitry (such as, but not limited to, the processor 305 of the distributed data service cluster 107A described above in connection with at least FIG. 1 and FIG. 3) determines that the data control policy generation request comprises a platform-wide policy indication and a plurality of internal staff identifiers.

In some embodiments, the processing circuitry parses the data control policy generation request to determine that the data control policy generation request comprises the platform-wide policy indication and the plurality of internal staff identifiers.

For example, the data control policy generation request may comprise a plurality of internal staff identifiers, which indicates that the data control policy described in the data control policy generation request is applicable to the plurality of internal staff identifiers. As described above, an internal staff is a type of user entity who is employed by the provider of the distributed and product-oriented computing platform to build, configure, maintain, and/or manage the distributed and product-oriented computing platform. As such, an internal staff may request access to any data in the distributed and product-oriented computing platform (including data associated with any distributed data service cluster or cloud-based software products). When a data control policy is applicable to an internal staff, the data control policy should be implemented in all distributed data service clusters and all cloud-based software products provided by the distributed and product-oriented computing platform. In other words, the platform-wide policy indication indicates that the data control policy described in the data control policy generation request is applicable to all data in the distributed and product-oriented computing platform (including data associated with all distributed data service clusters and all cloud-based software products).

Referring back to FIG. 13, subsequent and/or in response to step/operation 1305, the example method 1300 proceeds to generating an example policy information object based on the data control policy generation request received at step/operation 1303 and determined at step/operation 1305. As described above, an example policy information object comprises policy application metadata and policy control metadata. In the example shown in FIG. 13, the processing circuitry generates the policy application metadata for the example policy information object at step/operation 1307, and generates the policy control metadata for the example policy information object at step/operation 1309.

For example, subsequent and/or in response to step/operation 1305, the example method 1300 proceeds to step/operation 1307. At step/operation 1307, a processing circuitry (such as, but not limited to, the processor 305 of the distributed data service cluster 107A described above in connection with at least FIG. 1 and FIG. 3) generates the policy application metadata that comprises a platform-wide application indication associated with the plurality of internal staff identifiers.

As described above, the policy application metadata is a part of an example policy information object and indicates the applicability of a data control policy in the distributed and product-oriented computing platform. Because the processing circuitry determines that the data control policy generation request comprises a platform-wide policy indication, the policy application metadata correspondingly comprises a platform-wide application indication.

Referring back to FIG. 13, subsequent and/or in response to step/operation 1307, the example method 1300 proceeds to step/operation 1309. At step/operation 1309, a processing circuitry (such as, but not limited to, the processor 305 of the distributed data service cluster 107A described above in connection with at least FIG. 1 and FIG. 3) generates the policy control metadata based on the data control policy generation request.

As an example, the data control policy generation request indicates a data access peer review policy associated with the plurality of internal staff identifiers from step/operation 1305. In such an example, the data access peer review policy indicates that data object access requests from user entities associated with any one of the plurality of internal staff identifiers must be peer reviewed. In such an example, the policy control metadata of the policy information object comprises a data access peer review indication that indicates the data access peer review policy.

In some embodiments, after the processing circuitry generates the policy application metadata for the example policy information object at step/operation 1307 and generates the policy control metadata for the example policy information object at step/operation 1309, the processing circuitry stores the example policy information object in centralized policy information repository. In some embodiments, the centralized policy information repository replicates the example policy information object and distributes them to each distributed policy decision object of each distributed data service cluster, similar to those described above in connection with at least FIG. 10.

Referring back to FIG. 13, subsequent and/or in response to step/operation 1309, the example method 1300 proceeds to block A. In some embodiments, block A ends the example method 1300. In some embodiments, block A connected the example method 1300 shown in FIG. 13 to the example method 1400 shown in FIG. 14.

Referring now to FIG. 14, the example method 1400 for implementing example policy information objects in accordance with some embodiments of the present disclosure is illustrated. In particular, the example method 1400 illustrates example steps/operations of generating an example data object service response that is based on an example replicated policy information object comprising policy application metadata with a platform-wide application indication.

In the example shown in FIG. 14, the example method 1400 starts at block A (for example, continuing from the example method 1300 described above in connection with FIG. 13) and then proceeds to step/operation 1404. At step/operation 1404, a processing circuitry (such as, but not limited to, the processor 305 of the distributed data service cluster 107A described above in connection with at least FIG. 1 and FIG. 3) receives a second data object service request indicating a data object access request from a second user computing device associated with a second user profile.

As described above, the data object service request may be in the form of an electronic message that indicates a request for one or more data services associated with one or more data objects. In particular, the data object access request is a type of data object service request that indicates a request to access one or more data objects stored in the distributed and product-oriented computing platform.

In some embodiments, the data object service request is transmitted from a user computing device. As described above, the user computing device can be associated with a user profile of the user entity who operated the user computing device to transmit the data object service request.

Referring back to FIG. 14, subsequent and/or in response to step/operation 1404, the example method 1400 proceeds to step/operation 1406. At step/operation 1406, a processing circuitry (such as, but not limited to, the processor 305 of the distributed data service cluster 107A described above in connection with at least FIG. 1 and FIG. 3) transmits a control policy evaluation request based at least in part on the second data object service request received at step/operation 1404 to the distributed policy decision object. For example, the processing circuitry generates and transmits the control policy evaluation request similar to those described in connection with at least step/operation 806 of FIG. 8.

In some embodiments, subsequent and/or in response to step/operation 1406, the example method 1400 proceeds to step/operation 1408. At step/operation 1408, a processing circuitry (such as, but not limited to, the processor 305 of the distributed data service cluster 107A described above in connection with at least FIG. 1 and FIG. 3) receives a control policy evaluation response from the distributed policy decision object. For example, the processing circuitry receives the control policy evaluation response similar to those described above in connection with at least step/operation 808 of FIG. 8.

The example method 1400 shown in FIG. 14 further illustrates an example of the distributed policy decision object generating the control policy evaluation response based at least in part on step/operation 1414. At step/operation 1414, the distributed policy decision object determines that the second user profile is associated with an internal staff identifier from the plurality of internal staff identifiers associated with a replicated policy information object.

After the distributed policy decision object receives a control policy evaluation request based at least in part on the second data object service request received at step/operation 1404, the distributed policy decision object parses the second user profile to determine an internal staff identifier associated with the second user profile.

In some embodiments, the distributed policy decision object comprises a plurality of replicated policy information objects that are distributed from a centralized policy information repository. In some embodiments, the distributed policy decision object traverses the replicated policy information objects according to the internal staff identifier associated with the second user profile.

As described above in connection with at least FIG. 13, the plurality of replicated policy information objects stored in the distributed policy decision object may comprise one or more replicated policy information objects (which are replicated from one or more policy information objects in the centralized policy information repository) having policy control metadata associated with a plurality of internal staff identifiers. In some embodiments, the distributed policy decision object determines that the internal staff identifier associated with the second user profile matches an internal staff identifier associated with the at least one replicated policy information object. In some embodiments, the distributed policy decision object generates the control policy evaluation response that indicates the at least one replicated policy information object.

Referring back to FIG. 14, subsequent and/or in response to step/operation 1408, the example method 1400 proceeds to step/operation 1410. At step/operation 1410, a processing circuitry (such as, but not limited to, the processor 305 of the distributed data service cluster 107A described above in connection with at least FIG. 1 and FIG. 3) generates the data object service response comprising the data routing metadata.

In some embodiments, the at least one replicated policy information object indicated in the control policy evaluation response may comprise policy control metadata with a data access peer review indication, and the data access peer review indication specifies that data object access requests from user entities associated with any one of the plurality of internal staff identifiers must be peer reviewed. In some embodiments, the data access peer review indication further specifies a network address of a distributed data service cluster that provides peer review service.

As described above in connection with step/operation 1404, the second data object service request indicates a data object access request. Because the data access peer review indication specifies that data object access requests from user entities associated with any one of the plurality of internal staff identifiers must be peer reviewed, the processing circuitry generates the data object service response comprising the data routing metadata, and the data routing metadata comprises a network address indication associated with the distributed data service cluster that provides the peer review service.

In some embodiments, based on the data object service response generated at step/operation 1410, one or more distributed policy enforcement objects transmit the second data object service request received at step/operation 1404 to the distributed data service cluster that provides the peer review service.

Referring back to FIG. 14, subsequent and/or in response to step/operation 1410, the example method 1400 proceeds to step/operation 1412 and ends.

Referring now to FIG. 15 and FIG. 16, example portions of the example distributed and product-oriented computing platform shown in FIG. 5 are provided. In particular, FIG. 15 and FIG. 16 illustrate example implementations of policy information objects that are associated with platform-wide application indications.

Referring now to FIG. 15, the example distributed and product-oriented computing platform 1501 comprises a centralized policy information repository 1503 in data communications with a plurality of distributed data service clusters (such as, but not limited to, the distributed data service cluster 1505A, the distributed data service cluster 1505B, the distributed data service cluster 1505C, and the distributed data service cluster 1505D). In particular, the centralized policy information repository 1503 distributes replicated policy information objects (including policy information objects with a platform-wide policy indications) to each distributed policy decision object associated with each distributed data service cluster.

In some embodiments, an internal staff 1507 may submit a data object service request to the distributed and product-oriented computing platform 1501 via a user computing device. In some embodiments, the centralized policy information repository 1503 may comprise a policy information object that requires internal staff to complete multi-factor authentications for submitting data object service requests. Similar to those described above, the centralized policy information repository 1503 distributes policy information objects to each distributed policy decision object of each distributed data service cluster, and each distributed data service cluster comprises one or more distributed policy enforcement objects. As such, the first distributed data service cluster that receives the data object service request (for example, the distributed data service cluster 1505D) can enforce the data control policy. Additionally, the distributed policy enforcement objects in other distributed data service clusters can provide "defense in depth," allowing the data control policy to be continuously enforced as the data object service request traverses through the distributed and product-oriented computing platform 1501, therefore providing the technical advantages and benefits of uniformed data policy implementation throughout the distributed and product-oriented computing platform.

Referring now to FIG. 16, the example distributed and product-oriented computing platform 1602 comprises a centralized policy information repository 1604 in data communications with a plurality of distributed data service clusters (such as, but not limited to, the distributed data service cluster 1606A, the distributed data service cluster 1606B, the distributed data service cluster 1606C, and the distributed data service cluster 1606D). In particular, the centralized policy information repository 1604 distributes replicated policy information objects (including policy information objects with a platform-wide policy indications) to each distributed policy decision object associated with each distributed data service cluster.

FIG. 16 illustrates an example process of dynamically adding a data access peer review policy to an example distributed and product-oriented computing platform (for example, to the example distributed and product-oriented computing platform 1501 shown in FIG. 15). In the example shown in FIG. 16, an internal staff 1610 may transmit a data control policy generation request to the distributed and product-oriented computing platform 1602 via a user computing device, and the data control policy generation request indicates a data access peer review policy.

In some embodiments, the distributed and product-oriented computing platform adds a distributed data service cluster 1608 that provides peer review service. In some embodiments, the distributed and product-oriented computing platform generates a policy information object based on the data control policy generation request, and stores the policy information object in the centralized policy information repository 1604, similar to those described above in connection with at least FIG. 13. For example, the policy information object indicates that data object service requests associated with internal staff identifiers must be peer reviewed through the peer review service provided by the distributed data service cluster 1608.

In some embodiments, when a user entity associated with an internal staff identifier submits a data object service request to the distributed and product-oriented computing platform 1602, the distributed data service cluster 1606C may receive the data object service request, and the distributed policy decision object of the distributed data service cluster 1606C may determine that the data object service request should be peer reviewed through the distributed data service cluster 1608. In such an example, the distributed data service cluster 1606C transmits the data object service request to the distributed data service cluster 1608.

As illustrated in the example shown in FIG. 16, various embodiments of the present disclosure provide technical advantages and benefits that include, but not limited to, dynamically adding data control policies that can be unified throughout the distributed and product-oriented computing platform, and without the need to reconfigure each distributed data service cluster to add the new data control policies.

Example Generations and Implementations of Example Organization-Specific Data Control Policies Referring now to FIG. 17, an example method 1700 for generating example policy information objects in accordance with some embodiments of the present disclosure is illustrated. In particular, the example method 1700 illustrates example steps/operations of generating an example policy information object that comprises policy application metadata with an organization-specific application indication.

In the example shown in FIG. 17, the example method 1700 starts at block 1701 and then proceeds to step/operation 1703. At step/operation 1703, a processing circuitry (such as, but not limited to, the processor 305 of the distributed data service cluster 107A described above in connection with at least FIG. 1 and FIG. 3) receives a data control policy generation request from a first user computing device associated with a first user profile.

In some embodiments, the processing circuitry receives the data control policy generation request similar to those described above in connection with at least step/operation 1004 of FIG. 10.

Referring back to FIG. 17, subsequent and/or in response to step/operation 1703, the example method 1700 proceeds to step/operation 1705. At step/operation 1705, a processing circuitry (such as, but not limited to, the processor 305 of the distributed data service cluster 107A described above in connection with at least FIG. 1 and FIG. 3) determines that the data control policy generation request comprises an organization-specific policy indication.

In some embodiments, the processing circuitry parses the data control policy generation request to determine the organization-specific policy indication. As described above, the organization-specific policy indication indicates that the data control policy is only applicable to data objects associated with a particular external organization.

In some embodiments, subsequent to determining that the data control policy generation request comprises the organization-specific policy indication, the example method 1700 proceeds to determining the particular external organization that is specified by the organization-specific policy indication. For example, subsequent and/or in response to step/operation 1705, the example method 1700 proceeds to step/operation 1707. At step/operation 1707, a processing circuitry (such as, but not limited to, the processor 305 of the distributed data service cluster 107A described above in connection with at least FIG. 1 and FIG. 3) determines that the first user profile is associated with an external organization identifier and an admin user identifier.

In some embodiments, the processing circuitry parses the first user profile to determine the external organization identifier and the admin user identifier associated with the first user profile.

As another example, the user computing device may be operated by an admin user from an external organization of the distributed and product-oriented computing platform. In other words, the user computing device is operated by a user entity who is an admin user from an external organization that purchased or subscribed to one or more cloud-based software products of the distributed and product-oriented computing platform. In such an example, the first user profile comprises an external organization identifier associated with the external organization, as well as an admin user identifier associated with the external organization identifier.

Referring back to FIG. 17, subsequent and/or in response to step/operation 1707, the example method 1700 proceeds to generating an example policy information object based on the data control policy generation request received at step/operation 1703. As described above, an example policy information object comprises policy application metadata and policy control metadata. In the example shown in FIG. 17, the processing circuitry generates the policy application metadata for the example policy information object at step/operation 1707.

For example, subsequent and/or in response to step/operation 1707, the example method 1700 proceeds to step/operation 1709. At step/operation 1709, a processing circuitry (such as, but not limited to, the processor 305 of the distributed data service cluster 107A described above in connection with at least FIG. 1 and FIG. 3) generates the policy application metadata that comprises an organization-specific application indication associated with the external organization identifier.

As described above, the processing circuitry determines that the data control policy generation request comprises an organization-specific policy indication at step/operation 1705. In other words, the data control policy generation request indicates a request to generate a policy information object based on the data control policy that is specific to a particular external organization. In some embodiments, to determine the identifier of the particular external organization, the processing circuitry determines the external organization identifier that is associated with the first user profile at step/operation 1707. Because the first user profile is associated with an admin user identifier and an external organization identifier, the processing circuitry determines that an admin user of the external organization decides to implement a data control policy that is specific to the external organization. As such, the processing circuitry generates the policy application metadata that comprises an organization-specific application indication associated with the external organization identifier.

Referring back to FIG. 17, subsequent and/or in response to step/operation 1709, the example method 1700 proceeds to block B. In some embodiments, block B ends the example method 1700. In some embodiments, block B connects the example method 1700 shown in FIG. 17 to the example method 1800 shown in FIG. 18, and/or connects the example method 1700 shown in FIG. 17 to the example method 1900 shown in FIG. 19.

Referring now to FIG. 18, the example method 1800 for implementing example policy information objects in accordance with some embodiments of the present disclosure is illustrated. In particular, the example method 1800 illustrates example steps/operations of generating an example data object service response that is based on an example replicated policy information object comprising policy application metadata with an organization-specific application indication.

In the example shown in FIG. 18, the example method 1800 starts at block B (for example, continuing from the example method 1700 described above in connection with FIG. 17) and then proceeds to step/operation 1802. At step/operation 1802, a processing circuitry (such as, but not limited to, the processor 305 of the distributed data service cluster 107A described above in connection with at least FIG. 1 and FIG. 3) determines that the data control policy generation request indicates a data access multi-factor authentication policy associated with the external organization identifier.

In some embodiments, the processing circuitry parses the data control policy generation request to determine the data access multi-factor authentication policy associated with the external organization identifier. As described above, the data access multi-factor authentication policy requires a user entity to complete two or more independent credential authentication processes in connection with submitting data object access requests through a user computing device. In some embodiments, when a data access multi-factor authentication policy is associated with the external organization identifier, the data access multi-factor authentication policy requires a user entity to complete independent credential authentication processes when the user entity submits data object access requests to access data objects associated with the external organization identifier.

Referring back to FIG. 18, subsequent and/or in response to step/operation 1802, the example method 1800 proceeds to step/operation 1804. At step/operation 1804, a processing circuitry (such as, but not limited to, the processor 305 of the distributed data service cluster 107A described above in connection with at least FIG. 1 and FIG. 3) generates the policy control metadata that comprises a data access multi-factor authentication indication associated with the external organization identifier.

As described above, the data access multi-factor authentication indication specifies that the data control policy described in the example policy information object is a data access multi-factor authentication policy. As described above, the data access multi-factor authentication policy is associated with an external organization identifier. Accordingly, the data access multi-factor authentication indication is associated with the external organization identifier. In other words, the data access multi-factor authentication indication indicates that the user entity who submits data object access requests to access data objects associated with the external organization identifier must complete independent credential authentication processes.

In some embodiments, after the processing circuitry generates the policy application metadata for the example policy information object (for example, in connection with the example method 1700 shown in FIG. 17) and generates the policy control metadata for the example policy information object at step/operation 1804, the processing circuitry stores the example policy information object in centralized policy information repository. In some embodiments, the centralized policy information repository replicates the example policy information object and distributes them to each distributed policy decision object of each distributed data service cluster, similar to those described above in connection with at least FIG. 10.

Referring back to FIG. 18, subsequent and/or in response to step/operation 1804, the example method 1800 proceeds to step/operation 1806. At step/operation 1806, a processing circuitry (such as, but not limited to, the processor 305 of the distributed data service cluster 107A described above in connection with at least FIG. 1 and FIG. 3) receives a data object service request indicating a data object access request associated with at least one data object in the distributed and product-oriented computing platform.

In some embodiments, the data object service request is transmitted from a user computing device and received by the distributed data service cluster. As described above, the data object service request may be in the form of an electronic message that indicates a request for one or more data services associated with one or more data objects. In some embodiments, the data object service request indicates a data object access request, which is a type of data object service request that indicates a request to access one or more data objects stored in the distributed and product-oriented computing platform.

In some embodiments, the distributed data service cluster is associated with a distributed policy decision object and one or more distributed policy enforcement objects. For example, the distributed data service cluster may comprise the distributed policy decision object and the one or more distributed policy enforcement objects that are in data communications with one another.

Referring back to FIG. 18, subsequent and/or in response to step/operation 1806, the example method 1800 proceeds to step/operation 1808. At step/operation 1808, a processing circuitry (such as, but not limited to, the processor 305 of the distributed data service cluster 107A described above in connection with at least FIG. 1 and FIG. 3) transmits a control policy evaluation request based at least in part on the data object service request received at step/operation 1806 to the distributed policy decision object. For example, the processing circuitry generates and transmits the control policy evaluation request similar to at least step/operation 806 described above in connection with FIG. 8.

Referring back to FIG. 18, subsequent and/or in response to step/operation 1808, the example method 1800 proceeds to step/operation 1810. At step/operation 1810, a processing circuitry (such as, but not limited to, the processor 305 of the distributed data service cluster 107A described above in connection with at least FIG. 1 and FIG. 3) receives a control policy evaluation response from the distributed policy decision object. For example, the processing circuitry receives the control policy evaluation response similar to at least step/operation 808 described above in connection with FIG. 8.

The example method 1800 shown in FIG. 18 further illustrates an example of the distributed policy decision object generating the control policy evaluation response based at least in part on step/operation 1816. At step/operation 1816, the distributed policy decision object determines that the at least one data object is associated with the external organization identifier.

After receiving the control policy evaluation request at step/operation 1808, the distributed policy decision object parses the at least one data object associated with the data object access request received at step/operation 1806, and determines one or more identifiers associated with the at least one data object, including, but not limited to, one or more external organization identifiers. For example, when a data object is generated or owned by an external organization associated with an external organization identifier, the data object is associated with the external organization identifier.

In some embodiments, the distributed policy decision object comprises a plurality of replicated policy information objects that are distributed from a centralized policy information repository. In some embodiments, the distributed policy decision object traverses the replicated policy information objects according to external organization identifier(s) associated with the at least one data object of the data object access request.

As described above in connection with at least step/operation 1709 of FIG. 17 and step/operation 1804 of FIG. 18, the plurality of replicated policy information objects stored in the distributed policy decision object may comprise one or more replicated policy information objects (replicated from one or more policy information objects in the centralized policy information repository) having policy application metadata and/or policy control metadata associated with one or more external organization identifiers.

In some embodiments, the distributed policy decision object determines that the external organization identifier associated with the data object access request matches an external organization identifier associated with the at least one replicated policy information object. In some embodiments, the distributed policy decision object generates the control policy evaluation response that indicates the at least one replicated policy information object.

Referring back to FIG. 18, subsequent and/or in response to step/operation 1810, the example method 1800 proceeds to step/operation 1812. At step/operation 1812, a processing circuitry (such as, but not limited to, the processor 305 of the distributed data service cluster 107A described above in connection with at least FIG. 1 and FIG. 3) generates the data object service response comprising the data permission metadata based on the data access multi-factor authentication policy.

In some embodiments, the at least one replicated policy information object indicated in the control policy evaluation response may comprise policy control metadata with a data access multi-factor authentication indication (for example, as described above in connection with at least step/operation 1804 of FIG. 18), and the data access multi-factor authentication indication specifies the data access multi-factor authentication policy that requires a user entity to complete independent credential authentication processes when the user entity submits data object access requests to access data objects associated with the external organization identifier of the data access multi-factor authentication policy.

In some embodiments, the processing circuitry generates the data object service response based on the data access multi-factor authentication policy. In some embodiments, the data object service response comprises the data permission metadata. For example, if the user entity who submitted the data object access request has completed the independent credential authentication processes, the data permission metadata comprises an allowance indication, indicating that the at least one data object associated with the external organization identifier can be accessed by the user entity. As another example, if the user entity who submitted the data object access request has not completed the independent credential authentication processes, the data permission metadata comprises a denial indication, indicating that the at least one data object associated with the external organization identifier cannot be accessed by the user entity unless the user entity completes the independent credential authentication processes.

In some embodiments, one or more distributed policy enforcement objects of the distributed data service cluster can respond to the data object service request received at step/operation 1806 based on the data object service response generated at step/operation 1812.

Referring back to FIG. 18, subsequent and/or in response to step/operation 1812, the example method 1800 proceeds to step/operation 1814 and ends.

Referring now to FIG. 19, the example method 1900 for implementing example policy information objects in accordance with some embodiments of the present disclosure is illustrated. In particular, the example method 1900 illustrates example steps/operations of generating an example data object service response that is based on an example replicated policy information object comprising policy application metadata with an organization-specific application indication.

In the example shown in FIG. 19, the example method 1900 starts at block B (for example, continuing from the example method 1700 described above in connection with FIG. 17) and then proceeds to step/operation 1901. At step/operation 1901, a processing circuitry (such as, but not limited to, the processor 305 of the distributed data service cluster 107A described above in connection with at least FIG. 1 and FIG. 3) determines that the data control policy generation request indicates a data access restriction policy associated with the external organization identifier.

In some embodiments, the processing circuitry parses the data control policy generation request to determine the data access restriction policy associated with the external organization identifier. As described above, the data access restriction policy defines data access restrictions associated with certain external organization identifiers. For example, when the data access restriction policy is associated with an external organization identifier, the data access restriction policy indicates that access to data objects associated with the external organization identifier is restricted, limited, or prevented.

Referring back to FIG. 19, subsequent and/or in response to step/operation 1901, the example method 1900 proceeds to step/operation 1903. At step/operation 1903, a processing circuitry (such as, but not limited to, the processor 305 of the distributed data service cluster 107A described above in connection with at least FIG. 1 and FIG. 3) generates the policy control metadata comprising a data access restriction indication associated with the external organization identifier.

As described above, the data access restriction indication specifies that the data control policy described in the example policy information object is a data access restriction policy. In some examples, the data access restriction policy is associated with an external organization identifier. In such examples, the data access restriction indication is associated with the external organization identifier. In other words, the data access restriction indication indicates that there is restricted, limited, or no access to data objects associated with the external organization identifier.

In some embodiments, after the processing circuitry generates the policy application metadata for the example policy information object (for example, in connection with the example method 1700 shown in FIG. 17) and generates the policy control metadata for the example policy information object at step/operation 1903, the processing circuitry stores the example policy information object in centralized policy information repository. In some embodiments, the centralized policy information repository replicates the example policy information object and distributes them to each distributed policy decision object of each distributed data service cluster, similar to those described above in connection with at least FIG. 10.

Referring back to FIG. 19, subsequent and/or in response to step/operation 1903, the example method 1900 proceeds to step/operation 1905. At step/operation 1905, a processing circuitry (such as, but not limited to, the processor 305 of the distributed data service cluster 107A described above in connection with at least FIG. 1 and FIG. 3) receives a data object service request indicating a data object access request associated with at least one data object in the distributed and product-oriented computing platform.

As described above, the data object service request may be in the form of an electronic message that indicates a request for one or more data services associated with one or more data objects. In some embodiments, the data object service request indicates a data object access request, which is a type of data object service request that indicates a request to access at least one data objects stored in the distributed and product-oriented computing platform.

In some embodiments, the data object service request is transmitted from a user computing device associated with a user identifier, and is therefore associated with the user identifier. As described above, the user computing device can be associated with a user profile of a user entity who operated the user computing device to transmit the data object service request.

In some embodiments, the distributed data service cluster is associated with a distributed policy decision object and one or more distributed policy enforcement objects. For example, the distributed data service cluster may comprise the distributed policy decision object and the one or more distributed policy enforcement objects that are in data communications with one another.

Referring back to FIG. 19, subsequent and/or in response to step/operation 1905, the example method 1900 proceeds to step/operation 1907. At step/operation 1907, a processing circuitry (such as, but not limited to, the processor 305 of the distributed data service cluster 107A described above in connection with at least FIG. 1 and FIG. 3) transmits a control policy evaluation request based at least in part on the data object service request received at step/operation 1905 to the distributed policy decision object. For example, the processing circuitry generates and transmits the control policy evaluation request similar to at least step/operation 806 described above in connection with FIG. 8.

Referring back to FIG. 19, subsequent and/or in response to step/operation 1907, the example method 1900 proceeds to step/operation 1909. At step/operation 1909, a processing circuitry (such as, but not limited to, the processor 305 of the distributed data service cluster 107A described above in connection with at least FIG. 1 and FIG. 3) receives a control policy evaluation response from the distributed policy decision object. For example, the processing circuitry receives the control policy evaluation response similar to at least step/operation 808 described above in connection with FIG. 8.

The example method 1900 shown in FIG. 19 further illustrates an example of the distributed policy decision object generating the control policy evaluation response based at least in part on step/operation 1915. At step/operation 1915, the distributed policy decision object determines that the at least one data object is associated with the external organization identifier.

After receiving the control policy evaluation request at step/operation 1905, the distributed policy decision object parses the at least one data object associated with the data object access request received at step/operation 1905, and determines one or more identifiers associated with the at least one data object, including, but not limited to, one or more external organization identifiers. For example, when a data object is generated or owned by an external organization associated with an external organization identifier, the data object is associated with the external organization identifier.

In some embodiments, the distributed policy decision object comprises a plurality of replicated policy information objects that are distributed from a centralized policy information repository. In some embodiments, the distributed policy decision object traverses the replicated policy information objects according to external organization identifier(s) associated with the at least one data object of the data object access request.

As described above in connection with at least step/operation 1709 of FIG. 17 and step/operation 1903 of FIG. 19, the plurality of replicated policy information objects stored in the distributed policy decision object may comprise one or more replicated policy information objects (replicated from one or more policy information objects in the centralized policy information repository) having policy application metadata and/or policy control metadata associated with one or more external organization identifiers.

In some embodiments, the distributed policy decision object determines that the external organization identifier associated with the data object access request matches an external organization identifier associated with the at least one replicated policy information object. In some embodiments, the distributed policy decision object generates the control policy evaluation response that indicates the at least one replicated policy information object.

Referring back to FIG. 19, subsequent and/or in response to step/operation 1909, the example method 1900 proceeds to step/operation 1911. At step/operation 1911, a processing circuitry (such as, but not limited to, the processor 305 of the distributed data service cluster 107A described above in connection with at least FIG. 1 and FIG. 3) generates the data object service response comprising the data permission metadata based on the data access restriction policy.

In some embodiments, the at least one replicated policy information object indicated in the control policy evaluation response may comprise policy control metadata with a data access restriction indication (for example, as described above in connection with at least step/operation 1903 of FIG. 19), and the data access restriction indication specifies the data access restriction policy that restricts, limits, or prevents user entities from accessing the at least one data object associated the external organization identifier of the data access restriction policy.

In some embodiments, the processing circuitry generates the data object service response based on the data access restriction policy. In some embodiments, the data object service response comprises the data permission metadata. For example, the data permission metadata may comprise a denial indication, indicating that access to the at least one data object is limited and/or restricted.

In some embodiments, one or more distributed policy enforcement objects of the distributed data service cluster can respond to the data object service request received at step/operation 1905 based on the data object service response generated at step/operation 1911.

Referring back to FIG. 19, subsequent and/or in response to step/operation 1911, the example method 1900 proceeds to step/operation 1913 and ends.

Example Generations and Implementations of Example Product-Specific Data Control Policies Referring now to FIG. 20, an example method 2000 for generating and implementing example policy information objects in accordance with some embodiments of the present disclosure is illustrated. In particular, the example method 2000 illustrates example steps/operations of generating an example policy information object that comprises policy application metadata with a product-specific application indication, and generating an example data object service response that is based on the example replicated policy information object.

In the example shown in FIG. 20, the example method 2000 starts at step/operation 2002 and then proceeds to step/operation 2004. At step/operation 2004, a processing circuitry (such as, but not limited to, the processor 305 of the distributed data service cluster 107A described above in connection with at least FIG. 1 and FIG. 3) determines that the data control policy generation request comprises a product-specific policy indication associated with one or more product identifiers.

For example, the processing circuitry receives the data control policy generation request similar to those described above in connection with at least step/operation 804 of FIG. 8 and/or step/operation 1004 of FIG. 10.

In some embodiments, subsequent to receiving the data control policy generation request, the processing circuitry parses the data control policy generation request to determine the product-specific policy indication. As described above, the product-specific policy indication indicates that the data control policy is only applicable to one or more particular cloud-based software products.

In some embodiments, subsequent to determining that the data control policy generation request comprises the product-specific policy indication, the example method 2000 proceeds to determine the particular product identifier that is specified by the product-specific policy indication. For example, the processing circuitry further parses the data control policy generation request to determine one or more product identifiers associated with the product-specific policy indication. In such an example, the data control policy is only applicable to one or more particular cloud-based software products associated with the one or more product identifiers.

Referring back to FIG. 20, subsequent and/or in response to step/operation 2004, the example method 2000 proceeds to step/operation 2006. At step/operation 2006, a processing circuitry (such as, but not limited to, the processor 305 of the distributed data service cluster 107A described above in connection with at least FIG. 1 and FIG. 3) generates the policy application metadata comprising a product-specific application indication associated with the one or more product identifiers.

As described above, the processing circuitry determines that the data control policy generation request comprises a product-specific policy indication associated with the one or more product identifiers at step/operation 1705. In other words, the data control policy generation request indicates a request to generate a policy information object based on a data control policy that is specific to one or more particular cloud-based software products. Accordingly, the processing circuitry generates the policy application metadata for the policy information object, and the policy application metadata comprises a product-specific application indication associated with the one or more product identifiers.

Referring back to FIG. 20, subsequent and/or in response to step/operation 2006, the example method 2000 proceeds to step/operation 2008. At step/operation 2008, a processing circuitry (such as, but not limited to, the processor 305 of the distributed data service cluster 107A described above in connection with at least FIG. 1 and FIG. 3) generates the policy control metadata that comprises a data access restriction indication associated with the one or more product identifiers.

For example, similar to those described above in connection with at least step/operation 1901 of FIG. 19, the processing circuitry may determine that the data control policy generation request indicates a data access restriction policy associated with the one or more product identifiers. In such an example, the processing circuitry parses the data control policy generation request to determine the data access restriction policy associated with the one or more product identifiers. As described above, the data access restriction policy defines data access restrictions associated with certain product identifier(s). For example, when the data access restriction policy is associated with a product identifier, the data access restriction policy indicates that access to the cloud-based software product associated with the product identifier is restricted, limited, or prevented.

In some embodiments, after the processing circuitry generates the policy application metadata for the example policy information object at step/operation 2006 and generates the policy control metadata for the example policy information object at step/operation 2008, the processing circuitry stores the example policy information object in centralized policy information repository. In some embodiments, the centralized policy information repository replicates the example policy information object and distributes them to each distributed policy decision object of each distributed data service cluster, similar to those described above in connection with at least FIG. 10.

Referring back to FIG. 20, subsequent and/or in response to step/operation 2008, the example method 2000 proceeds to step/operation 2010. At step/operation 2010, a processing circuitry (such as, but not limited to, the processor 305 of the distributed data service cluster 107A described above in connection with at least FIG. 1 and FIG. 3) receives a data object service request indicating a data object access request associated with a distributed data service cluster.

In some embodiments, the data object service request is transmitted from a user computing device and received by the distributed data service cluster. As described above, the data object service request may be in the form of an electronic message that indicates a request for one or more data services associated with one or more data objects. In some embodiments, the data object service request is in the form of a data object access request that indicates a request to access data associated with one or more cloud-based software products in the distributed and product-oriented computing platform.

In some embodiments, the distributed data service cluster is associated with a distributed policy decision object and one or more distributed policy enforcement objects. For example, the distributed data service cluster may comprise the distributed policy decision object and the one or more distributed policy enforcement objects that are in data communications with one another.

Referring back to FIG. 20, subsequent and/or in response to step/operation 2010, the example method 2000 proceeds to step/operation 2012. At step/operation 2012, a processing circuitry (such as, but not limited to, the processor 305 of the distributed data service cluster 107A described above in connection with at least FIG. 1 and FIG. 3) transmits a control policy evaluation request based at least in part on the data object service request received at step/operation 2010 to the distributed policy decision object. For example, the processing circuitry generates and transmits the control policy evaluation request similar to at least step/operation 806 described above in connection with FIG. 8.

Referring back to FIG. 20, subsequent and/or in response to step/operation 2012, the example method 2000 proceeds to step/operation 2016. At step/operation 2016, a processing circuitry (such as, but not limited to, the processor 305 of the distributed data service cluster 107A described above in connection with at least FIG. 1 and FIG. 3) receives a control policy evaluation response from the distributed policy decision object. For example, the processing circuitry receives the control policy evaluation response similar to at least step/operation 808 described above in connection with FIG. 8.

The example method 2000 shown in FIG. 20 further illustrates an example of the distributed policy decision object generating the control policy evaluation response based at least in part on step/operation 2014. At step/operation 2014, the distributed policy decision object determines that the distributed data service cluster is associated with at least one of the one or more product identifiers.

After receiving the control policy evaluation request at step/operation 2012, the distributed policy decision object parses the distributed data service cluster associated with the data object access request received at step/operation 2010. As described above, each distributed data service cluster in the distributed and product-oriented computing platform provides data services for one or more cloud-based software products provided by the distributed and product-oriented computing platform. In some embodiments, a distributed data service cluster comprises, stores, or is associated with a network log data object that stores product identifiers of cloud-based software products that the distributed data service cluster provides data services to.

In some embodiments, the distributed policy decision object comprises a plurality of replicated policy information objects that are distributed from a centralized policy information repository. In some embodiments, the distributed policy decision object traverses the replicated policy information objects according to product identifier(s) associated with the distributed data service cluster that received the data object access request.

As described above in connection with at least step/operation 2006 and step/operation 2008 of FIG. 20, the plurality of replicated policy information objects stored in the distributed policy decision object may comprise one or more replicated policy information objects (replicated from one or more policy information objects in the centralized policy information repository) having policy application metadata and/or policy control metadata associated with one or more product identifiers.

In some embodiments, the distributed policy decision object determines that the product identifier associated with the distributed data service cluster matches a product identifier associated with the at least one replicated policy information object. In some embodiments, the distributed policy decision object generates the control policy evaluation response that indicates the at least one replicated policy information object.

Referring back to FIG. 20, subsequent and/or in response to step/operation 2016, the example method 2000 proceeds to step/operation 2018. At step/operation 2018, a processing circuitry (such as, but not limited to, the processor 305 of the distributed data service cluster 107A described above in connection with at least FIG. 1 and FIG. 3) generates the data object service response comprising the data permission metadata based on the data access restriction policy.

In some embodiments, the at least one replicated policy information object indicated in the control policy evaluation response may comprise policy control metadata with a data access restriction indication (for example, as described above in connection with at least step/operation 2008 of FIG. 20), and the data access restriction indication specifies the data access restriction policy that restricts, limits, or prevents accessing the distributed data service cluster associated with the product identifier.

In some embodiments, the processing circuitry generates the data object service response based on the data access restriction policy. In some embodiments, the data object service response comprises the data permission metadata. For example, the data permission metadata may comprise a denial indication, indicating that access to the distributed data service cluster is limited and/or restricted.

In some embodiments, one or more distributed policy enforcement objects of the distributed data service cluster can respond to the data object service request received at step/operation 2010 based on the data object service response generated at step/operation 2018.

Referring back to FIG. 20, subsequent and/or in response to step/operation 2018, the example method 2000 proceeds to step/operation 2020 and ends.

Referring now to FIG. 21, example portions of the example distributed and product-oriented computing platform shown in FIG. 5 are provided. In the example shown in FIG. 21, the example distributed and product-oriented computing platform 2101 comprises a centralized policy information repository 2103 and distributed data service clusters (such as, but not limited to, distributed data service cluster 2105A, distributed data service cluster 2105B, distributed data service cluster 2105C, distributed data service cluster 2105D) that are in data communications with one another.

In some embodiments, the centralized policy information repository 2103 distributes policy information objects to the distributed policy decision object of each distributed data service cluster. In some embodiments, each distributed data service cluster comprises one or more distributed policy enforcement objects. Such a system structure can provide various technical benefits and advantages.

For example, because the centralized policy information repository 2103 distributes policy information objects to all distributed policy decision objects of all distributed data service clusters, every distributed data service cluster in the distributed and product-oriented computing platform receives the same and most up-to-date data control policies associated with the distributed and product-oriented computing platform. When a new data control policy is to be added to the distributed and product-oriented computing platform, the new data control policy only needs to be added to the centralized policy information repository 2103, without the burden to reconfigure each distributed data service cluster, therefore providing the technical benefits and advantages of uniformed enforcement of data control policies in the distributed and product-oriented computing platform.

As another example, each distributed data service cluster comprises one or more distributed policy enforcement objects, and each distributed policy enforcement object can enforce data control policies in response to data object service requests. As such, various embodiments of the present disclosure provide the technical benefits and advantages of continuous enforcement of data control policies through life cycles of data object service requests within the distributed and product-oriented computing platform.

As such, various embodiments of the present disclosure overcome the technical challenges and difficulties in enforcing unified data control policies in a distributed and product-oriented computing platform, and improve the functioning of complex computing systems (such as distributed and product-oriented computing platforms).

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a data object repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a user computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a user computing device (e.g., for purposes of displaying information/data to and receiving user input from a user interacting with the user computing device). Information/data generated at the user computing device (e.g., a result of the user interaction) can be received from the user computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for implementing unified data control policies in a distributed and product-oriented computing platform that comprises a plurality of distributed data service clusters and a centralized policy information repository, the apparatus comprising at least one processor and at least one non-transitory memory comprising program code, the at least one non-transitory memory and the program code configured to, with the at least one processor, cause the apparatus to at least:
    receive a data control policy generation request from a user computing device associated with a user profile;
    generate a policy information object based at least in part on the data control policy generation request and the user profile, wherein the policy information object comprises policy application metadata and policy control metadata;
    store the policy information object in the centralized policy information repository;
    distribute the policy information object as a replicated policy information object to a distributed policy decision object associated with a distributed data service cluster of the plurality of distributed data service clusters;
    receive a data object service request associated with the distributed data service cluster, wherein the distributed data service cluster is further associated with one or more distributed policy enforcement objects;
    transmit a control policy evaluation request based at least in part on the data object service request to the distributed policy decision object, wherein the distributed policy decision object comprises a plurality of replicated policy information objects that are distributed from the centralized policy information repository;
    receive a control policy evaluation response from the distributed policy decision object, wherein the control policy evaluation response indicates at least one replicated policy information object from the plurality of replicated policy information objects based at least in part on the data object service request; and
    generate a data object service response based at least in part on the control policy evaluation response, wherein the data object service response comprises one or more of data permission metadata, data routing metadata, data transformation metadata, or data filter metadata.

2. The apparatus of claim 1, wherein the data object service response comprises the data permission metadata, wherein the data permission metadata comprises one of an allowance indication, a denial indication, or an additional information request indication.

3. The apparatus of claim 1, wherein the data object service response comprises the data routing metadata, wherein the data routing metadata comprises a network address indication.

4. The apparatus of claim 1, wherein the data object service response comprises the data transformation metadata, wherein the data transformation metadata comprises a data encryption indication.

5. The apparatus of claim 1, wherein the data object service response comprises the data filter metadata, wherein the data filter metadata comprises a data filter indication.

6. The apparatus of claim 1, wherein, when generating the policy information object, the at least one non-transitory memory and the program code are configured to, with the at least one processor, cause the apparatus to:
determine that the data control policy generation request comprises a platform-wide policy indication and a plurality of internal staff identifiers; and
generate the policy application metadata that comprises a platform-wide application indication.

7. A computer-implemented method for implementing unified data control policies in a distributed and product-oriented computing platform that comprises a plurality of distributed data service clusters and a centralized policy information repository, the computer-implemented method comprising:
receiving a data control policy generation request from a user computing device associated with a user profile;
generating a policy information object based at least in part on the data control policy generation request and the user profile, wherein the policy information object comprises policy application metadata and policy control metadata;
storing the policy information object in the centralized policy information repository;
distributing the policy information object as a replicated policy information object to a distributed policy decision object associated with a distributed data service cluster of the plurality of distributed data service clusters;
receiving a data object service request associated with the distributed data service cluster, wherein the distributed data service cluster is further associated with one or more distributed policy enforcement objects;
transmitting a control policy evaluation request based at least in part on the data object service request to the distributed policy decision object, wherein the distributed policy decision object comprises a plurality of replicated policy information objects that are distributed from the centralized policy information repository;
receiving a control policy evaluation response from the distributed policy decision object, wherein the control policy evaluation response indicates at least one replicated policy information object from the plurality of replicated policy information objects based at least in part on the data object service request; and
generating a data object service response based at least in part on the control policy evaluation response, wherein the data object service response comprises one or more of data permission metadata, data routing metadata, data transformation metadata, or data filter metadata.

8. The computer-implemented method of claim 7, wherein the data object service response comprises the data permission metadata, wherein the data permission metadata comprises one of an allowance indication, a denial indication, or an additional information request indication.

9. The computer-implemented method of claim 7, wherein the data object service response comprises the data routing metadata, wherein the data routing metadata comprises a network address indication.

10. The computer-implemented method of claim 7, wherein the data object service response comprises the data transformation metadata, wherein the data transformation metadata comprises a data encryption indication.

11. The computer-implemented method of claim 7, wherein the data object service response comprises the data filter metadata, wherein the data filter metadata comprises a data filter indication.

12. The computer-implemented method of claim 7, wherein, when generating the policy information object, the computer-implemented method comprises:
determining that the data control policy generation request comprises a platform-wide policy indication and a plurality of internal staff identifiers; and
generating the policy application metadata that comprises a platform-wide application indication.

13. A computer program product for implementing unified data control policies in a distributed and product-oriented computing platform that comprises a plurality of distributed data service clusters and a centralized policy information repository, the computer program product comprising at least one non-transitory computer-readable storage medium having computer-readable program code portions stored therein, the computer-readable program code portions comprising an executable portion configured to:
receive a data control policy generation request from a user computing device associated with a user profile;
generate a policy information object based at least in part on the data control policy generation request and the user profile, wherein the policy information object comprises policy application metadata and policy control metadata;
store the policy information object in the centralized policy information repository;
distribute the policy information object as a replicated policy information object to a distributed policy decision object associated with a distributed data service cluster of the plurality of distributed data service clusters;
receive a data object service request associated with the distributed data service cluster, wherein the distributed data service cluster is further associated with one or more distributed policy enforcement objects;
transmit a control policy evaluation request based at least in part on the data object service request to the distributed policy decision object, wherein the distributed policy decision object comprises a plurality of replicated policy information objects that are distributed from the centralized policy information repository;
receive a control policy evaluation response from the distributed policy decision object, wherein the control policy evaluation response indicates at least one replicated policy information object from the plurality of replicated policy information objects based at least in part on the data object service request; and
generate a data object service response based at least in part on the control policy evaluation response, wherein the data object service response comprises one or more of data permission metadata, data routing metadata, data transformation metadata, or data filter metadata.

14. The computer program product of claim 13, wherein the data object service response comprises the data permission metadata, wherein the data permission metadata comprises one of an allowance indication, a denial indication, or an additional information request indication.

15. The computer program product of claim 13, wherein the data object service response comprises the data routing metadata, wherein the data routing metadata comprises a network address indication.

16. The computer program product of claim 13, wherein the data object service response comprises the data transformation metadata, wherein the data transformation metadata comprises a data encryption indication.

17. The computer program product of claim 13, wherein the data object service response comprises the data filter metadata, wherein the data filter metadata comprises a data filter indication.

* * * * *